United States Patent
Yabuki

(10) Patent No.: US 6,939,399 B2
(45) Date of Patent: *Sep. 6, 2005

(54) INK SET, CONTAINER FOR STORING THE SAME, INKJET RECORDING METHOD, AND METHOD FOR PREVENTING DISCOLORATION OF INKJET-RECORDED IMAGE

(75) Inventor: Yoshiharu Yabuki, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 63 days.

This patent is subject to a terminal disclaimer.

(21) Appl. No.: 10/368,474

(22) Filed: Feb. 20, 2003

(65) Prior Publication Data

US 2004/0020408 A1 Feb. 5, 2004

(30) Foreign Application Priority Data

Feb. 20, 2002 (JP) ........................................ 2002-043410
Feb. 20, 2002 (JP) ........................................ 2002-043490
Feb. 20, 2002 (JP) ........................................ 2002-043682

(51) Int. Cl.$^7$ ........................ C09D 11/00; C09D 11/02; B41J 2/01
(52) U.S. Cl. ................. 106/31.27; 106/31.48; 106/31.49; 106/31.5; 347/100
(58) Field of Search ........................ 106/31.27, 31.48, 106/31.49, 31.5; 347/100

(56) References Cited

U.S. PATENT DOCUMENTS

| | | | |
|---|---|---|---|
| 5,482,546 | A | 1/1996 | Eida |
| 6,582,502 | B2 | 6/2003 | Fujiwara |
| 2002/0043175 | A1 | 4/2002 | Walker et al. |
| 2002/0096085 | A1 | 7/2002 | Gotoh et al. |
| 2002/0107301 | A1 | 8/2002 | Yamanouchi et al. |
| 2002/0143079 | A1 | 10/2002 | Yamanouchi et al. |
| 2004/0024085 | A1 * | 2/2004 | Ishizuka et al. ............ 523/160 |
| 2004/0050291 | A1 * | 3/2004 | Taguchi et al. .......... 106/31.27 |

FOREIGN PATENT DOCUMENTS

| | | |
|---|---|---|
| EP | 1081198 A2 | 3/2001 |
| GB | 2346618 A | 8/2000 |
| JP | 10-120958 | 5/1998 |
| JP | 2000-303009 | 10/2000 |
| JP | 2001 115072 A | 4/2001 |
| JP | 2001-335714 | 12/2001 |

OTHER PUBLICATIONS

EPO Search Report dated Jun. 13, 2003 in EP Application No. 03003218.9–1214.

* cited by examiner

*Primary Examiner*—Helene Klemanski
(74) *Attorney, Agent, or Firm*—Burns, Doane, Swecker & Mathis, LLP

(57) ABSTRACT

An ink set having a yellow ink containing at least one yellow dye, a magenta ink containing at least one magenta dye, and a cyan ink containing at least one cyan dye, wherein an oxidation potential of the magenta dye and an oxidation potential of the cyan dye are each higher than 0.8 V (vs SCE), and an inkjet recording method using the ink set.

14 Claims, No Drawings

INK SET, CONTAINER FOR STORING THE SAME, INKJET RECORDING METHOD, AND METHOD FOR PREVENTING DISCOLORATION OF INKJET-RECORDED IMAGE

BACKGROUND OF THE INVENTION

1. Field of the Invention

The present invention relates to an ink set having an excellent image fastness, a container for storing the ink set, an inkjet recording method using the ink set, and a method for preventing discoloration of an inkjet-recorded image.

2. Description of the Related Art

In recent years, as an image-recording material there has been mainly used a material for forming color images. In particular, inkjet recording materials, heat-sensitive transfer image recording materials, recording materials using electrophotography, transfer silver halide photographic materials, printing inks, recording pens, etc. have been widely used.

These color image recording materials comprise dyes (dyestuff and pigment) of so-called subtractive primaries to reproduce or record a full-color image. However, under the present circumstances that there are no dyes which have absorption characteristics that can realize desired color reproduction region and are fast enough to withstand various working conditions. It has been keenly desired to improve these color image recording materials.

Due to low material cost, the possibility of high speed recording, low noise levels during recording and ease of color recording, the inkjet recording method has rapidly been diffused and further developed.

Inkjet recording methods are divided into two groups, i.e., continuance processes involving continuous flying of droplets and on-demand processes involving flying of droplets according to image data signals. Ejection processes for these inkjet recording methods are divided into four groups, i.e., processes which comprises applying pressure from a piezo-electric element to eject droplets, processes which comprises thermally generating air bubbles in the ink to eject droplets, processes using ultrasonic waves, and processes involving electrostatic suction and ejection of droplets. As an ink for inkjet recording an aqueous ink, oil-based ink or solid (melt type) ink may be used.

The coloring agents to be incorporated in such an ink for inkjet recording are required to have a good solubility or dispersibility in solvents, allow high density recording, exhibit a good hue, have a high fastness with respect to light, heat, active gases in the atmosphere (oxidizing gas such as NOx and ozone, SOx), water and chemicals, have a good fixability to the image material and hence be unlikely to ooze, have a high preservability in ink form, have no toxicity, have a high purity and a have good availability. However, it is extremely difficult to find coloring agents which can satisfy these requirements to a great extent. In particular, these coloring agents are keenly required to have a good hue of the three primary colors and a good fastness with respect to light, humidity, heat, and especially with respect to oxidizing gases such as ozone in the atmosphere, upon printing on an image-receiving material having an ink-receiving layer containing a porous particulate white inorganic pigment.

As magenta dyes, azo dyes comprising phenol, naphthol, aniline or the like as a coupling component have heretofore been widely used. As azo dyes having a good hue dyes disclosed in Japanese Patent Application Laid-open (JP-A) No. 11-209673, Japanese Patent No. 3,020,660, etc. are known. However, these dyes are disadvantageous in that they have a deteriorated light fastness. As improvements in these dyes, dyes having a good hue and an improved light fastness have been recently disclosed in JP-A No. 2001-335714. However, the dyes known in these patents leave much to be desired in fastness with respect to oxidizing gases such as ozone.

Representative examples of cyan dyes include phthalocyanine dyes and triphenylmethane dyes.

Representative examples of phthalocyanine-based dyes which have been most widely used include C. I. Direct Blue 86, 87, and 199. These phthalocyanine-based dyes are superior to magenta and yellow dyes in light fastness but exhibit a remarkable decoloration or discoloration due to oxidizing gases such as nitrogen oxide gas and ozone, which have recently been often raised as environmental issues.

To date, phthalocyanine-based dyes which are rendered fast with respect to ozone gas have been disclosed in JP-A No. 3-103484, JP-A No. 4-39365, JP-A No.2000-303009, etc. However, all these phthalocyanine-based dyes leave much to be desired in improvement of fastness with respect to oxidizing gas and thus further improvements thereto are desired.

On the other hand, triphenylmethane-based dyes such as Acid Blue 9 exhibit a good hue but have a drastically deteriorated fastness with respect to light and ozone gas.

As yellow dyes, azobenzene-based dyes such as Direct Yellow 86 and 120, pyrazolonazo dyes such as Acid Yellow 17, and heterocyclic azo dyes such as pyridonazo dyes have been used. Further, quinophthalone-based dyes have been often proposed. However, these dyes which have heretofore been known are disadvantageous in that most of those having a good hue, and particularly a sharp shoulder of absorption characteristic curve on the long wavelength side, such as quinophthalone dyes are not fast with respect to ozone and light. Azobenzene-based dyes have a good fastness but a sloping shoulder of absorption characteristic curve on the long wavelength side. Thus, there are no yellow dyes which can satisfy both the hue and fastness requirements.

Representative examples of black dyes include Food Black 2, bisazo dye, and trisazo dye. However, there are no black dyes which are excellent both in light fastness and ozone fastness. On the other hand, pigments such as carbon black are widely used. JP-A No.3-210373 discloses an ink comprising an acidic carbon black and an alkali-soluble polymer. Further, JP-A No.3-134073 discloses an ink for inkjet recording having a good storage stability which can easily provide a dispersion excellent in ejectability in a bubble jet recording apparatus.

However, an ink for inkjet recording containing carbon black with a dispersant is technically disadvantageous in that it cannot be ejected stably and cannot provide a sufficient printing density. In order to solve these problems, JP-A No.8-3498 and JP-A No.10-120958 propose incorporating a functional group having dissociative hydrogen atoms in a predetermined amount or a salt thereof in carbon black to provide surface-modified carbon black, and thereby providing a dispersion of self-dispersible carbon black which can be self-dispersed without any surface active agent or polymer dispersant. Further, JP-A No.10-110127 discloses a method involving the incorporation of sulfone group in carbon black. Moreover, JP-A No.10-95941 proposes an ink for inkjet recording comprising the aforementioned surface-modified carbon black and glycolethes. The aforementioned self-dispersible carbon black provides a solution to the aforementioned problems but cannot achieve satisfactory results in high quality full-color printing because the water-soluble dyes to be combined therewith have a drastically deteriorated fastness.

In order to provide a full-color image having an excellent color reproducibility and fastness, the dyes constituting an image must satisfy the following requirements:
(1) All of the dyes have excellent absorption characteristics;
(2) A proper combination of dyes realizing a wide range of color reproduction;
(3) All of the dyes have a high fastness;
(4) No deterioration of fastness due to interaction of dyes occurs; and
(5) The dyes have well-balanced fastnesses.

However, since no reports have been made on the properties of dyes, that is, what structures or physical properties of the dyes can effectively act on their fastness, particularly with respect to oxidizing gases such as ozone, which is considered a problem in inkjet printing, no index for selection of dyes can be obtained. Further, it is extremely difficult to select dyes that are fast with respect to light as well.

SUMMARY OF THE INVENTION

An object of the present invention, which has been achieved in the light of technical disadvantages of the related art, is to present an improvement index that can radically solve the problem of gas discoloration, which is common to various dyes, and provide an ink set which comprises an ink composition based on the index to form an image excellent in fastness with respect to gas (particularly ozone) and light, a container for the ink set, an inkjet recording method using the ink set, and a method for preventing discoloration of an inkjet-recorded image.

The inventors made extensive studies of dyes having a good hue and a high fastness with respect to light and gas (particularly ozone gas). As a result, it has been found that the aforementioned problems can be solved by a combination of conventionally unknown dyes having a predetermined oxidation potential. The present invention has been thus achieved. In other words, it has been found that when three primary color dyes satisfy such potential requirements, these dyes exhibit not only a drastically inhibited reactivity to ozone but also an enhanced light fastness, causing neither interaction of different color dyes, nor discoloration of mixtures of colors. It has been found that when a dye which does not satisfy such potential requirements is used, particularly as a magenta dye or cyan dye, as opposed to the aforementioned case, the entire image is drastically ill-balanced, drastically deteriorating the quality of the resulting full-color image. It has also been found that light color inks have no problems with light fastness also when inks having different densities which have been recently used to enhance the color reproducibility are used. It has been further found that when the stability of dyes themselves is enhanced, the resulting ink exhibits an enhanced oxidation stability, making it possible to prolong a term of guarantee of a commercial product.

Preferred embodiments of the present invention for solving the aforementioned problems will be described below.

A first embodiment of the ink set according to the present invention is an ink set comprising a yellow ink containing at least one yellow dye, a magenta ink containing at least one magenta dye, and a cyan ink containing at least one cyan dye, wherein an oxidation potential of the magenta dye and an oxidation potential of the cyan dye are each higher than 0.8 V (vs SCE).

A second embodiment of the ink set according to the present invention is the ink set, according to the first embodiment, wherein an ozone fading retention ratio of the magenta dye and the cyan dye are each no less than 0.6 times an ozone fading retention ratio of C. I. Direct Yellow 86.

A third embodiment of the ink set according to the present invention is the ink set, according to the first embodiment, wherein the magenta dye is represented by the following general formula (M-1):

General Formula (M-1)

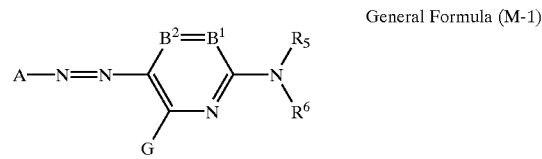

wherein A represents a residue of 5-membered heterocyclic diazo component A-$NH_2$; $B^1$ and $B^2$ respectively represent —$CR^1$═ and —$CR^2$═, or one of $B^1$ and $B^2$ represents a nitrogen atom and the other represents —$CR^1$═ or —$CR^2$═; $R^5$ and $R^6$ each independently represent a hydrogen atom or a substituted or unsubstituted aliphatic, aromatic, heterocyclic, acyl, alkoxycarbonyl, aryloxycarbonyl, carbamoyl, alkylsulfonyl, arylsulfonyl or sulfamoyl group; G, $R^1$ and $R^2$ each independently represent a hydrogen atom, a halogen atom, a substituted or unsubstituted aliphatic, aromatic, heterocyclic, cyano, carboxyl, carbamoyl, alkoxycarbonyl, aryloxycarbonyl, heterocyclic oxycarbonyl, acyl, hydroxyl, alkoxy, aryloxy, heterocyclic oxy, silyloxy, acyloxy, carbamoyloxy, alkoxycarbonyloxy, aryloxycarbonyloxy, amino (including heterocyclic amino and anilino), acylamino, ureide, sulfamoylamino, alkoxycarbonylamino, aryloxycarbonylamino, alkylsulfonylamino, arylsulfonylamino, heterocyclic sulfonylamino, nitro, alkylthio, arylthio, alkylsulfonyl, arylsulfonyl, heterocyclic sulfonyl, alkylsulfinyl, arylsulfinyl, heterocyclic sulfinyl, sulfamoyl, sulfo or heterocyclic thio group.

A fourth embodiment of the ink set according to the present invention is the ink set, according to the first embodiment, wherein the cyan dye is represented by the following general formula (C-I):

General Formula (C-I)

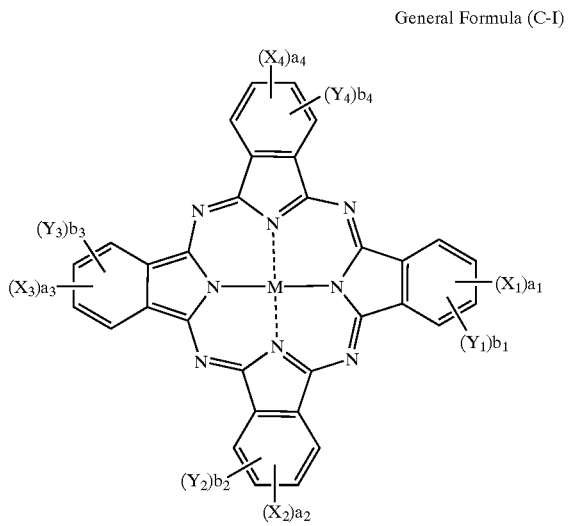

wherein $X_1$, $X_2$, $X_3$ and $X_4$ each independently represent an electron-withdrawing group having a σp value of no less than 0.40; $Y_1$, $Y_2$, $Y_3$ and $Y_4$ each independently represent a monovalent substituent; M represents a hydrogen atom, a metal element or an oxide, hydroxide or halide thereof; $a_1$ to $a_4$ and $b_1$ to $b_4$, respectively represent a number of substituents of $X_1$ to $X_4$ and $Y_1$ to $Y_4$; $a_1$ to $a_4$ and $b_1$ to $b_4$ each independently represent an integer from 0 to 4; a sum of $a_1$ to $a_4$ is no less than 2; and when the dye is a water-soluble dye, an ionic hydrophilic group is disposed as a substituent at any position on $X_1$, $X_2$, $X_3$, $X_4$, $Y_1$, $Y_2$, $Y_3$ and $Y_4$.

A fifth embodiment of the ink set according to the present invention is the ink set, according to the first embodiment, wherein the cyan dye is represented by the following general formula (C-II):

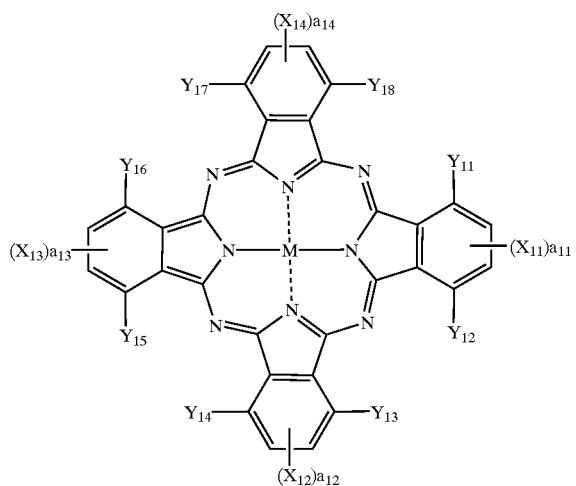

General Formula (C-II)

wherein $X_{11}$, $X_{12}$, $X_{13}$ and $X_{14}$ each independently represent an electron-withdrawing group having a σp value of no less than 0.40; $Y_{11}$, $Y_{12}$, $Y_{13}$ and $Y_{14}$ each independently represent a monovalent substituent; M represents a hydrogen atom, a metal element or an oxide, hydroxide or halide thereof; $a_{11}$ to $a_{14}$ and $b_{11}$ to $b_{14}$ respectively represent a number of substituents of $X_{11}$ to $X_{14}$ and $Y_{11}$ to $Y_{14}$; $a_{11}$ to $a_{14}$ and $b_{11}$ to $b_{14}$ each independently represent an integer from 0 to 4; a sum of $a_{11}$ to $a_{14}$ is no less than 2; and when the dye is a water-soluble dye, an ionic hydrophilic group is disposed as a substituent at any position on $X_{11}$, $X_{12}$, $X_{13}$, $X_{14}$, $Y_{11}$, $Y_{12}$, $Y_{13}$ and $Y_{14}$.

A sixth embodiment of the ink set according to the present invention is the ink set, according to the first embodiment, wherein the oxidation potential of the magenta dye is higher than the oxidation potential of the cyan dye.

A seventh embodiment of the ink set according to the present invention is the ink set, according to the first embodiment, wherein an oxidation potential of the yellow dye is higher than 0.8 V (vs SCE).

An eighth embodiment of the ink set according to the present invention is the ink set, according to the first embodiment, wherein an ozone fading retention ratio of the yellow dye is no less than 0.6 times an ozone fading retention ratio of C. I. Direct Yellow 86.

A ninth embodiment of the ink set according to the present invention is the ink set, according to the first embodiment, wherein the yellow dye is represented by the following general formula (Y-I):

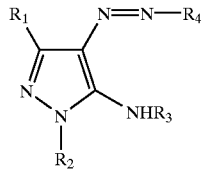

General Formula (Y-I)

wherein $R_1$ and $R_3$ each independently represent a hydrogen atom, a cyano group, an alkyl group, a cycloalkyl group, an aralkyl group, an alkoxy group, an alkylthio group, an arylthio group, an aryl group or an ionic hydrophilic group; $R_2$ represents a hydrogen atom, an alkyl group, a cycloalkyl group, an aralkyl group, a carbamoyl group, an acyl group, an aryl group or a heterocyclic group; and $R_4$ represents a heterocyclic group.

A tenth embodiment of the ink set according to the present invention is the ink set, according to the first embodiment, wherein the ink set comprises two or more magenta inks having different concentrations and/or two or more cyan inks having different concentrations.

An eleventh embodiment of the ink set according to the present invention, is the ink set, according to the first embodiment, further comprising a black ink containing at least one self-dispersible pigment.

A first embodiment of the container according to the present invention is a container storing an ink set comprising a yellow ink containing at least one yellow dye, a magenta ink containing at least one magenta dye, and a cyan ink containing at least one cyan dye, wherein an oxidation potential of the magenta dye and an oxidation potential of the cyan dye are each higher than 0.8 V (vs SCE).

A first embodiment of the inkjet recording method according to the present invention is an inkjet recording method which comprises forming an image on an image-receiving material having an ink-receiving layer containing a particulate white inorganic pigment provided on a support, using an ink set comprising a yellow ink containing at least one yellow dye, a magenta ink containing at least one magenta dye, and a cyan ink containing at least one cyan dye, wherein an oxidation potential of the magenta dye and an oxidation potential of the cyan dye are each higher than 0.8 V (vs SCE).

A first embodiment of the method for preventing discoloration of an inkjet-recorded image according to the present invention is a method for preventing discoloration of an inkjet-recorded image, wherein inkjet recording is carried out using an ink set comprising a yellow ink containing at least one yellow dye, a magenta ink containing at least one magenta dye, and a cyan ink containing at least one cyan dye, wherein an oxidation potential of the magenta dye and an oxidation potential of the cyan dye are each higher than 0.8 V (vs SCE).

DESCRIPTION OF THE PREFERRED EMBODIMENTS

The present invention will be further described hereinafter.

Dye

In the present invention, a magenta dye and a cyan dye having an oxidation potential of higher than 0.8 V (vs SCE) are used. The oxidation potential of these dyes are preferably as high as possible, more preferably higher than 1.0 V (vs SCE), even more preferably higher than 1.1 V (vs SCE), still more preferably higher than 1.15 V (vs SCE), most preferably higher than 1.2 V (vs SCE).

The value of oxidation potential indicates how easily electrons can move from the sample to the electrode. The greater this value is (the higher the oxidation potential is), the more difficultly can move electrons from the sample to the electrode, i.e., the more difficultly can be oxidized the sample. Referring to its connection with the structure of compounds, the incorporation of an electron-drawing group gives a higher oxidation potential while the incorporation of an electron-donative group gives a lower oxidation potential.

As described in detail below the value of oxidation potential indicates the potential at which electrons are withdrawn from a compound at an anode in voltammetry and is thought to be approximated by the energy level of the compound in the ground level on HOMO.

The inventors made studies of the ozone fastness of colored images. It was found that there is a relationship between the oxidation potential and the ozone fastness of a compound to be used in colored images and the use of a compound having an oxidation potential of higher than that of saturated calomel electrode provides colored images with an improved ozone fastness.

The reason why the ozone fastness of colored images is thus improved can be interpreted by the relationship between the compound and ozone gas on HOMO (Highest Occupied Molecular Orbital) and LUMO (Lowest Unoccupied Molecular Orbital). In other words, since it is thought that the reaction of the coloring agent on HOMO with ozone gas on LUMO causes the coloring agent to be oxidized, resulting in the deterioration of the ozone fastness of the colored images, the improvement of the ozone fastness of the colored images can be accomplished by lowering HOMO of the coloring agent to lower the reactivity thereof with ozone gas.

The value of oxidation potential (Eox) can be easily measured by those skilled in the art. For the details of this measuring method, reference can be made to P. Delahay, "New Instrumental Methods in Electrochemistry", Interscience Publishers, 1954, A. J. Bard et al, "Electrochemical Methods", John Wiley & Sons, 1980, and Akira Fujishima et al, "Denki Kagaku Sokuteihou (Electrochemical Measuring Methods)", Gihodo, 1984.

The measurement of oxidation potential will be further described hereinafter. For the measurement of oxidation potential, a sample to be tested is dissolved in a solvent such as dimethylformamide and acetonitrile containing a supporting electrolyte such as sodium perchlorate and tetrapropylammonium perchlorate in an amount of from $1\times10^{-4}$ to $1\times10^{-5}$ mol·dm$^{-3}$. The oxidation potential of the sample is then measured relative to that of SCE (saturated calomel electrode) by cyclic voltammetry or DC polarography.

As the supporting electrolyte and solvent to be used herein there may be used proper materials depending on the oxidation potential and solubility of the sample to be tested. For the details of supporting electrolytes and solvents employable herein, reference can be made to Akira Fujishima et al, "Denki Kagaku Sokuteihou (Electrochemical Measuring Methods)", Gihodo, pp. 101–118, 1984.

The value of oxidation potential may deviate by about scores of millivolts under the influence of the difference of potential between solutions or the liquid resistivity of the sample solution. By making correction with a standard sample (e.g., hydroquinone), the reproducibility of the potential value thus measured can be guaranteed.

In the present invention, the oxidation potential is defined by the value obtained by measuring in N,N-dimethylformamide (compound concentration: $1\times10^{-3}$ mol·dm$^{-3}$) containing 0.1 mol·dm$^{-3}$ of tetrapropylammonium perchlorate as a supporting electrolyte with SCE (saturated calomel electrode) as a reference electrode, a graphite electrode as a working electrode and a platinum electrode as a counter electrode. In the case where the dye is not dissolved in N,N-dimethylformamide, water may be added to the solvent in an amount of 1% at maximum.

As the dyes employable herein there may be used dyes having any structure satisfying the aforementioned oxidation potential requirements. In particular, yellow dyes inherently have a high oxidation potential (low HOMO) and thus have little structural limitations. The structure of dyes required to satisfy the aforementioned oxidation potential requirements will be described in detail hereinafter.

In the present invention, it is preferred that an electron-withdrawing group be incorporated in the skeleton of dyes to raise further the oxidation potential thereof for the purpose of lowering the reactivity thereof with ozone, which is an electron-withdrawing agent. Thus, let us now explain using the Hammett's substituent constant up, which is a measure of the electron-withdrawing properties or electron-donative properties of substituents. It can be said that the incorporation of a substituent having a high up value such as nitro group, cyano group, sulfinyl group, sulfonyl group and sulfamoyl group makes it possible to raise further the oxidation potential of dyes.

Let us now explain somewhat the Hammett's substituent constant up. Hammett's rule is an empirical rule which L. P. Hammett proposed in 1935 to discuss quantitatively the effect of substituents on the reaction or equilibrium of benzene derivatives and has been widely considered valid to date. The substituent constants required in Hammett's rule include σp value and σm value, which can be found in many general references, e.g., J. A. Dean, "Lange's Handbook of Chemistry", 12th ed., Mac Graw-Hill, 1979, and "Kagaku no Ryouiki (Domain of Chemistry)", extra edition, Nankodo, No. 122, pp. 96–103, 1979.

In general, the more the content of an atom having a high electronegativity as a constituent of chromophore other than the aforementioned substituent is, the higher can be the oxidation potential of dyes. Accordingly, the use of an unsaturated heterocyclic group rather than aryl group as a constituent of chromophore makes it possible to provide dyes with a high oxidation potential. Examples of hetero atoms having a high electronegativity include nitrogen atom, oxygen atom, and sulfur atom. Particularly preferred among these hetero atoms is nitrogen atom.

Thus, preferred examples of dyes include those having a chromophore formed by hetero atoms, those containing unsaturated heterocyclic group, and those containing electron-withdrawing group.

Preferred examples of the chromophore formed by hetero atoms include azo dye, azomethine dye, and phthalocyanine dye. Particularly preferred among these dyes is azo dye.

As the unsaturated heterocyclic group there is preferably used a 5-membered or 6-membered unsaturated heterocyclic group. Examples of such a 5-membered or 6-membered unsaturated heterocyclic group include thiophene ring, furane ring, pyrrole ring, thiazole ring, oxazole ring, imidazole ring, isothiazole ring, isoxazole ring, pyrazole ring, thiadiazole ring, oxadiazole ring, triazole ring, pyridine ring, pyridazine ring, pyrimidine ring, and pyrazine ring. The unsaturated heterocyclic group may form a condensed ring with a hydrocarbon ring or heterocyclic group. In the case where the unsaturated heterocyclic group is a nitrogen-containing heterocyclic group, the nitrogen atom may be quaterized. In the case where the unsaturated heterocyclic group is a heterocyclic group which may be tautomeric, even when only one of the tautomers is given, the other tautomer may be included. Preferred examples of the aforementioned unsaturated heterocyclic groups are thiazole ring, isothiazole ring, pyrazole ring, thiadiazole ring, pyridine ring, pyrimidine ring, and pyrazine ring. Most preferred examples of these unsaturated heterocyclic groups include isothiazole ring, pyrazole ring, 1,2,4-thiadiazole ring, 1,3,4-thiadiazole ring, and pyridine ring.

As the electron-withdrawing substituent there is preferably used a substituent having a Hammett's σp value of not smaller than 0.40, more preferably not smaller than 0.45, most preferably not smaller than 0.50. In the case where there are a plurality of electron-withdrawing groups as substituents on chromophore, the sum of σp value of the substituents is preferably not smaller than 0.50, more preferably not smaller than 0.60, most preferably not smaller than 0.70. For specific examples of the electron-withdrawing group having σp value of not smaller than 0.40, reference can be made to J. A. Dean, "Lange's Handbook of Chemistry", 12th ed., Mac Graw-Hill, 1979, and "Kagaku no Ryouiki (Domain of Chemistry)", extra edition, Nankodo, No. 122, pp. 96–103, 1979.

The preferred dye of the present invention is a combination of those represented by the following general formula (I):

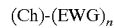   General formula (I)

wherein Ch represents a chromophore containing unsaturated heterocyclic group; EWG represents an electron-withdrawing substituent having σp value of not smaller than 0.40 as described later; and n represents an integer of from 1 to 8.

Examples of Ch employable herein include chromophore of azo dye having unsaturated heterocyclic group in its chromophore, phthalocyanine dye, azomethine dye, quinone dye (anthraquinone dye, anthrapyridone dye, etc.), carbonium dye (triphenylmethane dye, xanthene dye, acridine dye, etc.) and azine dye (oxazine, thiazine, etc.). Preferred among these dyes are azo dye having unsaturated heterocyclic group in its chromophore, phthalocyanine dye, azomethine dye, and anthrapyridone dye. Most preferred among these dyes are azo dye having unsaturated heterocyclic group in its chromophore, and phthalocyanine dye.

The preferred azo dye which can be used as a magenta or yellow dye is represented by the following general formula (II):

   General formula (II)

In the general formula (II), Het (A) and Het (B) each represent a 5-membered or 6-membered unsaturated heterocyclic group. Examples of the unsaturated heterocyclic group represented by Het (A) and Het (B) include thiophene ring, furane ring, pyrrole ring, thiazole ring, oxazole ring, imidazole ring, isothiazole ring, isoxazole ring, pyrazole ring, thiadiazole ring, oxadiazole ring, triazole ring, pyridine ring, pyridazine ring, pyrimidine ring, and pyrazine ring. These unsaturated heterocyclic groups further have substituents. The substituents on these unsaturated heterocyclic groups may be connected to each other to form condensed rings with hydrocarbon rings or unsaturated heterocyclic groups. The condensed rings may further have substituents thereon. In the case where the unsaturated heterocyclic group is a nitrogen-containing heterocyclic group, the nitrogen atom may be quaterized. In the case where the unsaturated heterocyclic group is a heterocyclic group which may be tautomeric, even when only one of the tautomers is given, the other tautomer may be included.

The dye, if it is a water-soluble dye, preferably has an ionic hydrophilic group as a substituent. Examples of the ionic hydrophilic group as a substituent include sulfo group, carboxyl group, phosphono group, and quaternary ammonium group.

The heterocyclic group represented by Het (A) or Het (B) is preferably a thiazole ring, isothiazole ring, pyrazole ring, thiadiazole ring, pyridine ring or pyrazine ring, more preferably isothiazole ring, pyrazole ring, thiadiazole ring or pyridine ring, most preferably pyrazole ring, 1,2,4-thiadiazole ring or pyridine ring.

Het (A) and Het (B) each may have substituents. Examples of the substituents include halogen atom, alkyl group (including cycloalkyl group), alkenyl group (including cycloalkenyl group), alkynyl group, aryl group, heterocyclic group, cyano group, hydroxyl group, nitro group, carboxyl group, alkoxy group, aryloxy group, silyloxy group, heterocyclic oxy group, acyloxy group, carbamoyloxy group, alkoxycarbonyloxy group, aryloxycarbonyloxy group, amino group (anilino group), acylamino group, aminocarbonylamino group, alkoxycarbonylamino group, aryloxycarbonylamino group, sulfamoylamino group, alkylsulfonylamino group, arylsulfonylamino group, mercapto group, alkylthio group, arylthio group, heterocyclic thio group, sulfamoyl group, sulfo group, alkylsulfinyl group, arylsulfinyl group, alkylsulfonyl group, arylsulfonyl group, acyl group, aryloxycarbonyl group, alkoxycarbonyl group, carbamoyl group, arylazo group, heterocyclic azo group, imido group, phosphino group, phosphinyl group, phosphinyloxy group, phosphinylamino group, and silyl group. Preferred among these substituents are halogen atom, heterocyclic group, cyano group, nitro group, carboxyl group, acyloxy group, carbamoyloxy group, alkoxycarbonyloxy group, aryloxycarbonyloxy group, sulfamoyl group, sulfo group, alkylsulfinyl group, arylsulfinyl group, alkylsulfonyl group, arylsulfonyl group, acyl group, aryloxycarbonyl group, alkoxycarbonyl group, carbamoyl group, imido group, phosphoryl group, phosphono group, phosphinoyl group, phosphonyl group, phosphinyloxy group, and phosphinylamino group. More desirable among these substituents are electron-withdrawing groups. Particularly preferred among these substituents are those having σp value of not smaller than 0.40. Examples of the substituents having σp value of not smaller than 0.40 include cyano group, nitro group, carboxyl group, sulfamoyl group, alkylsulfinyl group, arylsulfinyl group, alkylsulfonyl group, arylsulfonyl group, acyl group, aryloxycarbonyl group, alkoxycarbonyl group, carbamoyl group, imido group, phosphono group, and phosphoryl group. Other examples of the substituents having σp value of not smaller than 0.40 include alkyl group substituted by electron-withdrawing group (e.g., trihalomethyl group, perfluoroalkyl group, dicyanomethyl group, iminomethyl group), alkenyl group substituted by electron-withdrawing group (e.g., tricyanovinyl group), and quaternary substituents (e.g., sulfonium group, ammonium group, phosphonium group). Among these functional groups, those having hydrogen atoms may have these hydrogen atoms substituted by the aforementioned substituents. Examples of these substituents include alkylcarbonylaminosulfonyl group, arylcarbonylaminosulfonyl group, alkylsulfonylaminocarbonyl group, and arylsulfonylaminocarbonyl group. The substituents on these unsaturated heterocyclic groups may be connected to each other to form condensed rings with unsaturated heterocyclic groups. The condensed rings may further have substituents thereon.

Magenta Dye

The preferred magenta dye is represented by the general formula (M-I). In the general formula (M-I), A represents a residue of 5-membered heterocyclic diazo component A-NH$_2$. B$^1$ and B$^2$ represent —CR$^1$= and —CR$^2$=, respectively, or one of B$^1$ and B$^2$ represents a nitrogen atom and the other represents —CR$^1$= or —CR$^2$=. R$^5$ and R$^6$ each independently represent a hydrogen atom or an aliphatic, aromatic, heterocyclic, acyl, alkoxycarbonyl, aryloxycarbonyl, carbamoyl, alkylsulfonyl, arylsulfonyl or sulfamoyl group which may further contain substituents.

G, R$^1$ and R$^2$ each independently represent a hydrogen or halogen atom or an aliphatic, aromatic, heterocyclic, cyano, carboxyl, carbamoyl, alkoxycarbonyl, aryloxycarbonyl, heterocyclic oxycarbonyl, acyl, hydroxyl, alkoxy, aryloxy, heterocyclic oxy, silyloxy, acyloxy, carbamoyloxy, alkoxycarbonyloxy, aryloxycarbonyloxy, amino (including heterocyclic amino and anilino groups), acylamino, ureide, sulfamoylamino, alkoxycarbonylamino, aryloxycarbonylamino, alkylsulfonylamino, arylsulfonylamino, heterocyclic sulfonylamino, nitro, alkylthio, arylthio, alkylsulfonyl, arylsulfonyl, heterocyclic sulfonyl, alkylsulfinyl, arylsulfinyl, heterocyclic sulfinyl, sulfamoyl, sulfo or heterocyclic thio group which may be further substituted. R$^1$ and R$^5$ or R$^5$ and R$^6$ may be condensed to form a 5-membered or 6-membered ring.

In the general formula (M-I), A represents a residue of 5-membered heterocyclic diazo component A-NH$_2$. Examples of the hetero atoms of heterocyclic group include N, O, and S. The 5-membered heterocyclic group is preferably a nitrogen-containing heterocyclic group. The heterocyclic group may be condensed with aliphatic rings, aromatic rings or other heterocyclic groups. Preferred examples of the heterocyclic group represented by A include pyrazole ring, imidazole ring, thiazole ring, isothiazole ring, thiadiazole ring, benzothiazole ring, benzoxazole ring, benzoisothiazole ring, and triazole ring. These substituents may further have substituents. Particularly preferred examples of these substituents include pyrazole ring, imidazole ring, isothiazole ring, thiadiazole ring and benzothiazole ring represented by the following general formulae (a) to (f), respectively:

General Formula

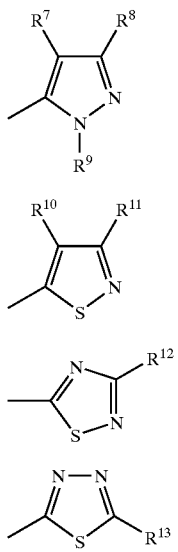

(a)

(b)

(c)

(d)

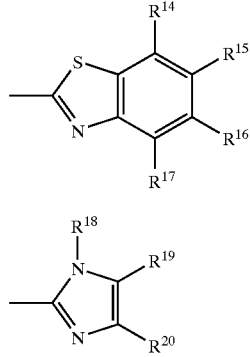

(e)

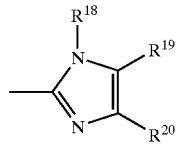

(f)

In the aforementioned general formulae (a) to (f), R$^7$ to R$^{20}$ represent the same substituents as described with reference to G, R$^1$ and R$^2$. Preferred among these substituents represented by the general formulae (a) to (f) are pyrazole ring and isothiazole ring represented by the general formulae (a) and (b), respectively. Mostly preferred among these substituents is pyrazole ring represented by the general formula (a).

In the general formula (M-I), B$^1$ and B$^2$ represent —CR$^1$= and —CR$^2$=, respectively, or one of B$^1$ and B$^2$ represents a nitrogen atom and the other represents —CR$^{12}$= or —CR$^2$=. However, B$^1$ and B$^2$ represent —CR$^1$= and —CR$^2$=, respectively.

R$^5$ and R$^6$ each independently represent a hydrogen atom or an aliphatic, aromatic, heterocyclic, acyl, alkoxycarbonyl, aryloxycarbonyl, carbamoyl, alkylsulfonyl, arylsulfonyl or sulfamoyl group which may further contain substituents. Preferred among the substituents represented by R$^5$ and R$^6$ are hydrogen atom and aliphatic, aromatic, heterocyclic, acyl, alkylsulfonyl, arylsulfonyl and sulfamoyl groups, more preferably hydrogen atom and aromatic, heterocyclic, acyl, alkylsulfonyl and arylsulfonyl groups, most preferably hydrogen atom and aryl and heterocyclic groups. These groups may have substituents. However, R$^5$ and R$^6$ are not a hydrogen atom at the same time.

G, R$^1$ and R$^2$ each independently represent a hydrogen or halogen atom or an aliphatic, aromatic, heterocyclic, cyano, carboxyl, carbamoyl, alkoxycarbonyl, aryloxycarbonyl, heterocyclic oxycarbonyl, acyl, hydroxyl, alkoxy, aryloxy, heterocyclic oxy, silyloxy, acyloxy, carbamoyloxy, alkoxycarbonyloxy, aryloxycarbonyloxy, amino (including heterocyclic amino and anilino groups), acylamino, ureido, sulfamoylamino, alkoxycarbonylamino, aryloxycarbonylamino, alkylsulfonylamino, arylsulfonylamino, heterocyclic sulfonylamino, nitro, alkylthio, arylthio, alkylsulfonyl, arylsulfonyl, heterocyclic sulfonyl, alkylsulfinyl, arylsulfinyl, heterocyclic sulfinyl, sulfamoyl, sulfo or heterocyclic thio group which may be further substituted.

Preferred among the substituents represented by G are hydrogen and halogen atoms, and aliphatic, aromatic, hydroxyl group, alkoxy group, aryloxy, acyloxy group, heterocyclic oxy, amino (including anilino group and heterocyclic amino), acylamino, ureido, sulfamoylamino, alkoxycarbonylamino, aryloxycarbonylamino, alkylthio, arylthio, and heterocyclic sulfinyl groups, more preferably hydrogen and halogen atoms, and alkyl, hydroxyl, alkoxy, aryloxy, acyloxy, amino (including anilino group and heterocyclic amino) and acylamino groups, particularly hydrogen atom, and anilino and acylamino groups. These groups may further have substituents.

Preferred examples of the substituents represented by $R^1$ and $R^2$ include hydrogen atom, alkyl group, halogen atom, alkoxycarbonyl group, carboxyl group, carbamoyl group, hydroxyl group, alkoxy group, and cyano group. These groups may further have substituents. $R^1$ and $R^5$ or $R^5$ and $R^6$ may be connected to each other to form a 5-membered or 6-membered ring.

Examples of the substituents on the substituents represented by A, $R^1$, $R^2$, $R^5$, $R^6$ and G which further have substituents include those described with reference to G, $R^1$ and $R^2$.

When the dye of the present invention is a water-soluble dye, an ionic hydrophilic group is disposed as a substituent in any position on A, $R^1$, $R^2$, $R^5$, $R^6$ and G. Examples of the ionic hydrophilic group as a substituent include sulfo group, carboxyl group, phosphono group, and quaternary ammonium group. Preferred among these ionic hydrophilic groups are carboxyl group, phosphono group, and sulfo group, particularly carboxyl group and sulfo group. The carboxyl group, phosphono group and sulfo group may be in the form of salt. Examples of the counter ion to be used in the formation of such a salt include ammonium ion, alkaline metal ion (e.g., lithium ion, sodium ion, potassium ion), and organic cation (e.g., tetramethylammonium ion, tetramethylguanidium ion, tetramethyl phosphonium).

In the present invention, the aliphatic group indicates an alkyl group, substituted alkyl group, alkenyl group, substituted alkenyl group, alkynyl group, substituted alkynyl group, aralkyl group or substituted aralkyl group. The aliphatic group may have branches or may form a ring. The number of carbon atoms in the aliphatic group is preferably from 1 to 20, more preferably from 1 to 16. The aryl moiety of the aralkyl group and substituted aralkyl group is preferably phenyl or naphthyl, particularly phenyl. Examples of the aliphatic group include methyl, ethyl, butyl, isopropyl, t-butyl, hydroxyethyl, methoxyethyl, cyanoethyl, trifluoromethyl, 3-sulfopropyl, 4-sulfobutyl, cyclohexyl group, benzyl group, 2-phenethyl group, vinyl group, and allyl group.

In the present invention, the aromatic group indicates an aryl group or substituted aryl group. The aryl group is preferably phenyl or naphthyl, particularly phenyl. The number of carbon atoms in the aromatic group is preferably from 6 to 20, more preferably from 6 to 16. Examples of the aromatic group include phenyl, p-tolyl, p-methoxyphenyl, o-chloroophenyl, and m-(3-sulfopropylamino) phenyl.

Examples of the heterocyclic groups include heterocyclic groups having substituents and unsubstituted heterocyclic groups. These heterocyclic groups may be condensed with aliphatic rings, aromatic rings or other heterocyclic groups. The aforementioned heterocyclic group is preferably a 5-membered or 6-membered heterocyclic group. Examples of the aforementioned substituents include aliphatic group, halogen atom, alkylsulfonyl group, arylsulfonyl group, acyl group, acylamino group, sulfamoyl group, carbamoyl group, and ionic hydrophilic group. Examples of the aforementioned heterocyclic groups include 2-pyridyl group, 2-chenyl group, 2-thiazolyl group, 2-benzothiazolyl group, 2-benzoxazolyl group, and 2-furyl group.

Examples of the alkylsulfonyl group and arylsulfonyl group include alkylsulfonyl and arylsulfonyl groups having substituents and unsubstituted alkylsulfonyl and arylsulfonyl groups. Examples of the alkylsulfonyl group include methylsulfonyl group. Examples of the arylsulfonyl group include phenylsulfonyl group.

Examples of the alkylsulfinyl group and arylsulfinyl group include alkylsulfinyl and arylsulfinyl groups having substituents and unsubstituted alkylsulfinyl and arylsulfinyl groups. Examples of the alkylsulfinyl group include methylsulfinyl group. Examples of the arylsulfinyl group include phenylsulfinyl group.

Examples of the acyl group include acryl group having substituents and unsubstituted acyl group. The aforementioned acyl group is preferably a $C_1$–$C_{20}$ acyl group. Examples of the aforementioned substituents include ionic hydrophilic groups. Examples of the aforementioned acyl group include acetyl group and benzoyl group.

Examples of the halogen atom include fluorine atom, chlorine atom, and bromine atom.

Examples of the amino group include amino group substituted by alkyl group, aryl group or heterocyclic group. The alkyl group, aryl group and heterocyclic group may further have substituents. The alkylamino group is preferably a $C_1$–$C_{20}$ alkylamino group. Examples of the aforementioned substituents include ionic hydrophilic groups. Examples of the aforementioned alkylamino group include methylamino group, and diethylamino group.

Examples of the arylamino group include arylamino group having substituents and unsubstituted arylamino group. The aforementioned arylamino group is preferably a $C_6$–$C_{20}$ arylamino group. Examples of the aforementioned substituents include halogen atom, and ionic hydrophilic group. Examples of the aforementioned arylamino group include phenylamino group and 2-chlorophenylamino group.

Examples of the heterocyclic amino group include heterocyclic amino group having substituents and unsubstituted heterocyclic amino group. The aforementioned heterocyclic amino group is preferably a $C_2$–$C_{20}$ heterocyclic amino group. Examples of the aforementioned substituents include alkyl group, halogen atom, and ionic hydrophilic group.

Examples of the alkoxy group include alkoxy group having substituents and unsubstituted alkoxy group. The aforementioned alkoxy group is preferably a $C_1$–$C_{20}$ alkoxy group. Examples of the aforementioned substituents include alkoxy group, hydroxyl group, and ionic hydrophilic group. Examples of the aforementioned alkoxy group include methoxy group, ethoxy group, isopropoxy group, methoxyethoxy group, hydroxyethoxy group, and 3-carboxypropoxy group.

Examples of the aryloxy group include aryloxy group having substituents and unsubstituted aryloxy group. The aforementioned aryloxy group is preferably a $C_6$–$C_{20}$ aryloxy group. Examples of the aforementioned substituents include alkoxy group, and ionic hydrophilic group. Examples of the aforementioned aryloxy group include phenoxy group, p-methoxyphenoxy group, and o-methoxyphenoxy group.

The silyloxy group is preferably a silyloxy group substituted by $C_1$–$C_{20}$ aliphatic or aromatic groups. Examples of the aforementioned silyoxy group include trimethylsilyloxy, and diphenylmethylsilyloxy.

Examples of the heterocyclic oxy group include heterocyclic oxy group having substituents and unsubstituted heterocyclic oxy group. The aforementioned heterocyclic oxy group is preferably a $C_2$–$C_{20}$ heterocyclic oxy group. Examples of the aforementioned substituents include alkyl group, alkoxy group, and ionic hydrophilic group. Examples of the aforementioned heterocyclic oxy group include 3-pyridyloxy group, and 3-chenyloxy group.

Examples of the alkoxycarbonyloxy group include alkoxycarbonyloxy group having substituents and unsubstituted alkoxycarbonyloxy group. The aforementioned alkoxycarbonyloxy group is preferably a $C_2$–$C_{20}$ alkoxycarbonyloxy group. Examples of the aforementioned alkoxycarbonyloxy group include methoxycarbonyloxy group, and isopropoxycarbonyloxy group.

Examples of the aryloxycarbonyloxy group include aryloxycarbonyloxy group having substituents and unsubstituted aryloxycarbonyloxy group. The aforementioned aryloxycarbonyloxy group is preferably a $C_7$–$C_{20}$ aryloxycarbonyloxy group. Examples of the aforementioned aryloxycarbonyloxy group include phenoxycarbonyloxy group.

Examples of the acylamino group include acylamino group having substituents and unsubstituted acylamino group. The aforementioned acylamino group is preferably a $C_2$–$C_{20}$ acylamino group. Examples of the aforementioned substituents include ionic hydrophilic group. Examples of the aforementioned acylamino group include acetylamino group, propionylamino group, benzoylamino group, N-phenylacetylamino group, and 3,5-disulfobenzoylamino group.

Examples of the ureido group include ureido group having substituents and unsubstituted ureido group. The aforementioned ureido group is preferably a $C_1$–$C_{20}$ ureido group. Examples of the aforementioned substituents include alkyl group, and aryl group. Examples of the aforementioned ureido group include 3-methylureido group, 3,3-dimethylureido group, and 3-phenylureido group.

Examples of the sulfamoylamino group include sulfamoylamino group having substituents and unsubstituted sulfamoylamino group. Examples of the substituents include alkyl group. Examples of the aforementioned sulfamoylamino group include N,N-dipropylsulfamoylamino group.

Examples of the alkoxycarbonylamino group include alkoxycarbonylamino group having substituents and unsubstituted alkoxycarbonylamino group. The aforementioned alkoxycarbonylamino group is preferably a $C_2$–$C_{20}$ alkoxycarbonylamino group. Examples of the aforementioned substituents include ionic hydrophilic group. Examples of the aforementioned alkoxycarbonylamino group include ethoxycarbonylamino group.

Examples of the alkylsulfonylamino group and arylsulfonylamino group include alkylsulfonylamino group and arylsulfonylamino group having substituents and unsubstituted alkylsulfonylamino group and arylsulfonylamino group. The aforementioned sulfonylamino group is preferably a $C_1$–$C_{20}$ sulfonylamino group. Examples of the aforementioned substituents include ionic hydrophilic group. Examples of the aforementioned sulfonylamino group include methylsulfonylamino group, N-phenylmethylsulfonylamino group, phenylsulfonylamino group, and 3-carboxyphenylsulfonylamino group.

Examples of the carbamoyl group include carbamoyl group having substituents and unsubstituted carbamoyl group. Examples of the substituents include alkyl group. Examples of the aforementioned carbamoyl group include methyl carbamoyl group, and dimethyl carbamoyl group.

Examples of the sulfamoyl group include sulfamoyl group having substituents and unsubstituted sulfamoyl group. Examples of the substituents include alkyl group. Examples of the aforementioned sulfamoyl group include dimethyl sulfamoyl group, and di-(2-hydroxyethyl)sulfamoyl group.

Examples of the alkoxycarbonyl group include alkoxycarbonyl group having substituents and unsubstituted alkoxycarbonyl group. The aforementioned alkoxycarbonyl group is preferably a $C_2$–$C_{20}$ alkoxycarbonyl group. Examples of the substituents include ionic hydrophilic group. Examples of the aforementioned alkoxycarbonyl group include methoxycarbonyl group, and ethoxycarbonyl group.

Examples of the acyloxy group include acyloxy group having substituents and unsubstituted acyloxy group. The aforementioned acyloxy group is preferably a $C_1$–$C_{20}$ acyloxy group. Examples of the aforementioned substituents include ionic hydrophilic group. Examples of the aforementioned acyloxy group include acetoxy group, and benzoyloxy group.

Examples of the carbamoyloxy group include carbamoyloxy group having substituents and unsubstituted carbamoyloxy group. Examples of the aforementioned substituents include alkyl group. Examples of the aforementioned carbamoyloxy group include N-methyl carbamoyloxy group.

Examples of the aryloxycarbonyl group include aryloxycarbonyl group having substituents and unsubstituted aryloxycarbonyl group. The aforementioned aryloxycarbonyl group is preferably a $C_7$–$C_{20}$ aryloxycarbonyl group. Examples of the aforementioned substituents include ionic hydrophilic group. Examples of the aforementioned aryloxycarbonyl group include phenoxycarbonyl group.

Examples of the aryloxycarbonylamino group include aryloxycarbonylamino group having substituents and unsubstituted aryloxycarbonylamino group. The aforementioned aryloxycarbonylamino group is preferably a $C_7$–$C_{20}$ aryloxycarbonylamino group. Examples of the aforementioned substituents include ionic hydrophilic group. Examples of the aforementioned aryloxycarbonylamino group include phenoxycarbonylamino group.

Examples of the alkyl, aryl and heterocyclic thio groups include alkyl, aryl and heterocyclic thio groups having substituents and unsubstituted alkyl, aryl and heterocyclic thio groups. The aforementioned alkyl, aryl and heterocyclic thio groups are preferably $C_1$–$C_{20}$ alkyl, aryl and heterocyclic thio groups. Examples of the aforementioned substituents include ionic hydrophilic group. Examples of the aforementioned alkyl, aryl and heterocyclic thio groups include methylthio group, phenylthio group, and 2-pyridylthio group.

Examples of the heterocyclic oxycarbonyl group include heterocyclic oxycarbonyl group having substituents and unsubstituted heterocyclic oxycarbonyl group. The aforementioned heterocyclic oxycarbonyl group is preferably a $C_2$–$C_{20}$ heterocyclic oxycarbonyl group. Examples of the aforementioned substituents include ionic hydrophilic group. Examples of the aforementioned heterocyclic oxycarbonyl group include 2-pyridyloxycarbonyl group.

Examples of the heterocyclic sulfonylamino group include heterocyclic sulfonylamino group having substituents and unsubstituted heterocyclic sulfonylamino group. The aforementioned heterocyclic sulfonylamino group is preferably a $C_1$–$C_{12}$ heterocyclic sulfonylamino group. Examples of the aforementioned substituents include ionic hydrophilic group. Examples of the aforementioned heterocyclic sulfonylamino group include 2-thiophenesulfonylamino group, and 3-pyridinesulfonylamino group.

Examples of the heterocyclic sulfonyl group include heterocyclic sulfonyl group having substituents and unsubstituted heterocyclic sulfonyl group. The aforementioned heterocyclic sulfonyl group is preferably a $C_1$–$C_{20}$ heterocyclic sulfonyl group. Examples of the aforementioned substituents include ionic hydrophilic group. Examples of the aforementioned heterocyclic sulfonyl group include 2-thiophenesulfonyl group, and 3-pyridinesulfonyl group.

Examples of the heterocyclic sulfinyl group include heterocyclic sulfinyl group having substituents and unsubstituted heterocyclic sulfinyl group. The aforementioned heterocyclic sulfinyl group is preferably a $C_1$–$C_{20}$ heterocyclic sulfinyl group. Examples of the aforementioned substituents include ionic hydrophilic group. Examples of the aforementioned heterocyclic sulfinyl group include 4-pyridinesulfinyl group.

In the present invention, the dye represented by the general formula (M-I) is preferably one represented by the following general formula (M-II):

General Formula (M-II)

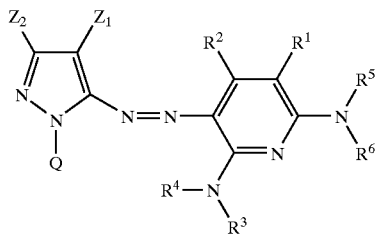

In the general formula (M-II), $Z_1$ represents an electron-withdrawing group having a Hammett's substituent constant σp of not smaller than 0.20, preferably not smaller than 0.30, more preferably not smaller than 0.45, particularly not smaller than 0.60, but preferably not greater than 1.0. Specific preferred examples of the substituents include electron-withdrawing groups described later. Preferred among these electron-withdrawing groups are $C_2$–$C_{20}$ acyl group, $C_2$–$C_{20}$ alkyloxycarbonyl group, nitro group, cyano group, $C_1$–$C_{20}$ alkylsulfonyl group, $C_6$–$C_{20}$ arylsulfonyl group, $C_1$–$C_4$ carbamoyl group, and $C_1$–$C_{20}$ halogenated alkyl group. Particularly preferred among these electron-withdrawing groups are cyano group, $C_1$–$C_{20}$ alkylsulfonyl group, and $C_6$–$C_{20}$ arylsulfonyl group. Mostly preferred among these electron-withdrawing groups is cyano group.

$R^1$, $R^2$, $R^5$ and $R^6$ are as defined in the general formula (M-I). $R^3$ and $R^4$ each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Preferred among these groups are hydrogen atom, aromatic group, heterocyclic group, acyl group, alkylsulfonyl group, and arylsulfonyl group. Particularly preferred among these groups are hydrogen atom, aromatic group, and heterocyclic group. $Z_2$ represents a hydrogen atom, aliphatic group, aromatic group or heterocyclic group. Q represents a hydrogen atom, aliphatic group, aromatic group or heterocyclic group. Q is preferably a group formed by non-metallic atom groups required to form a 5- to 8-membered ring. The aforementioned 5- to 8-membered ring may be substituted, may be a saturated ring or may have unsaturated bonds. Particularly preferred among the groups represented by Q are aromatic group, and heterocyclic group. Preferred examples of the non-metallic atom include nitrogen atom, oxygen atom, sulfur atom, and carbon atom. Specific examples of such a cyclic structure include benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzoxazole ring, thiazole ring, benzothiazole ring, oxane ring, sulfolane ring, and thiane ring.

The groups described in the general formula (M-II) may further have substituents. In the case where these groups further have substituents, examples of these substituents include those described with reference to the general formula (M-I), and groups and ionic hydrophilic groups exemplified with reference to G, $R^1$ and $R^2$.

Examples of the electron-withdrawing group having a Hammett's substituent constant σp of not smaller than 0.60 include cyano group, nitro group, and alkylsulfonyl group such as methanesulfonyl group and arylsulfonyl group (e.g., benzenesulfonyl).

Examples of the electron-withdrawing group having a Hammett's substituent constant σp of not smaller than 0.45 include acyl group (e.g., acetyl), alkoxycarbonyl group (e.g., dodecyloxycarbonyl), acryloxycarbonyl group (e.g., m-chlorophenoxycarbonyl), alkylsulfinyl group (e.g., n-propylsulfinyl), arylsulfinyl group (e.g., phenylsulfinyl), sulfamoyl group (e.g., N-ethylsulfamoyl, N,N-dimethylsulfamoyl), and halogenated alkyl group (e.g., trifluoromethyl) besides the aforementioned groups.

Examples of the electron-withdrawing group having a Hammett's substituent constant σp of not smaller than 0.30 include acyloxy group (e.g., acetoxy), carbamoyl group (e.g., N-ethylcarbamoyl, N,N-dibutylcarbamoyl), halogenated alkoxy group (e.g., trifluoromethyloxy), halogenated aryloxy group (e.g., pentafluorophenyloxy), sulfonyloxy group (e.g., methylsulfonyloxy), halogenated alkylthio group (e.g., difluoromethylthio), aryl group substituted by two or more electron-withdrawing groups having σp of not smaller than 0.15 (e.g., 2,4-dinitrophenyl, pentachlorophenyl), and heterocyclic group (e.g., 2-benzoxazolyl, 2-benzothiazolyl, 1-phenyl-2-benzimidazolyl) besides the aforementioned groups. Specific examples of the electron-withdrawing group having σp of not smaller than 0.20 include halogen atom besides the aforementioned groups.

Particularly preferred combinations of $R^5$ and $R^6$ for the azo dye represented by the general formula (M-I) are hydrogen atom, alkyl group, aryl group, heterocyclic group, sulfonyl group and acyl group, more preferably hydrogen atom, aryl group, heterocyclic group and sulfonyl group, most preferably hydrogen atom, aryl group and heterocyclic group. However, $R^5$ and $R^6$ are not a hydrogen atom at the same time.

G is preferably a hydrogen atom, halogen atom, alkyl group, hydroxyl group, amino group or acylamino group, more preferably a hydrogen atom, halogen atom, amino group or acylamino group, even more preferably a hydrogen atom, amino group or acrylamino group.

Preferred among the groups represented by A are pyrazole ring, imidazole ring, isothiazole ring, thiadiazole ring, and benzothiazole ring, more preferably pyrazole ring, and isothiazole ring, most preferably pyrazole ring.

$B^1$ and $B^2$ each are —CR$^1$= and —CR$^2$=, respectively. $R^1$ and $R^2$ each preferably are a hydrogen atom, alkyl group, halogen atom, cyano group, carbamoyl group, carboxyl group, hydroxyl group, alkoxy group or alkoxycarbonyl group, more preferably hydrogen atom, alkyl group, carboxyl group, cyano group or carbamoyl group.

Yellow Dye

The yellow dye of the present invention is preferably one represented by the general formula (Y-I):

General Formula (Y-I)

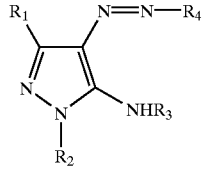

wherein $R_1$ and $R_3$ each represent a hydrogen atom, cyano group, alkyl group, cycloalkyl group, aralkyl group, alkoxy group, alkylthio group, arylthio group, aryl group or ionic hydrophilic group; $R_2$ represents a hydrogen atom, alkyl group, cycloalkyl group, aralkyl group, carbamoyl group, acyl group, aryl group or heterocyclic group; and $R_4$ represents a heterocyclic group.

The dye represented by the general formula (Y-1), if used in the form of water-soluble dye, preferably has at least one ionic hydrophilic group per molecule. Examples of the dye represented by the general formula (Y-I) include those represented by the general formula (Y-I) wherein $R_1$, $R_2$ and $R_3$ each are a ionic hydrophilic group, and those represented by the general formula (Y-I) wherein $R_1$ to $R_2$ each have an ionic hydrophilic group as a substituent. Examples of the ionic hydrophilic group include sulfo group, carboxyl group, phosphono group, and quaternary ammonium group. Preferred among these ionic hydrophilic groups are carboxyl group, phosphono group, and sulfo group. Particularly preferred among these ionic hydrophilic groups are carboxyl group, and sulfo group. The carboxyl group, phosphono group and sulfo group may be in the form of salt or hydrate. Examples of the counter ion to be used in the formation of such a salt include ammonium ion, alkaline metal ion (e.g., lithium ion, sodium ion, potassium ion), and organic cation (e.g., tetramethylammonium ion, tetramethylguanidium ion, tetramethyl phosphonium ion). Preferred among these counter ions is alkaline metal salt.

Cyan Dye

Preferred examples of the cyan dye include a dye represented by the following general formula (C-I):

General Formula (C-I)

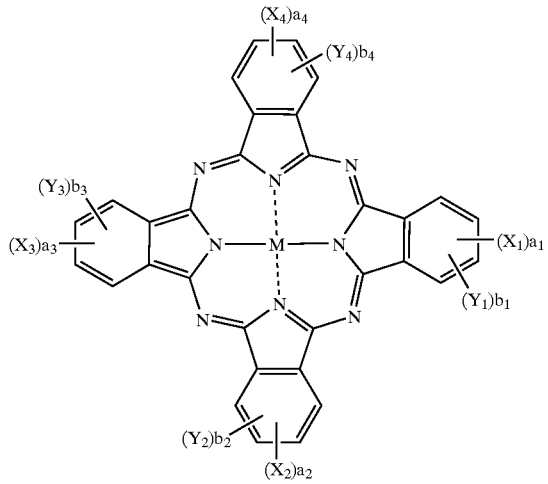

In the general formula (C-I), $X_1$, $X_2$, $X_3$ and $X_4$ independently represent electron attracting groups with σp of no less than 0.40. $Y_1$, $Y_2$, $Y_3$, and $Y_4$ independently represent monovalent substituents. M represents hydrogen atom, metal element or oxide, hydroxide, or halide thereof. $a_1$–$a_4$, $b_1$–$b_4$ represent the number of $X_1$–$X_4$ and $Y_1$–$Y_4$ substituents, respectively, $a_1$–$a_4$ independently represent integers from 0 to 4, and $b_1$–$b_4$ independently represent integers from 0 to 4. The sum of $a_1$–$a_4$ is no less than 2, preferably, no less than 3, and it is especially preferred that $a_1=a_2=a_3=a_4=1$. When the dye is a water-soluble dye, an ionic hydrophilic group is preferably further present as a substituent in any position on $X_1$, $X_2$, $X_3$, $X_4$, $Y_1$, $Y_2$, $Y_3$, and $Y_4$. Examples of suitable ionic hydrophilic groups serving as substituents include sulfo group, carboxyl group, phosphono group, quaternary ammonium salt, and the like.

Among the phthalocyanine dies represented by the general formula (C-I), phthalocyanine dyes with a structure represented by the general formula (C-II) are especially preferred. Phthalocyanine dies represented by the general formula (C-II) in accordance with the present invention will be described below in greater detail.

General Formula (C-II)

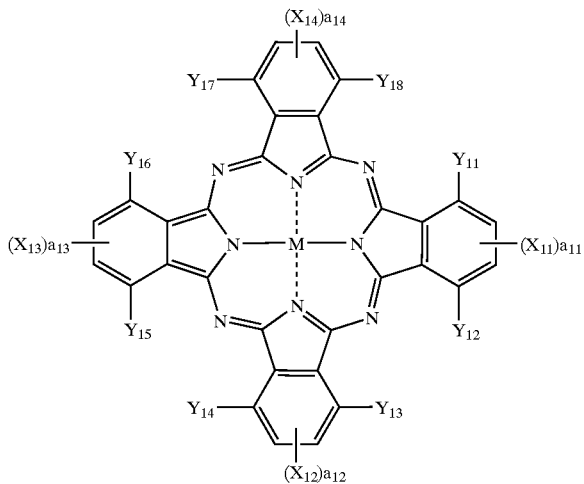

In the general formula (C-II), $X_{11}$–$X_{14}$ independently represent —SO-Z, —SO$_2$-Z, —SO$_2$NR$_1$R$_2$, sulfo group, —CONR$_1$R$_2$, or —CO$_2$R$_1$. $Y_{11}$–$Y_{18}$ independently represent monovalent substituents. M represents hydrogen atom, metal element or oxide, hydroxide, or halide thereof, $a_{11}$–$a_{14}$ represent the number of $X_{11}$–$X_{14}$ groups, respectively; they independently represent integers of 1 or 2.

Z independently represent substituted or non-substituted alkyl groups, substituted or non-substituted cycloalkyl groups, substituted or non-substituted alkenyl groups, substituted or non-substituted aralkyl groups, substituted or non-substituted aryl groups, and substituted or non-substituted heterocyclic groups. $R_1$, $R_2$ independently represent hydrogen atom, substituted or non-substituted alkyl group, substituted or non-substituted cycloalkyl group, substituted or non-substituted alkenyl group, substituted or non-substituted aralkyl group, substituted or non-substituted aryl group, and substituted or non-substituted heterocyclic group.

In the general formula (C-II), $a_{11}$–$a_{14}$ independently represent integers of 1 or 2. It is preferred that $4 \leq a_{11}+a_{12}+a_{13}+a_{14} \leq 6$, and it is especially preferred that among them: $a_{11}=a_{12}=a_{13}=a_{14}$.

$X_{11}$, $X_{12}$, $X_{13}$, and $X_{14}$ may be identical substituents, or they may be substituents of the same type which are partially different from each other, as in the case when $X_{11}$, $X_{12}$, $X_{13}$, and $X_{14}$ are all —SO$_2$-Z, but Z differs between the groups, or they may be mutually different substituents as, for example, in the case when —SO$_2$-Z and —SO$_2$NR$_3$R$_2$ are used as substituents at the same time.

The combinations of substituents which are especially preferred in the phthalocyanine dyes represented by the general formula (C-II) are presented below.

Thus, —SO-Z, —SO$_2$-Z, —SO$_2$NR$_1$R$_2$, or —CONR$_1$R$_2$ are independently preferred as $X_{11}$–$X_{14}$, —SO$_2$-Z and —SO$_2$NR$_1$R$_2$ are especially preferred, and —SO$_2$-Z is most preferred.

Z are preferably substituted or non-substituted alkyl groups, substituted or non-substituted aryl groups, and substituted or non-substituted heterocyclic groups, being independent from each other. Among them, substituted alkyl groups, substituted aryl groups, and substituted heterocyclic groups are especially preferred. In particular, for the purpose of increasing solubility of the dye and ink stability, it is preferred that asymmetrical carbon be present in the substituents (usage in racemic modification). Furthermore, for the purpose of raising associative ability and increasing fastness, it is preferred that a hydroxy group, ether group, ester group, cyano group, amido group, sulfonamido group be present in the substituents.

$R_1$, $R_2$ are preferably hydrogen atoms, substituted or non-substituted alkyl groups, substituted or non-substituted aryl groups, and substituted or non-substituted heterocyclic groups, being independent from each other. Among them, hydrogen atoms, substituted alkyl groups, substituted aryl groups, and substituted heterocyclic groups are especially preferred. However, it is not preferred that both $R_1$ and $R_2$ be hydrogen atoms. In particular, for the purpose of increasing solubility of the dye and ink stability, it is preferred that asymmetrical carbon be present in the substituents (usage in racemic modification). Furthermore, for the purpose of raising associative ability and increasing fastness, it is preferred that hydroxy group, ether group, ester group, cyano group, amido group, sulfonamido group be present in the substituents.

$Y_{11}$–$Y_{18}$ are preferably hydrogen atoms, halogen atoms, alkyl groups, aryl groups, cyano groups, alkoxy groups, amido groups, ureido groups, sulfonamido groups, carbamoyl groups, sulfamoyl groups, alkoxycarbonyl groups, carboxyl groups, and sulfo groups, more preferably hydrogen atoms, halogen atoms, cyano group, carboxyl groups, and sulfo groups, and most preferably hydrogen atoms. It is preferred that $a_{11}$–$a_{14}$ be 1 or 2, independently from each other, and it is especially preferred than all of them be 1. M represents hydrogen atom or metal element or oxide, hydroxide, or halide thereof. It is especially preferred that M is Cu, Ni, Zn, and Al; among them, Cu is especially preferred.

When phthalocyanine dyes represented by the general formulas (C-I) or (C-II) are soluble in water, it is preferred that they contain ionic hydrophilic groups. Examples of suitable ionic hydrophilic groups include sulfo group, carboxyl group, phosphono group, and quaternary ammonium group. Carboxyl group, phosphono group, and sulfo group are the preferred ionic hydrophilic groups and carboxyl group and sulfo group are especially preferred. Carboxyl group, phosphono group, and sulfo group may be in the state of salts. Examples of counterions forming the salts include ammonium ion, alkali metal ions (for example, lithium ion, sodium ion, potassium ion) and organic cations (for example, tetramethyl ammonium ion, tetramethyl guanidium ion, tetramethyl phosphonium). Among the counterions, alkali metal salts are preferred, and lithium salts are especially preferred for increasing solubility of the dyes and raising ink stability.

It is preferred that at least no less than two ionic hydrophilic groups be present in one molecule of a phthalocyanine dye. It is especially preferred that at least no less than two sulfo groups and/or carboxyl groups be present.

As for the combinations of preferred substituents in the compounds represented by the general formula (C-II), in the preferred compound at least one of a variety of substituents is the above-described preferred substituent. The compounds in which a larger number of substituents are the preferred groups are more preferred, and the compounds in which all the substituents are the preferred groups are most preferred.

In the chemical structure of phthalocyanine dyes preferably used in accordance with the present invention, electron attracting groups such as sulfinyl group, sulfonyl group, and sulfamoyl group are preferably introduced at a ratio of one group per each of four benzene rings of phthalocyanine so that the total σp value of substituents in the entire phthalocyanine skeleton becomes no less than 1.6.

Phthalocyanine derivatives represented by the general formula (C-I) are usually mixtures of analogs in which positions and numbers of introduced substituents Xn (n=1–4) and Ym (m=1–4) unavoidably differ depending on the synthesis method. Therefore, the general formula most often represents a statistically averaged mixture of those analogs. In accordance with the present invention, it was discovered that if those analog mixtures are classified into the three below-described types, then a specific mixture is especially preferred. Thus, phthalocyanine dye analog mixtures represented by the general formulas (C-I) and (C-II) are classified into and defined as the following three classes, based on the substitution position.

(1) β-position substitution class: phthalocyanine dyes comprising specific substituents in 2 and/or 3 position, 6 and/or 7 position, 10 and/or 11 position, and 14 and/or 15 position.

(2) α-position substitution class: phthalocyanine dyes comprising specific substituents in 1 and/or 4 position, 5 and/or 8 position, 9 and/or 12 position, and 13 and/or 16 position.

(3) α, β-position mixed substitution class: phthalocyanine dyes comprising specific substituents in 1–16 positions, without specific order.

In the present specification, the above-described β-position substitution class, α-position substitution class, and α,β-position mixed substitution class are used for explaining the derivatives of phthalocyanine dyes with different structures (in particular, with different substitution positions).

Phthalocyanine derivatives used in accordance with the present invention can be synthesized by combining methods described and cited in Shiroi, Kobayashi (published by IPC Co.) "Phthalocyanines—Chemistry and Functions" (p. 1–62), C. C. Leznoff, A. B. P. Lever (published by VCH) "Phthalocyanines—Properties and Applications" (p. 1–54) and methods similar thereto.

Phthalocyanine compounds represented by the general formula (C-I) in accordance with the present invention can be synthesized via sulfonation, sulfonyl chloridation, and amidation, for example, of non-substituted phthalocyanine compounds, as described in WO 00/17275, 00/08103, 00/08101, and 98/41853 and JP-A No. 10-36471. In this case, the number of sulfonated positions is difficult to control because sulfonation can occur in any position on the phthalocyanine nucleus. Therefore, when the sulfo groups are introduced under such reaction conditions, the position and number of sulfo groups introduced into the product are not specified and mixtures with different numbers of substituents or substitution positions are always obtained. Therefore, when the compound in accordance with the present invention is synthesized by using such mixtures as starting materials, the number and substitution position of heterocyclic substituted sulfamoyl groups are not specified. As a result, mixtures of α,β-position mixed substitution types which contain any classes of compounds with different numbers of substituents and substitution positions are obtained as the compounds in accordance with the present invention.

As described above, if a large number of electron attracting groups, for example, such as sulfamoyl group are introduced into phthalocyanine nucleus, the oxidation potential is raised and ozone resistance is increased. If the above-described synthesis methods are followed, the phthalocyanine dyes with a small number of introduced electron attracting groups, that is, with a lower oxidation potential, are inevitably admixed. Therefore, in order to increase ozone resistance, it is more preferred to use a synthesis method which suppresses the formation of compounds with a lower oxidation potential.

By contrast, phthalocyanine compounds represented by the general formula (C-II) in accordance with the present invention are obtained by reacting, for example, phthalonitride derivatives (compounds P) and/or diiminoisoindoline derivatives (compounds Q) represented by the following formulas with the metal derivatives represented by the general formula (C-III). Alternatively, they can be derived from tetrasulfophthalocyanine compounds obtained by reacting 4-sulfophthalic acid derivatives (compounds R) represented by the following formula with the metal derivatives represented by the general formula (C-III).

Compound P

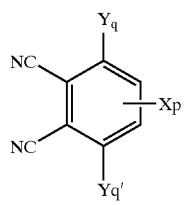

Compound Q

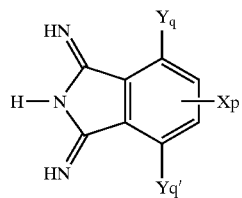

Compound R

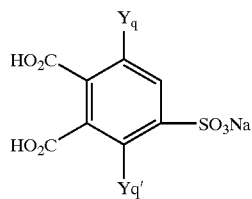

In the formulas above, Xp is equivalent to $X_1$, $X_2$, $X_3$, or $X_4$ in the general formula (C-II). Furthermore, Yq, Yq' are equivalent to $Y_{11}$, $Y_{12}$, $Y_{13}$, $Y_{14}$, $Y_{15}$, $Y_{16}$, $Y_{17}$, or $Y_{18}$ in the general formula (C-II). M' represents a cation.

M-(Y)d                                          General formula (C-III)

In the general formula (C-III), M is identical to M of the general formula (C-II), Y indicates a monovalent or divalent ligand such as halogen atom, acetic acid anion, acetyl acetonate, oxygen, and the like; d is integer from 1 to 4.

Thus, if the above-described synthesis method is followed, only a specific number of the desired substituents can be introduced. In particular, when a large number of electron attracting groups are desired to be introduced in order to raise the oxidation potential in accordance with the present invention, the above-described synthesis method is greatly superior to the synthesis method according to the general formula (C-I).

Phthalocyanine compounds represented by the general formula (C-II) which are thus obtained are usually of β-position substitution type, that is, the mixtures of compounds represented by the following general formulas (a)-1~(a)-4, which are isomers with different Xp substitution positions.

General formula (a)-1

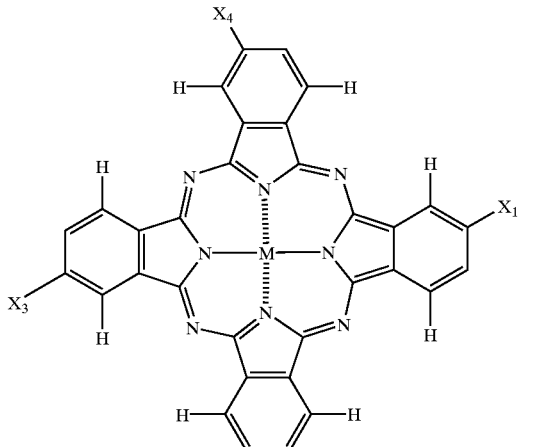

General formula (a)-2

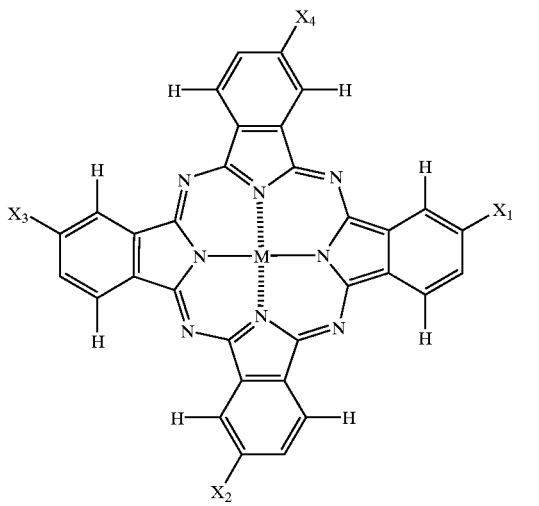

General formula (a)-3

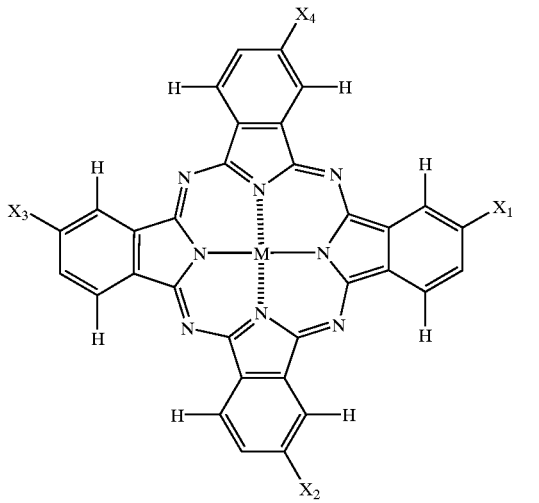

General formula (a)-4

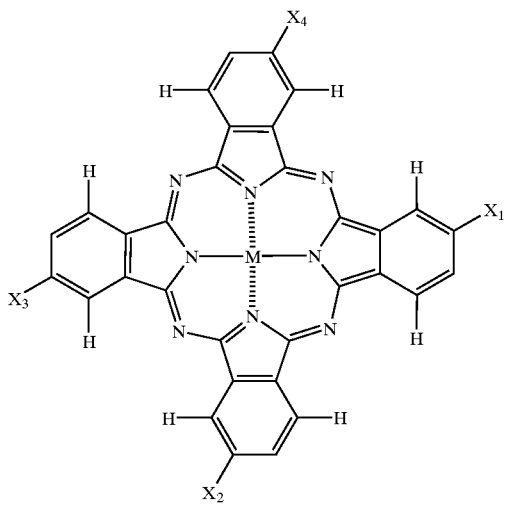

If the identical groups are used as all Xp in the above-described synthesis method, then a phthalocyanine dye of β-position substitution type can be obtained in which all the $X_{11}$, $X_{12}$, $X_{13}$, and $X_{14}$ are identical substituents. On the other hand, if different groups are combined and used as Xp, then dyes comprising substituents of the same type, but partially different from each other, or dyes comprising substituents of mutually different types can be synthesized. Among the dyes of the general formula (C-II), those dyes that comprise mutually different electron attracting substituents are especially preferred because solubility of the dye, association ability, and stability of inks with time can be adjusted.

Within the framework of the present invention, it was discovered that with all substitution types, an oxidation potential higher than 0.8V (vs. SCE) is very important for increasing fastness, and the degree of this effect could not be predicted in any way from the point of view of the conventional technology. Further, among the above-mentioned substitution types, the β-position substitution type was clearly superior to the α,β-position mixed substitution type in terms of hue, color fastness, ozone gas resistance, and the like, specific reasons therefor being unclear.

Phthalocyanine dyes represented by the general formulas (C-I) and (C-II) can be synthesized following the specifications of the above-mentioned patents and such synthesis can be conducted by the methods described in Japanese Patent Applications Nos. 2001-226275, 2001-96610, 2001-47013, and 2001-193638. Further, starting materials, dye intermediates, and synthesis routes are not limited thereto.

The specific feature of magenta dyes and cyan dyes used in accordance with the present invention is that the oxidation potential is higher than 0.8 V. However, because phthalocyanine that has been widely used as a cyan dye forms associations, fastness can be compensated despite a rather low oxidation potential, whereas because magenta dye forms no associations, the oxidation potential is preferably set higher than that of the cyan dye to increase fastness.

The preferred examples of dyes that can be used in accordance with the present invention are presented below those examples are employed to explain the present invention in greater detail and place no limitation thereon.

First, specific examples [Y-1~Y-35] of yellow dyes that can be used in accordance with the present invention are presented.

Y-1

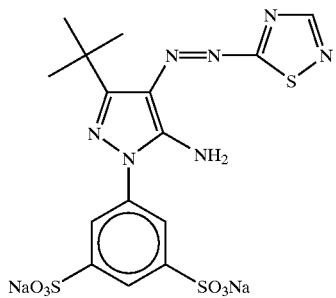

Y-2

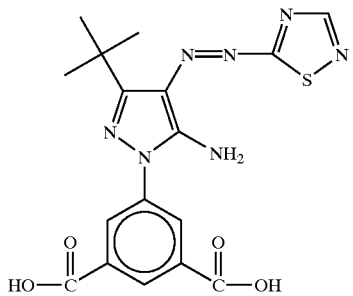

-continued
Y-3
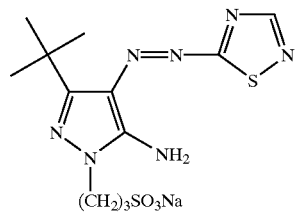
Y-4
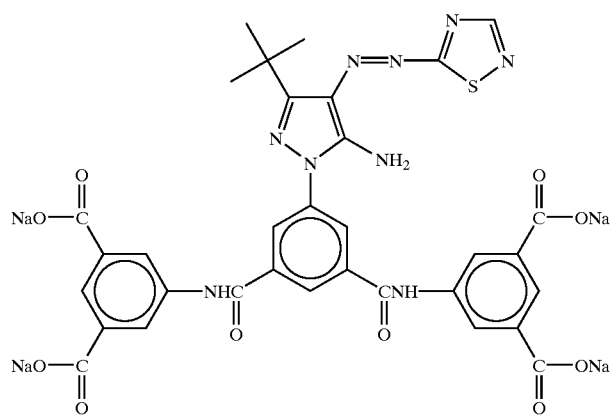
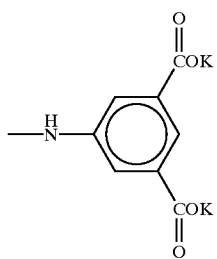
| Compound No. | R¹ | R² |
|---|---|---|
| Y-5 | 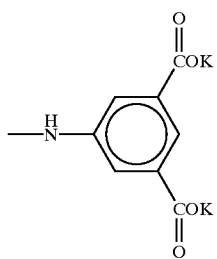 | 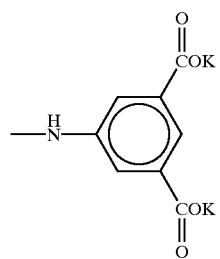 |
| Y-6 | —NH(CH₂)₂SO₃Li | —NH(CH₂)₂SO₃Li |
| Y-7 | 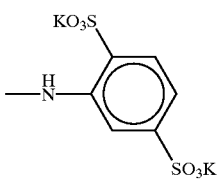 | |

-continued
| | | |
|---|---|---|
| Y-8 | 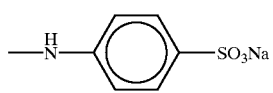 | 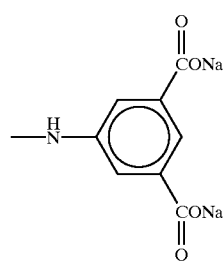 |
| Y-9 | —NH(CH$_2$)$_2$SO$_3$Li  | 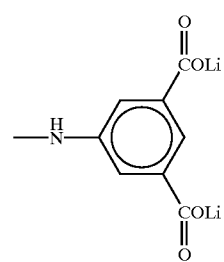 |
| Y-10 | 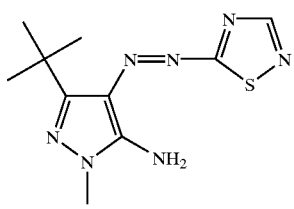 | 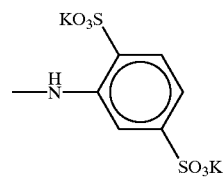 |
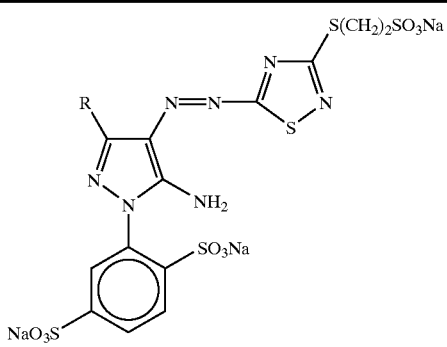
| Y-11 | R = —S(CH$_2$)$_2$SO$_3$Na |
|---|---|
| Y-12 | R = —Me |
| Y-13 | R = —H |
| Y-14 | R = —Ph |
| Y-15 | R = —Ph |
|---|---|
| Y-16 | R = —OC$_2$H$_5$ |

-continued
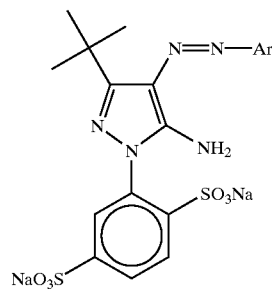
Y-17 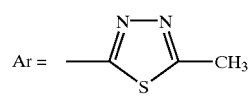
Y-18 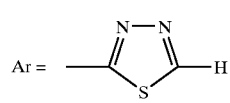
Y-19 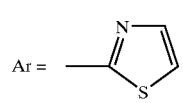
Y-20 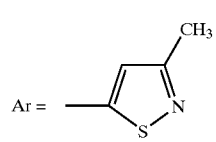
Y-21 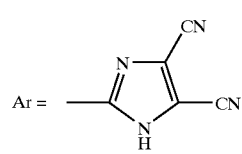
Y-22 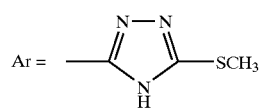
Y-23 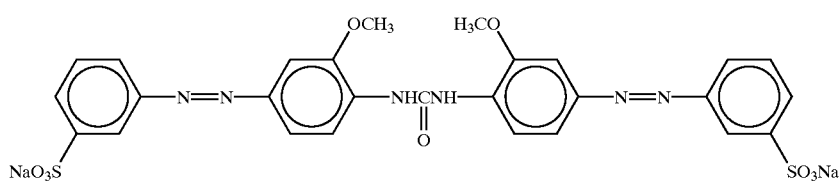
Y-24 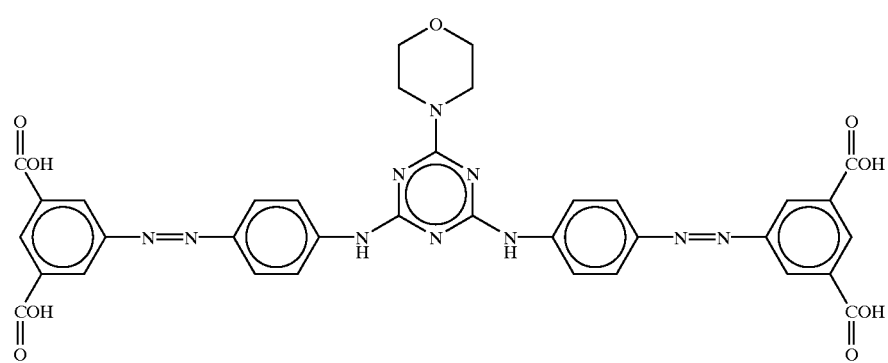

-continued
Y-25
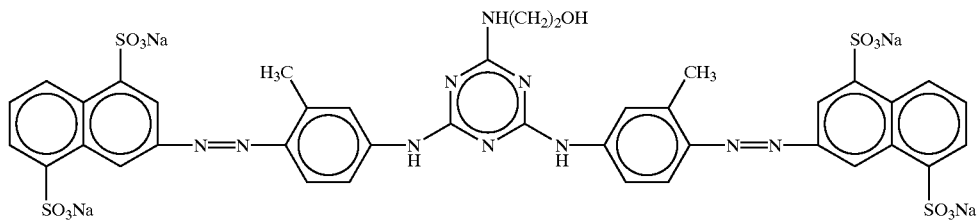
Y-26
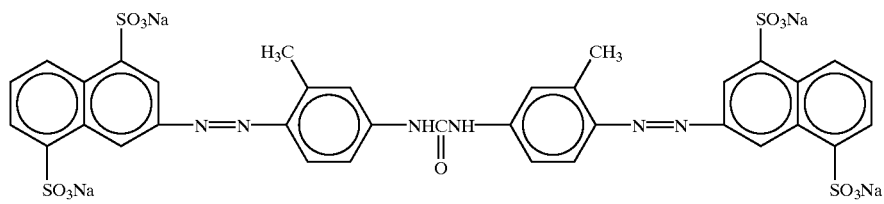
Y-27
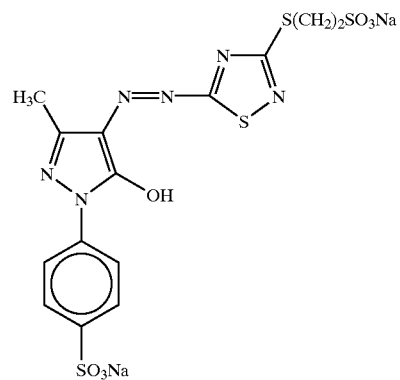
Y-28
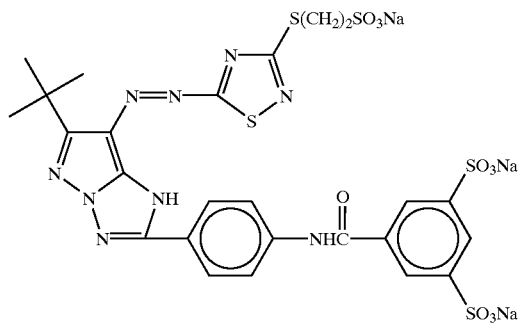
Y-29
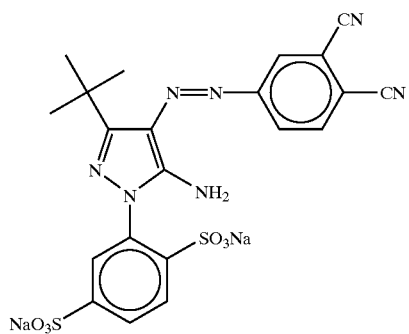

-continued
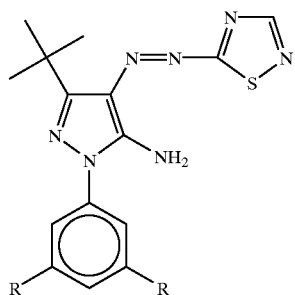
| Y-30 | R = —CON(C₄H₉)₂ |
| Y-31 | R = —CO₂C₈H₁₇ |
Y-32
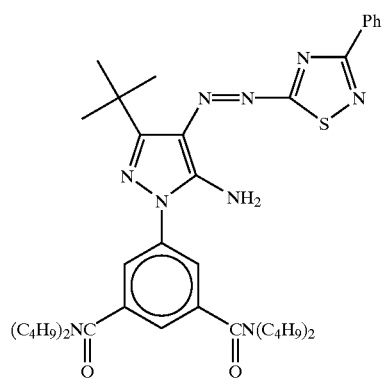
Y-33
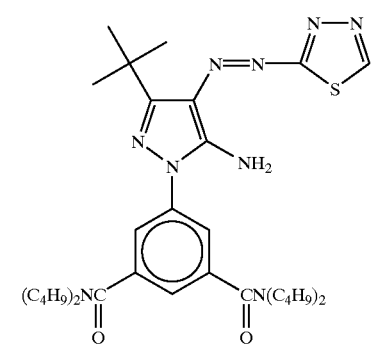
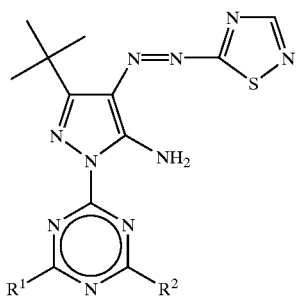
Y-34  $R^1, R^2 = $ —NHCH₂CH(C₄H₉)(C₂H₅)

Y-35
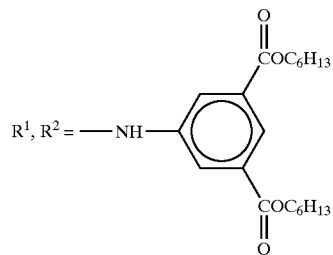
R¹, R² = —NH—⟨benzene with COC₆H₁₃ groups⟩
Specific examples [M-1~M-26] of magenta dyes that can be used in accordance with the present invention are presented below.
M-1
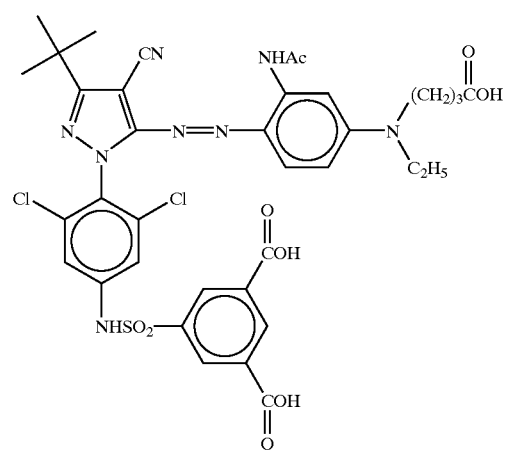
M-2
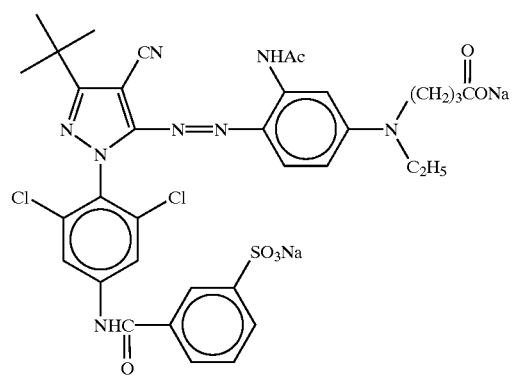

-continued
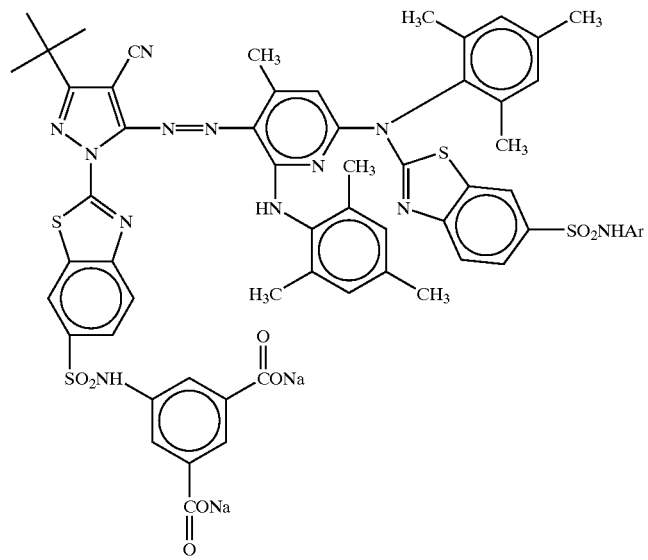
M-3
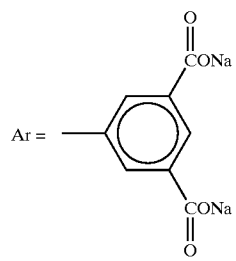
M-4
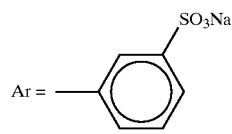
M-5
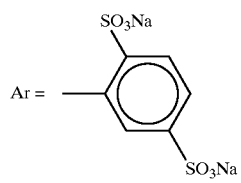
M-6
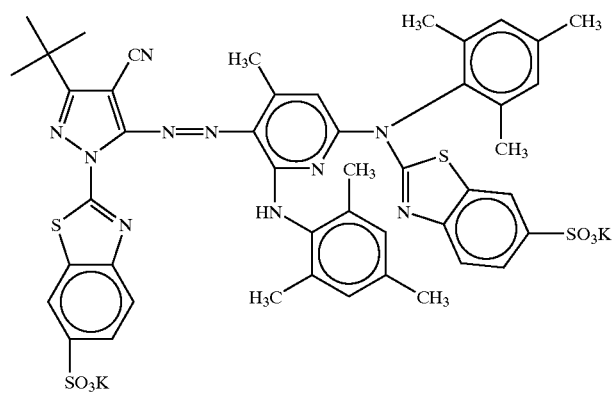

-continued
M-7
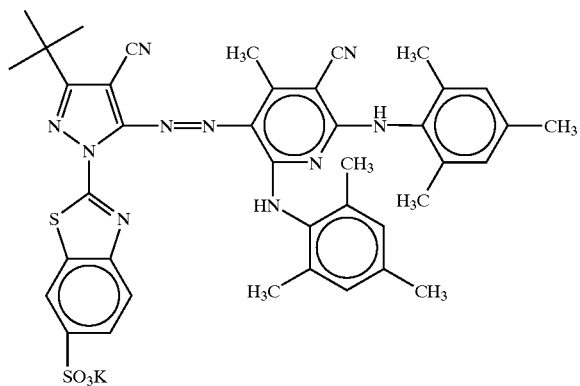
M-8
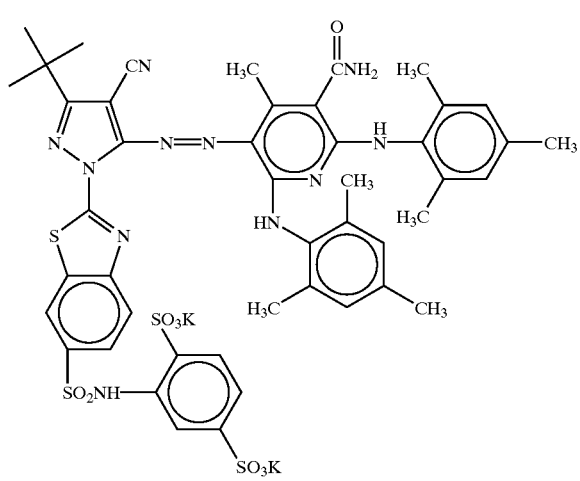
M-9
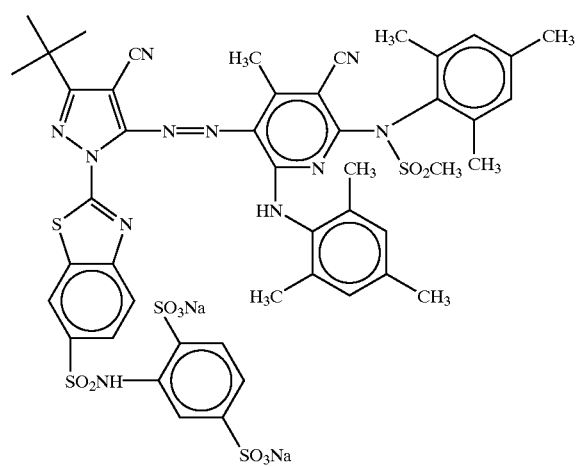

-continued

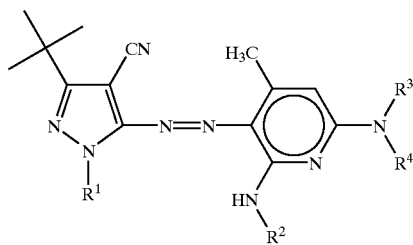

| Compound No. | R¹ | R² | R³ | R⁴ |
|---|---|---|---|---|
| M-10 | 2-methylbenzothiazol-6-yl-SO₃K | 2,3,5-trimethyl-6-SO₃K-phenyl | 2-methylbenzothiazol-6-yl-SO₃K | 2,3,5-trimethyl-6-SO₃K-phenyl |
| M-11 | 2-methylbenzothiazol-6-yl-SO₃Na | 2,4-dimethyl-5-SO₃Na-phenyl | 2-methylbenzothiazol-6-yl-SO₃Na | 2,4-dimethyl-5-SO₃Na-phenyl |
| M-12 | 2-methylbenzothiazol-2-yl | 2,3,5-trimethyl-4-SO₃K-phenyl | 2-methylbenzothiazol-2-yl | 2,3,5-trimethyl-4-SO₃K-phenyl |
| M-13 | 2-methyl-6-chlorobenzothiazol-2-yl | 2-OCH₃-4-methyl-5-SO₃K-phenyl | 2-methylbenzothiazol-6-yl-SO₃K | 2-OCH₃-4-methyl-5-SO₃K-phenyl |
| M-14 | 2-methyl-6-nitrobenzothiazol-2-yl | 2-methyl-4-SO₃K-phenyl | 2-methylbenzothiazol-6-yl-SO₃K | 2-OCH₃-4-methyl-5-SO₃K-phenyl |
| M-15 | 2-methylbenzothiazol-2-yl | 2,3,5-trimethyl-6-SO₃K-phenyl | 2-methylbenzothiazol-2-yl | 2,3,5-trimethyl-6-SO₃K-phenyl |
| M-16 | 2-methylbenzothiazol-2-yl | 2,3,5-trimethyl-6-SO₃Na-phenyl | 2-methylbenzothiazol-6-yl-SO₃Na | 2,3,5-trimethyl-6-SO₃Na-phenyl |

-continued
| | | | | |
|---|---|---|---|---|
| M-17 | 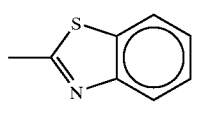 | 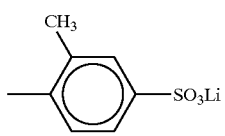 | 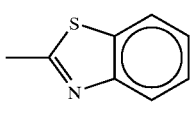 | 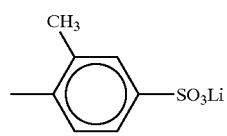 |
| M-18 | 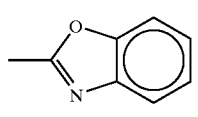 | 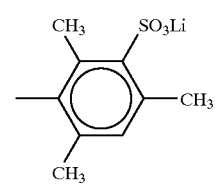 | 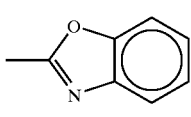 | 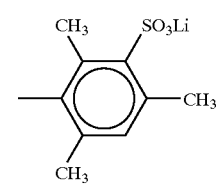 |
| M-19 | 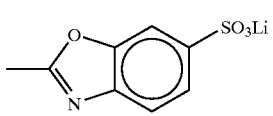 | 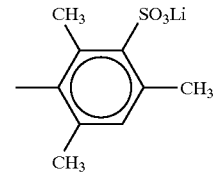 | 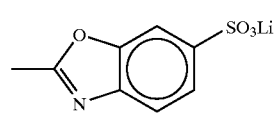 | 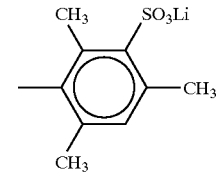 |
| M-20 | 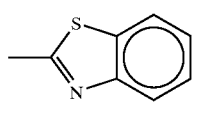 | 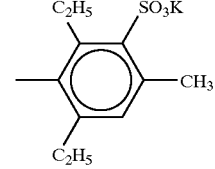 | —SO$_2$CH$_3$ | 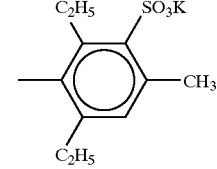 |
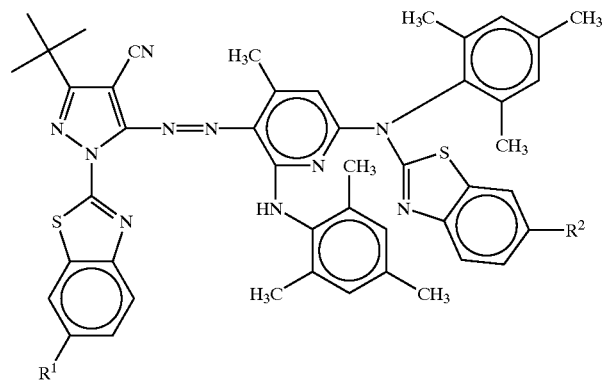
M-21 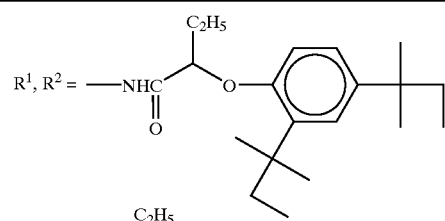
M-22 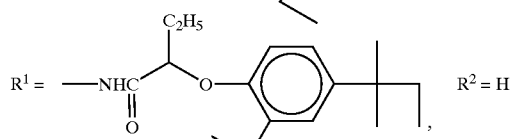
M-23 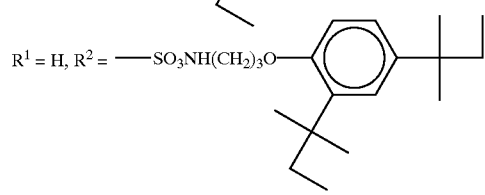

M-24
$R^1, R^2 =$ 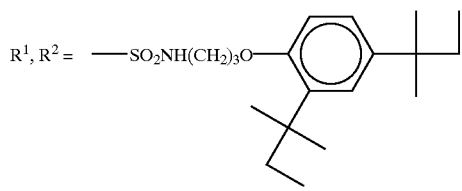
M-25 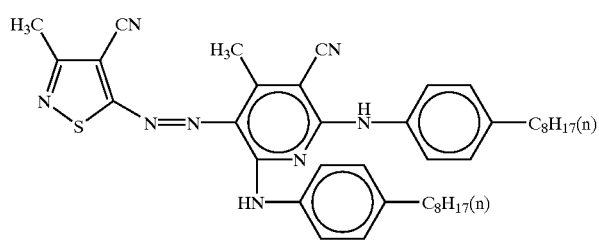
M-26 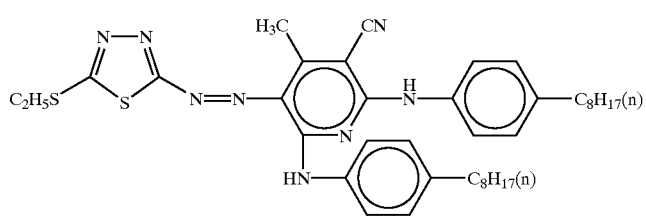
Specific examples [C-1~C-50] of cyan dyes that can be used in accordance with the present invention are presented below.
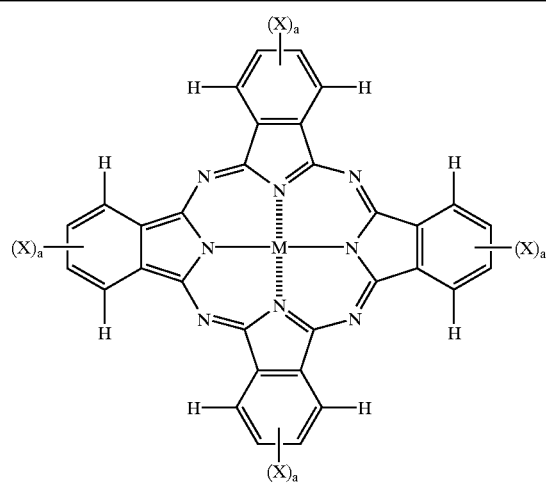
| Compound No. | M | X ($\sigma_p$ value) | a |
|---|---|---|---|
| C-1 | Cu |  (0.65) | 1 |

-continued
| | | | |
|---|---|---|---|
| C-2 | Cu | 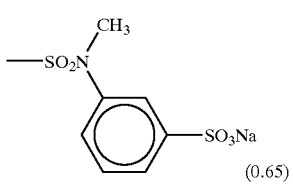 (0.65) | 1 |
| C-3 | Cu | 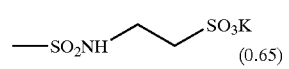 (0.65) | 1 |
| C-4 | Cu | 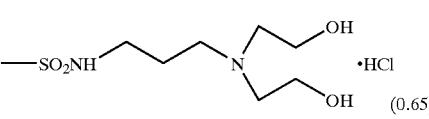 ·HCl (0.65) | 1 |
| C-5 | Cu | 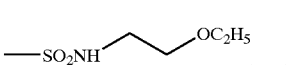 (0.65) | 1 |
| C-6 | Cu | 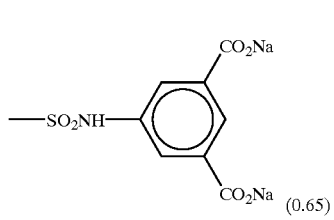 (0.65) | 1 |
| C-7 | Cu | 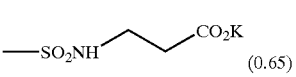 (0.65) | 1 |
| C-8 | Cu | 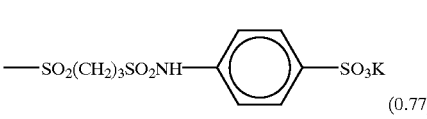 (0.77) | 1 |
| C-9 | Cu | 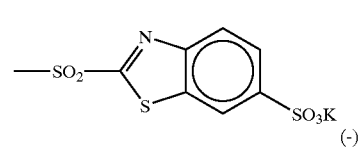 (-) | 1 |
| C-10 | Cu | 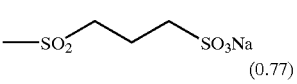 (0.77) | 2 |
| C-11 | Cu | 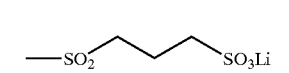 | 1 |
| C-12 | Cu | 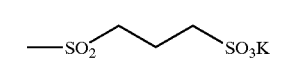 | 1 |
| C-13 | Cu | 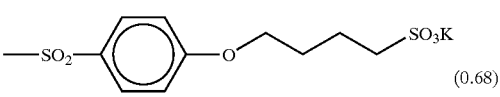 (0.68) | 1 |
| C-14 | Cu | 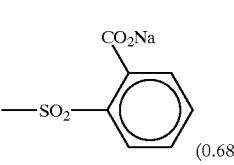 (0.68) | 1 |

-continued
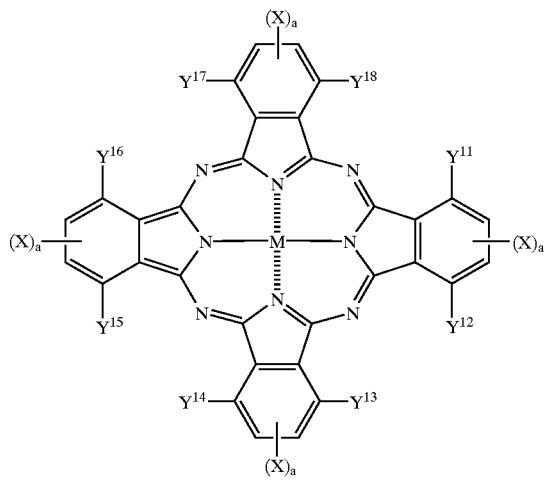
In the table, specific examples of each set of (Y11, Y12), (Y13, Y14), (Y15, Y16), (Y17, Y18) are presented independently from each other, in no special order.
| Compound No. | M | X ($\sigma_p$ value) | $Y^{11}, Y^{12}$ | $Y^{13}, Y^{14}$ | $Y^{15}, Y^{16}$ | $Y^{17}, Y^{18}$ | a |
|---|---|---|---|---|---|---|---|
| C-15 | Cu | —SO$_2$NH—〈phenyl〉—NHSO$_2$—〈phenyl〉—SO$_3$K (0.65) | H, Cl | H, Cl | H, Cl | H, Cl | 1 |
| C-16 | Cu | —SO$_2$CH$_2$CH$_2$CH$_2$SO$_3$K (0.77) | H, Cl | H, Cl | H, Cl | H, Cl | 1 |
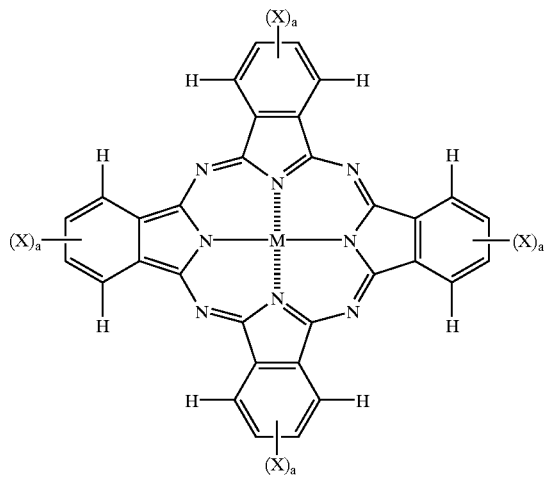
| Compound No. | M | X ($\sigma_p$ value) | a |
|---|---|---|---|
| C-17 | Cu | —SO$_2$NH—〈phenyl〉—C$_8$H$_{17}$-n (0.65) | 1 |

-continued
| | | | |
|---|---|---|---|
| C-18 | Cu | 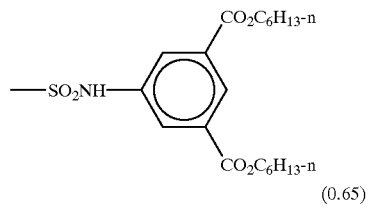 —SO₂NH—⟨benzene with CO₂C₆H₁₃-n (two)⟩ (0.65) | 1 |
| C-19 | Cu | —SO₂NH—C(CH₃)₂—CH₂—C(CH₃)₃ (0.65) | 1 |
| C-20 | Cu | —SO₂N(C₄H₉-n)(C₆H₅) (0.65) | 1 |
| C-21 | Cu | —SO₂NH—⟨4-Br, 3-t-Bu pyrazole⟩ (0.65) | 1 |
| C-22 | Cu | —SO₂(CH₂)₃SO₂NH(CH₂)₃OCH(CH₃)₂ | 1 |
| C-23 | Cu | —SO₂—⟨2-OC₄H₉, 5-C₈H₁₇-t phenyl⟩ (0.68) | 1 |
| C-24 | Cu | —SO₂(CH₂)₃CO₂CH(CH₃)CH₂OCH₃ | 1 |
| C-25 | Cu | —SO₂—C₁₂H₂₅-n (0.77) | 1 |
| C-26 | Cu | —SO₂—(CH₂)₂NHCOCH(C₂H₅)(C₄H₉) (0.77) | 1 |
| C-27 | Cu | —SO₂—(CH₂)₂CO₂C₆H₁₃-n (0.77) | 1 |
| C-28 | Cu | —SO₂—C₈H₁₇-n (0.77) | 2 |

-continued $$Cu-Pc-(SO_2R^1)_m (SO_2R^2)_n$$

| Compound No. | R¹ ($\sigma_p$) | R² ($\sigma_p$) | m:n |
|---|---|---|---|
| C-29 | —C₁₂H₂₅(n) (0.77) | —C₈H₁₇(n) | 1:3 |
| C-30 | —C₈H₁₇(n) (0.77) | —C₆H₄—OC₄H₉(n) (0.68) | 2:2 |
| C-31 | —(CH₂)₂CO₂C₆H₁₃(n) (0.77) | 4-OC₄H₉-3-CH₃-C₆H₃— (0.68) | 1:3 |
| C-32 | 3-OC₄H₉-4-C₈H₁₇(t)-C₆H₃— (0.68) | —C₆H₄—OCH₃ (0.68) | 3:1 |
| C-33 | —C₆H₄—C₁₂H₂₅ (0.68) | —C₄H₉(n) (0.77) | 2:2 |
| C-34 | —C₆H₄—C₁₂H₂₅ | —C₄H₉(n) | 1:3 |

$$Cu-Pc-(SO_2R^1)_m \left( SO_2N\begin{matrix}R^3\\R^4\end{matrix} \right)_n$$

| Compound No. | R¹ ($\sigma_p$) | —N(R³)(R⁴) ($\sigma_p$) | m:n |
|---|---|---|---|
| C-35 | —C₈H₁₇(n) (0.77) | —NHCH₂CH(C₄H₉(n))(C₂H₅) (0.65) | 3:1 |
| C-36 | —C₈H₁₇(n) | —N(C₆H₁₃(n))₂ (0.65) | 1:3 |
| C-37 | —C₈H₁₇(n) | —NH(CH₂)₃O—[3,5-di-t-butylphenyl] (0.65) | 3:1 |

-continued

| Compound No. | | | |
|---|---|---|---|
| C-38 | OC₄H₉ / CH₃ / C₈H₁₇(t) phenyl (0.68) | —NH(CH₂)₂OC₂H₅ (0.65) | 1:3 |
| C-39 | OC₄H₉ / CH₃ / C₈H₁₇(t) phenyl | —NHCH₂CO₂C₈H₁₇(n) (0.65) | 2:2 |

$$Cu-Pc-(SO_2R^1)_m\,(SO_2R^2)_n$$

| Compound No. | R¹ (σ$_p$) | R² (σ$_p$) | m:n |
|---|---|---|---|
| C-40 | —(CH₂)₃SO₃Li | —(CH₂)₃SO₂NHCH₂CH(OH)CH₃ | 3:1 |
| C-41 | —(CH₂)₃SO₃Li | —(CH₂)₃SO₂NHCH₂CH(OH)CH₃ | 2:2 |
| C-42 | —(CH₂)₃SO₂Li | —(CH₂)₃SO₂NH(CH₂)₂O(CH₂)₂OH | 2:2 |
| C-43 | —(CH₂)₃SO₃K | 3-methyl-benzoate-CO₂K phenyl | 1:3 |
| C-44 | —(CH₂)₃SO₃K | 3-methyl-benzoate-CO₂K phenyl | 3.5:0.5 |
| C-45 | —(CH₂)₂NHCO(CH₂)₂CO₂Na (0.77) | —(CH₂)₃SO₃Na (0.77) | 2:2 |
| C-46 | —(CH₂)₂NHCO(CH₂)₂CO₂Na | —(CH₂)₃SO₃Na | 1:3 |
| C-47 | —(CH₂)₂NHSO₂-phenyl-CO₂Na (0.77) | —(CH₂)₃SO₃Na | 1:3 |
| C-48 | —(CH₂)₂N(CH₂CO₂Na)₂ | —(CH₂)₃SO₃Na | 2:2 |

$$Cu-Pc-(SO_2R^1)_m\left(SO_2N\begin{matrix}R^3\\R^4\end{matrix}\right)_n$$

| Compound No. | R¹ | —N(R³)(R⁴) (σ$_p$) | m:n |
|---|---|---|---|
| C-49 | —(CH₂)₃SO₃K | —NH(CH₂)₂SO₃K (0.65) | 3:1 |
| C-50 | —(CH₂)₃SO₃K | —NH(CH₂)₂SO₃K | 2:2 |

Examples of compounds that can be employed in accordance with the present invention are also described in Japanese Patent Applications Nos. 2001-96610, 2001-24352, 2001-47013, 2001-57063, 2001-76689, 2001-193638, 2001-15614, 2001-110457, and 2001-110335, but the present invention is not limited thereto. Further, the above-mentioned compounds can be easily synthesized by the methods described in the patents referred to herein.

Physical Properties of Dyes

In accordance with the present invention, magenta dyes and cyan dyes are preferably used which have an ozone fading retention ratio in a forced test of no less than 0.6 times the ozone fading retention ratio of C. I. Direct Yellow 86. For example, the dye in accordance with the present invention is selected from magenta and cyan dyes with a retention ratio of no less than 54%, when the retention ratio of a printed sample with a density of C. I. Direct Yellow 86 of 1.0 is 90%. The higher is the ozone fading retention ratio of magenta and cyan dyes the better, and the ozone fading retention ratio is preferably no less than 0.7 times, more preferably no less than 0.8 times, still more preferably no less than 0.9 times, and most preferably no less than 1.0 times that of C. I. Direct Yellow 86.

Similarly, for the yellow dyes that are used at the same time, the ozone fading retention ratio is preferably no less than 0.8 times, more preferably no less than 0.85 times, still more preferably no less than 0.9 times, and most preferably no less than 1.0 times that of C. I. Direct Yellow 86.

Because the balance with gas resistance is important, it is preferred that the maximum difference between the ozone fading retention ratio of each of the yellow, magenta, and cyan dyes and the ozone fading retention ratio of C. I. Direct Yellow 86 be contained within 30 points when the latter is 90%. This difference is more preferably contained within 20 points, still more preferably within 10 points, and most preferably within 5 points.

Ozone Fading Retention Ratio

A variety of methods and conditions are known for forced testing of ozone fading. With the method in accordance with the present invention, C. I. Direct Yellow 86, which is a readily available dye, is used as a standard substance and relative evaluation is conducted. For this reason, a difference caused by discrepancy between the methods can hardly occur. Ozone fading retention ratio can be found by printing or coating a test dye solution on a commercial inkjet special paper so as to obtain a reflection density of 1.0, measuring the density after the exposure for the prescribed time in a forced test apparatus designed so as to provide for a uniform ozone concentration, and finding the retention ratio with respect to that prior to the exposure. More specifically, the ozone fading retention ratio is determined by the below-described image recording and ozone fading forced test.

Image Recording

Ink is loaded in a cartridge of an inkjet printer and printed on paper so as to obtain a reflection density of 1.0. Inkjet special paper which is an image receiving material with an ink image receiving layer containing white inorganic pigment particles on a substrate is used to determine the ozone fading retention ratio in accordance with the present invention.

Ozone Fading Retention Ratio

A variety of methods are used for finding the ozone fading retention ratio of dyes. With the method in accordance with the present invention, C. I. Direct Yellow 86, which is a readily available dye, is used as a standard substance and relative evaluation is conducted. For this reason, a difference caused by discrepancy between the methods can hardly occur. Examples of preferred methods include the following two methods, of which testing conducted by method A is preferred, this method being close to ink processes in terms of implementation.

Method A: Long-Term Testing

Following the method described in Environ. Sci. Technol., Vol. 22, 1357–1361 (1988), a constant amount of aqueous solutions with equimolar concentration of sample dyes are supported on commercial silica gel TLC plate (TLC plate silica gel 60F254, manufactured by Merck Co.). Two identical TLC samples are prepared for each dye.

A box is prepared that is set in a dark place at room temperature, the box being filled with ozone gas at a concentration of 0.5±0.1 ppm that was obtained by passing dry air in a double-wall glass tube of the Siemens ozonizer and applying a 5 kV AC voltage thereto. One test sample supported on the TLC is exposed for the prescribed time and the dye is extracted by using methanol. The dye is also extracted from the other TLC plate that has not been exposed to ozone gas and the retention ratio is qualitatively determined by comparing the two dyes by HPLC.

Method B: Short-Term Testing

A test sample was prepared by dissolving a dye in pure water to a concentration of 0.1 mol/L and adjusting pH to 8.0 by using 0.1N aqueous solution of sodium carbonate. Ozone and air are passed through the test sample solution at respective rates of 1.1±0.1 mmol and 50 mL per minute at a temperature of 30° C., with reference to the methods described in Sen'i Gakkaishi Vol. 34, 181–186 (1978), Journal of the Society of Dyers and Colourists Vol. 101, 334–336.

A small amount of sample is periodically sampled and the retention ratio is determined from changes in absorbance.

With the method in accordance with the present invention, a dye is selected with reference to a dye with excellent gas resistance, such as C. I. Direct Yellow 86. Therefore, an inkset capable of fast image formation can be constructed. In prior art, a significant difference in gas resistance under natural ambient conditions was sometimes observed even when high-potential dyes demonstrating the same value of oxidation potential were selected. This result indicates that fastness cannot be uniquely estimated merely by properties under specific conditions, such as gas resistance under natural ambient conditions. In accordance with the present invention, a dye can be selected by direct comparison of ozone fading rate of the dyes themselves. Therefore, a forced test can be conducted which has high correlation with the natural passage of time and takes account of other ambient conditions. Therefore, a dye with excellent gas resistance under natural ambient conditions can be easily selected.

Ink for InkJet Printing

The ink set in accordance with the present invention comprises as minimum structural elements a yellow ink comprising a yellow dye of at least one type, a magenta ink comprising a magenta dye of at least one type, and a cyan ink comprising a cyan dye of at least one type. The below-described dyes are used as the dyes contained in each ink. Usually, the inks can be prepared by dissolving and/or dispersing the dyes in a lipophilic medium or aqueous medium. It is preferred that an aqueous medium be used.

If necessary, other additives can be added within ranges such that the effect of the present invention is not impaired. Examples of such other additives include the well-known additives such as agents preventing drying (humidifying agents), antifading agents, emulsification stabilizers, permeation enhancers, UV absorbers, corrosion inhibitors, mold control agents, pH adjusting agents, surface tension adjusting agents, antifoaming agents, viscosity adjusting agents, dispersing agents, dispersion stabilizers, rust-preventing agents, chelating agents. In case of water-soluble inks, those additives are directly added to the liquid ink. When an oil-soluble dye is used in the form of dispersion, the additives are typically added to the dispersion after the dye dispersion has been prepared, but may be added to the oil phase of aqueous phase during preparation.

The above-mentioned agents preventing drying are preferably used with the object of preventing clogging of ink ejection opening of a nozzle used in inkjet printing systems by dried ink for inkjet printing.

Water-soluble organic solvents with a vapor pressure lower than that of water are used advantageously as the agents preventing drying. Specific example include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylolpropane, and the like, lower alkyl ethers of polyhydric alcohols, such as ethylene glycol monomethyl (or ethyl) ether, diethylene glycol monomethyl (or ethyl) ether, triethylene glycol monoethyl (or butyl) ether, and the like, heterocyclic compounds such as 2-pyrrolidone, N-methyl-2-pyrrolidone, 1,3-dimethyl-2-imidazolidinone, N-ethylmorpholine, sulfur-containing compounds such as sulfolan, dimethyl sulfoxide, 3-sulfolene, and the like, polyfunctional compounds such as diacetone alcohol, diethanolamine, and the like, and urea derivatives. Among them, polyhydric alcohols such as glycerin, diethylene glycol, and the like are especially preferred. Furthermore, the above-mentioned agents preventing drying may be used individually or in combinations of two or more thereof. It is preferred that those agents preventing drying be contained in the ink at 10–50 weight %.

The above-mentioned permeation enhancers are used advantageously with the object of improving permeation of the ink for inkjet printing into paper. Examples of suitable permeation enhancers include alcohols such as ethanol, isopropanol, butanol, di(tri)ethylene glycol monobutyl ether, 1,2-hexane diol, and the like, sodium lauryl sulfate, sodium oleate, nonionic surfactants, and the like. A sufficient effect is usually obtained if those enhancers are contained in the ink at 5–30 weight % and they are preferably added within ranges causing no oozing of the image or print through.

The above-mentioned UV absorbers are used with the object of improving storage life of images. Examples of suitable UV absorbers include benzotriazole compounds described in JP-A Nos. 58-185677, 61-190537, 2-782, 5-197075, 9-34057, and the like, benzophenone compounds described in JP-A Nos. 46-2784, 5-194483, U.S. Pat. No. 3,214,463, and the like, cinnamic acid compounds described in Japanese Patent Application Publication (JP-B) Nos. 48-30492 and 56-21141 and JP-A No. 10-88106, triazine compounds described in JP-A Nos. 4-298503, 8-53427, 8-239368, 10-182621 and Japanese Patent Publication 8-501291, compounds described in Research Disclosure No. 24239, and the so-called fluorescent whitening agents which are the compounds generating fluorescence by absorbing UV radiation, for example, such as stilbene compounds and benzoxazole compounds.

The above-mentioned antifading agents are used with the object of extending storage life of images. Antifading agents of various organic systems and metal complex systems can be used as such antifading agents. Examples of organic antifading agents include hydroquinones, alkoxyphenols, dialkoxyphenols, phenols, anilines, amines, indoles, chromans, alkoxyanilines, heterocycles, and the like. Examples of metal complexes include nickel complexes, zinc complexes, and the like. More specifically, compounds described in patents cited in Research Disclosure No. 17643 (Sections VII-I through J), No. 15162, No. 18716 (page 650, left column), No. 36544 (page 527), No. 307105 (page 827), and No. 15162 and compounds contained in the general formulas of representative compounds and examples of compounds described in JP-A No. β-215272, pages 127–137 can be used.

Examples of mold control agents include sodium dehydroacetic acid, sodium benzoate, sodium pyridinethione-1-oxide, p-hydroxybenzoic acid ethyl ester, 1,2-benzisothiazolin-3-one, and salts thereof. They are preferably contained in the ink at 0.02–1.00 weight %.

The above-mentioned neutralizing agents (organic bases, inorganic alkalis) can be used as the pH adjusting agents. The pH adjusting agents are preferably added for the ink for inkjet printing to have pH 6–10 in summer, with the object of increasing storage stability of the ink for inkjet printing. Adding to obtain pH 7–10 is even more preferred.

Examples of surface tension adjusting agents include nonionic, cationic, or anionic surfactants. The surface tension of the ink for inkjet printing in accordance with the present invention is preferably 25–70 mPa·s. A surface tension of 25–60 mN/m is even more preferred. The viscosity of the ink for inkjet printing in accordance with the present invention is preferably no more than 30 mPa·s. It is even more preferred that the viscosity be adjusted to no more than 20 mPa·s. Preferred examples of surfactants include anionic surfactants such as fatty acid salts, alkylsulfuric acid esters and salts, alkylbenzenesulfonates, alkylnaphthalenesulfonates, dialkylsulfosuccinates, alkylphosphoric acid esters and salts, naphthalenesulfonic acid formalin condensate, polyoxyethylene alkylsulfuric acid esters and salts, and the like, and nonionic surfactants such as polyoxyethylene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerin fatty acid esters, oxyethylene oxypropylene block copolymer, and the like. Further, it is also preferred that SURFYNOLS (produced by Air Products & Chemicals Co.) which are acetylene polyoxyethylene oxide surfactants be used. Further, amphionic surfactants of aminoxide type such as N,N-dimethyl-N-alkylamineoxides are also preferred. Moreover, compounds presented as surfactants described in JP-A No. 59-157636 (pages 37–38), and Research Disclosure No. 308119 (1989) can be also used.

If necessary, fluorine-containing compounds and silicon-containing compounds or chelating agents represented by EDTA can be used as the antifoaming agents.

The preferred methods for dispersing the dyes in accordance with the present invention in an aqueous medium when the dyes are oil soluble comprise dispersing the dye and colored ultrafine particles comprising an oil-soluble polymer in the aqueous medium, as described in JP-A Nos. 11-286637, 2001-240763, 2001-262039, and 2001-247788, or dispersing the dye in accordance with the present invention, which is dissolved in an organic solvent with a high boiling point, in the aqueous medium as described in JP-A Nos. 2001-262018, 2001-240763, 2001-335734, and Japanese Patent Application No. 2000-203857. Specific methods, oil-soluble polymers used therein, organic solvents with a high boiling point, additives, and the amounts thereof that are described in the above-mentioned patents can be preferably used for dispersing the dyes in accordance with the present invention in aqueous media. Alternatively, the dye may be dispersed in a fine particle state as a solid. Dispersing agents and surfactants can be used during the dispersion process. Simple stirrers or impeller stirring systems, in-line stirring systems, milling systems (for example, colloid mill, ball mill, sand mill, attritor, roll mill, agitator mill, and the like), ultrasonic systems, emulsifying dispersion systems (high-pressure homogenizers; specific commercial apparatuses include Gaulin homogenizer, microfluidizer, DeBEE 2000, and the like can be used. In addition to the above-mentioned patents, methods for preparing inks for inkjet printing are described in detail in JP-A Nos. 5-148436, 5-295312, 7-97541, 7-82515, 7-118584, 11-286637, and Japanese Patent Application No. 2000-87539, those methods being also suitable for the preparation of the ink for inkjet printing in accordance with the present invention.

The aqueous medium contains water as the main component. If desired, a mixture additionally containing a water-miscible organic solvent can be used. Example of water-miscible organic solvents include, alcohols (for example, methanol, ethanol, propanol, isopropanol, butanol, isobutanol, sec-butanol, t-butanol, pentanol, hexanol, cyclohexanol, benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (for example, ethylene glycol monomethyl ether, ethylene glycol monomethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monomethyl ether, ethylene glycol monophenyl ether), amines (for example, ethanolamine, diethanolamine, triethanolamine, N-methyl ethanolamine, N-ethyl diethanolamine, morpholine, N-ethyl morpholine, ethylene diamine, diethylene triamine, triethylene tetramine, polyethylene imine, tetramethyl propylene diamine), and other polar solvents (for example, formamide, N,N-dimethylformamide, N,N-dimethylacetamide, dimethylsulfoxide, sulfolan, 2-pyrrolidone, N-methyl-2-pyrrolidone, N-vinyl-2-pyrrolidone, 2-oxazolidone, 1,3-dimethyl-2-imidazolidinone, acetonitrile, acetone). The above-mentioned water-miscible organic solvents may be also used in combinations of two or more types thereof.

The ink for inkjet printing in accordance with the present invention preferably contains the dyes at a ratio of no less than 0.1 weight part and no more than 20 weight parts per 100 weight parts of the ink. Furthermore, in yellow, magenta and cyan inks, dyes of two or more types may be used together, provided that the oxidation potential is higher than 0.8 V. When dyes of two or more types are used together, the total content of the dyes is preferably within the above-described range.

Recently, yellow, magenta and cyan inks have sometimes been composed of inks of two or more types with different dye concentration with the object of improving image quality. In accordance with the present invention, all the dyes used in dark and light inks desirably have an oxidation potential of higher than 0.8 V.

In accordance with the present invention, when inks of no less than two different types are used as inks of the same hue, the concentration ratio of one ink to the other ink is preferably 0.05–0.5.

Black Ink

The ink set in accordance with the present invention is used for forming full-color images. However, a black color tone ink is preferably used for adjusting the color tone. Examples of suitable black colorants include carbon black dispersions in addition to disazo, trisazo, and tetrazo dyes.

Self-dispersing pigments that can be dispersed in a medium without using a dispersing agent in accordance with the present invention will be described below the black ink in accordance with the present invention contains a self-dispersing pigment that can be dispersed in a medium, without a dispersing agent. The medium is preferably an aqueous medium. "The pigment that can be dispersed in a medium, without a dispersing agent", is a pigment in which a medium-solubilizing group is bonded to the pigment surface directly or via another atom association, thereby allowing the pigment to be dispersed with good stability, without a dispersing agent. Because "the pigment can be dispersed in a medium, without a dispersing agent", when the pigment is dispersed in a dispersion medium so as to obtain a medium concentration of 95 weight % and a pigment concentration of 5 weight % with a dispersion apparatus such as ultrasonic homogenizer, nanomizer, microfluidizer, ball mill, and the like, without using a dispersing agent, the dispersion is placed into a glass bottle and allowed to stay overnight, and then the concentration of pigment in the upper layer is measured, the concentration of pigment may be no less than 98% the initial concentration.

"The pigment that can be dispersed in a medium, without a dispersing agent", in accordance with the present invention can be manufactured by subjecting the usual pigments to acid-base treatment, coupling agent treatment using a diazonium salt or the like, polymer graft treatment, plasma treatment, oxidation with hypochlorous acid or salt thereof or hydrogen peroxide, or conducting surface modification treatment such as reduction. Specific examples of such treatment are described in JP-A No. 8-3498, 10-120958, 10-110127, World Patents No. WO96/18695, 0075246, 01/10963, or JP-A No. 10-95941. Furthermore, a variety of self-dispersing carbon black products are described in detail in JP-A No. 2001-89668, and in accordance with the present invention a reference can be made thereto. Owing to such a surface treatment, the content of medium-solubilizing groups becomes larger than that in the usual pigments, thereby allowing for dispersion without a dispersing agent.

Examples of the usual pigments that can be subjected to surface modification include Raven 7000, Raven 5750, Raven 5250, Raven 5000 ULTRAII, Raven 3500, Raven 2000, Raven 1500, Raven 1250, Raven 1200, Raven 1190 ULTRA II, Raven 1170, Raven 1255, Raven 1080, Raven 1060 (all of the above are manufactured by Columbian Carbon Co.), Regal 1400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400 (all of the above are manufactured by Cabot Corp.), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (all of the above are manufactured by Degussa Co.), No. 25, No. 33, No. 40, No. 47, No. 52, No. 900, No. 2300, MCF-88, MA600, MA7, MA8, MA100 (all of the above are manufactured by Mitsubishi Chemicals Co.). Those examples are, however, not limiting. Furthermore, fine particles of a magnetic material such as magnetite, ferrite, and the like, or titanium black and the like may be also used.

Commercial products can be directly used as "the pigment that can be dispersed in a medium, without a dispersing agent", in accordance with the present invention. Examples of such commercial pigments include Cabojet-200, Cabojet-300, IJX-55, IJX-164 (all of the above are manufactured by Cabot Corp.), Microjet Black CW-1 (BONJET Black CW-1: manufactured by Orient Chemical Industries, Ltd).

Medium-solubilizing groups contained in "the pigment that can be dispersed in a medium, without a dispersing agent", in accordance with the present invention may be nonionic, cationic, or anionic groups, but in case of an aqueous medium, sulfonic acids, carboxylic acids, hydroxyl group, phosphoric acid group, and the like are preferred. In case of sulfonic acids, carboxylic acids and phosphoric acid group, they can be directly used in a state of free acids, but also may be used upon formation of salts. When salts are formed, Li, Na, K, $NH_4$ and organic amines are usually preferred as acid counterions.

In accordance with the present invention, it is desired that pigments be used in the form of purified products. Removal of impurities can be conducted by a variety of methods such as water washing, ultrafiltration membrane method, ion-exchange treatment, adsorption with active carbon, zeolite, and the like. The concentration of inorganic substances derived from colorant impurities in the ink is preferably no more than 500 ppm, even more preferably no more than 300 ppm, though no specific limitation is placed thereon.

In accordance with the present invention, the content of pigments in the black ink is preferably 0.1–15 weight %, more preferably, 0.5–10 weight %, and even more preferably 1.0–8.0 weight %, based on the entire ink weight. If the pigment content is higher than 15 weight %, clogging of the nozzle tip of the printing head easily occurs and, and if the pigment content is less than 0.1 weight %, a sufficient image density cannot be obtained.

Even when a self-dispersing pigment is used, a surfactant may be added to the black ink to adjust surface tension. Nonionic and anionic surfactants are preferred because they produce hardly any effect on dispersion state of water-insoluble colorants or dissolution state of water-soluble dyes.

Examples of suitable nonionic surfactants include polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylol amides, acetylene alcohol ethylene oxide adduct, polyethylene glycol polypropylene glycol block copolymer, polyoxyethylene ether of glycerin ester, polyoxyethylene ether of sorbitol ester, and the like.

Examples of suitable anionic surfactants include alkylbenzene sulfonates, alkylphenyl sulfonates, alkylnaphthalene sulfonates, sulfonic acid salts and sulfuric acid esters and salts of higher fatty acid salts, higher fatty acid esters, higher alkyl sulfosuccinates, and the like.

Amphionic surfactants can be also used. Examples thereof include betaine, sulfobetaine, sulfate betaine, imidazoline, and the like. Further, silicon-containing surfactants such as polysiloxane polyoxyethylene adduct and the like, fluorine-containing surfactants such as oxyethylene perfluoroalkyl ethers and the like, and biosurfactants such as spiculisporic acid, ramnolipid, lysolecithin, and the like, can be also used.

In accordance with the present invention, pure water, ultrapure water, ion-exchange water, and the like can be used as the water contained in the black ink.

The diameter of dispersed particles of pigments in the ink is preferably 20–120 nm, as represented by the volume-average particle diameter, and the number of coarse particles with a diameter of 500 nm or greater is preferably no more than $5\times10^5$ in 1 L of the ink. If the volume-average particle diameter is less than 20 nm, a sufficient image density cannot be obtained, and if it is more than 120 nm, clogging easily occur inside the printing head and stable ejection cannot be obtained. If the number of coarse particles with a diameter of 500 nm or greater exceeds $5\times10^5$ in 2L of the ink, clogging also easily occur inside the printing head and stable ejection cannot be obtained. The number of coarse particles is more preferably no mo9re than $3\times10^5$ and still more preferably no more than $2\times10^5$. Furthermore, when the ink is to be used under the above-described conditions, it is preferred that the surface tension of the ink at a temperature of 20° C. be adjusted to 20–40 mN/m and viscosity be adjusted to 1.5–5.0 mPas.

It is desired that the storage elastic modulus of the pigment contained in the black ink be $5\times10^{-4}$–$1\times10^{-2}$ Pa, when measured in a low-shear speed range with an angular speed of 1–10 rad/s at a temperature of 24° C. If the storage elastic modulus is outside this range, oozing between colors and color distortions easily occur and image fixing ability is also degraded, which is undesirable. Pigments of black ink which have the appropriate elasticity within this range demonstrate desirable behavior on the paper. Those can be readily measured with a device capable of measuring viscoelasticity in a low-shear speed range. Examples of such devices include VE-type viscoelasticity analyzer (manufactured by VILASTIC SCIENTIFIC, INC.) and DCR viscoelasticity measurement device for ultralow-viscosity (Paar Physica Co.).

Inkjet Recording Method

With the inkjet recording method in accordance with the present invention, energy is provided to inks in the inkset for inkjet recording in accordance with the present invention, and an image is formed on a publicly known image receiving material, that is, usual paper, polymer-coated paper, special paper for inkjet printing such as described in JP-A Nos. 8-169172, 8-27693, 2-276670, 7-276789, 9-323475, 62-238783, 10-153989, 10-217473, 10-235995, 10-337947, 10-217597, 10-337947, and the like, films, paper also suitable for electrophotography, cloth, glass, metals, ceramics, and the like.

When an image is formed, a polymer-latex compounds may be additionally used with the object of providing gloss and water resistance and improving weather resistance. As for the period for applying the latex compound to the image receiving material, it can be done prior to, after, or together with the application of coloring agents. Therefore, the latex compound may be added to the image receiving paper and to the ink, or it may be used as an independent polymer latex liquid substance. More specifically, methods described in Japanese Patent Applications Nos. 2000-363090, 2000-315231, 2000-354380, 2000-343944, and 2000-268952 can be advantageously used.

Recording paper and recording films suitable for conducting inkjet printing by using the ink in accordance with the present invention will be described below. Substrates composed of chemical pulp such as LBKP, NBKP, and the like, mechanical pulp such as GP, PGW, RMP, TMP, CTMP, CMP, CGP, and the like, old paper pulp such as DIP, and the like, which is mixed, if necessary, with additives such as the conventional well-known pigments, binders, sizing agents, fixing agents, cation agents, paper reinforcing agents, and the like, and manufactured with various machines such as a long-mesh paper forming machine, round-mesh paper forming machine, and the like can be used as the substrates for the recording paper and recording films. Besides such substrates, synthetic paper and plastic films and sheets may be also used. It is desired that the substrate thickness be 10–250 μm and the metric weight be 10–250 g/m². An ink receiving layer and a back coat layer may be directly provided on the substrate, or an ink receiving layer or a back coat layer may be provided after an anchor coat or size press such as starch, polyvinyl alcohol or the like has been provided. Furthermore, the substrate may be subjected to flattening with a calender machine such as machine calender, TG calender, soft calender, and the like. In accordance with the present invention, it is even more preferred that a plastic film and paper laminated on both surfaces with a polyolefin (for example, polyethylene, polystyrene, polyethylene terephthalate, polybutene, and copolymers thereof) be used as the substrate. It is preferred that a white pigment (for example, titanium oxide, zinc oxide) or coloring dye (for example, cobalt blue, ultramarine, neodymium oxide) be added to the polyolefin.

The ink receiving layer provided on the substrate comprises a pigment or an aqueous binder. A white pigment is preferred. Examples of white pigments include inorganic white pigments such as calcium carbonate, kaolin, talk, clay, diatomaceous earth, synthetic amorphous silica, aluminum silicate, magnesium silicate, barium sulfate, calcium sulfate, titanium dioxide, zinc sulfide, zinc carbonate, and the like, and organic pigments such as styrene-based pigments, acrylic pigments, urea resin, melamine resin, and the like. It is preferred that a porous inorganic pigment be used as the white pigment contained in the ink receiving layer, and synthetic amorphous silica with a large surface area of pores is especially preferred. Anhydrous silicic acid obtained by a dry production method and water-containing silicic acid obtained by a wet production method can be used as the synthetic amorphous silica, but it is especially desirable that water-containing silicic acid be used.

Examples of aqueous binders contained in the ink receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinyl pyrrolidone, polyalkylene oxide, polyalkylene oxide derivatives and the like, and water-dispersible polymers such as styrene butadiene latex, acryl emulsion, and the like. Those aqueous binders can be used individually or in combinations of two or more thereof. In accordance with the present invention, in terms of adhesion to pigments and peeling resistance of ink receiving layer, the especially preferred among them are polyvinyl alcohol and silanol-modified polyvinyl alcohol.

In addition to pigments and water-soluble binder, the ink receiving layer can contain mordants, hydration-preventing agents, agents improving light resistance, surfactants, and other additives.

It is preferred that the mordants added to the ink receiving layer be passivated. For this purpose, polymer mordants are preferably used.

As for the polymer mordants, the especially preferred image receiving materials contain polymer mordants described in specifications of JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, and U.S. Pat. Nos. 2,484,430, 2,548,564, 3,148,061, 3,309,690, 4,115,124, 4,124,386, 4,193,800, 4,273,853, 4,282,305, and 4,450,224. The image receiving material containing the polymer mordant described in JP-A No. H1-161236 is particularly preferable. If the polymer mordants described in those specifications are used, images of excellent quality can be obtained and light resistance of the images can be improved.

The above-mentioned hydration-preventing agents are effective for preventing hydration of images. Cationic resins are especially preferred as the hydration-preventing agents. Examples of such cationic acids include polyamidopolyamine epichlorohydrin, polyethylene imine, polyamine sulfone, dimethyl diallyl ammonium chloride polymer, cation polyacrylamide, colloidal silica, and the like. The especially preferred among those cationic resins is polyamidopolyamine epichlorohydrin. The content of those cationic resins is preferably 1–15 weight %, more preferably 3–10 weight % based on the entire solids of ink receiving layer.

Examples of agents improving light resistance include zinc sulfate, zinc oxide, hindered amine antioxidants, benzophenone-type or benzotriazole-type UV absorbers, and the like. Zinc sulfate among them is especially preferred.

The above-mentioned surfactants act as coating enhancers, agents improving peeling ability, agents improving sliding properties, or antistatic agents. Suitable surfactants are described in specifications of Japanese Patent Applications Laid-open Nos. 62-173463 and 62-183457. Organic fluorine-containing compounds may be used instead of surfactants. It is preferred that the organic fluorine-containing compounds be hydrophobic. Examples of suitable organic fluorine-containing compounds include fluorine-containing surfactants, oily fluorine compounds (for example, fluorine oil) and solid fluorine compound resins (for example, tetrafluoroethylene resin). Organic fluorine-containing compounds are described in Examined Japanese Patent Application No. 57-9053 (pages 8-17), Japanese Patent Applications Laid-open Nos. 61-20994 and 62-135826. Examples of other additives added to the ink receiving layer include pigment dispersing agents, thickening agents, antifoaming agents, dyes, fluorescent whitening agents, corrosion inhibitors, pH adjusting agents, matting agents, film curing agents, and the like. One or two ink receiving layers may be provided.

A back coat layer can be also provided on the recording paper and recording film. Examples of components that can be added to such a layer include white pigments, aqueous binders, and other components. Examples of white pigments that can be contained in the back coat layer include white inorganic pigments such as light calcium carbonate, heavy calcium carbonate, kaolin, talk, calcium sulfate, barium sulfate, titanium dioxide, zinc oxide, zinc sulfide, zinc carbonate, satin white, aluminum silicate diatomaceous earth, calcium silicate, magnesium silicate, synthetic amorphous silica, colloidal silica, colloidal alumina, pseudoboehmite, aluminum hydroxide, alumina, lithopone, zeolites, hydrated halloysite, magnesium carbonate, magnesium hydroxide, and the like, and organic pigments such as styrene-type plastic pigments, acryl-type plastic pigments, polyethylene, microcapsules, urea resin, melamine resin, and the like.

Examples of aqueous binders that can be contained in the back coat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxymethyl cellulose, polyvinyl pyrrolidone, and the like, and water-dispersible polymers such as styrene butadiene latex, acrylic emulsion, and the like. Other components that can be contained in the back coat layer include antifoaming agents, foaming inhibitors, dyes, fluorescent whitening agents, corrosion inhibitors, hydration preventing agents, and the like.

A polymer latex may be added to the structural layers (including the back coat layer) of the inkjet recording paper and recording films. The polymer latex is used with the object of improving physical properties of the film, for example, for stabilizing dimensions, preventing curling, preventing adhesion, and preventing hair cracking of the film. Polymer latexes are described in JP-A Nos. 62-245258, 62-136648, and 62-110066. If a polymer latex with a low glass transition temperature (no higher than 40° C.) is added to the layer containing a mordant, then hair cracking and curling of the layer can be prevented. Furthermore, curling can be prevented even if a polymer latex with a high glass transition temperature is added.

The method for inkjet printing in accordance with the present invention is not limited to inkjet printing systems and can be also used in other well-known systems, for example, in an electric charge control system in which ink is ejected by using electrostatic induction forces, a drop-on-demand system (pressure pulse system) using vibration pressure of a piezo element, an acoustic inkjet system in which an electric signal is converted into an acoustic beam to irradiate the ink and the ink is ejected by using a radiation pressure, a thermal inkjet system in which ink is heated to form bubbles and the generated pressure is used. Inkjet recording systems include a system in which ink with a low concentration which is called a photoink is ejected multiple times in small volumes, a system in which a plurality of inks with substantially identical hue and different densities are used to improve the image quality, and a system using a colorless transparent ink.

Methods for Preventing Discoloration of Inkjet-Recorded Images

Preventing discoloration of the inkjet-recorded images in accordance with the present invention is conducted by inkjet recording by using the above-described inkset in accordance with the present invention.

As described above, in the inkset for inkjet recording in accordance with the present invention, the oxidation potentials of magenta dye and cyan dye are higher than 0.8 V (vs. SCE). Therefore, images with high light fastness and gas (especially, ozone gas) fastness can be obtained and image fading can be prevented.

EXAMPLES

The present invention will now be illustrated in more detail by reference to the following examples, but these examples should not be construed as limiting the scope of the present invention in any way.

Example 1

Preparation of Water-Based Ink

The following ingredients were mixed in deionized water in an amount to make the total volume 1 liter, and stirred for 1 hour as they were heated at 30–40° C. Then, the mixture was adjusted to pH=9 by 10 mol/L of KOH, and filtered under a reduced pressure with a microfilter having an average pore size of 0.25 $\mu$m, thereby preparing a light magenta ink solution.

| | |
|---|---|
| Magenta dye (T-1) having the structural formula illustrated below | 7.5 g/L |
| Diethylene glycol | 150 g/L |
| Urea | 37 g/L |
| Glycerin | 130 g/L |
| Triethylene glycol monobutyl ether | 130 g/L |
| Triethanolamine | 6.9 g/L |
| Benzotriazole | 0.08 g/L |
| Surfynol 465 (surfactant produced by Air Products Japan, Inc.) | 10.5 g/L |
| Proxel XL-2 (germicide produced by ICI Japan) | 3.5 g/L |

Further, magenta ink, light cyan ink, cyan ink, yellow ink and black ink were each prepared in the same manner as the light magenta ink solution, except that the species of the dye and the concentrations of the ingredients were changed to those shown in Table 1 respectively. Thus, an ink set 101 was obtained.

TABLE 1

Composition of Ink Set 101

| Ink Dye (g/l) | Light Magenta T-1 (7.5) | Magenta T-1 (30.0) | Light Cyan T-2 (8.75) | Cyan T2 (35.0) | Yellow T-3 (29.0) | Black T-4 (20.0) T-5 (20.0) T-6 (20.0) T-3 (21.0) |
|---|---|---|---|---|---|---|
| Diethylene glycol (g/l) | 150 | 110 | 200 | 130 | 160 | 20 |
| Urea (g/l) | 37 | 46 | — | — | — | — |
| Glycerin (g/l) | 130 | 160 | 150 | 180 | 150 | 120 |
| Triethylene glycol monobutyl ether (g/l) | 130 | 140 | 130 | 140 | 180 | — |
| Diethylene glycol monobutyl ether (g/l) | — | — | — | — | — | 230 |
| 2-Pyrrolidone (g/l) | — | — | — | — | — | 81 |
| Surfynol 465 (g/l) | 10.5 | 10.0 | 9.8 | 10.5 | — | — |
| Surfynol STG (g/l) | — | — | — | — | 8.5 | 9.8 |
| Triethanolamine (g/l) | 6.9 | 7.0 | 6.0 | 6.3 | 0.9 | 17.9 |
| Benzotriazole (g/l) | 0.08 | 0.07 | 0.08 | 0.08 | 0.06 | 0.06 |
| Proxel XL2 (g/l) | 3.5 | 1.5 | 1.1 | 1.2 | 1.5 | 1.1 |

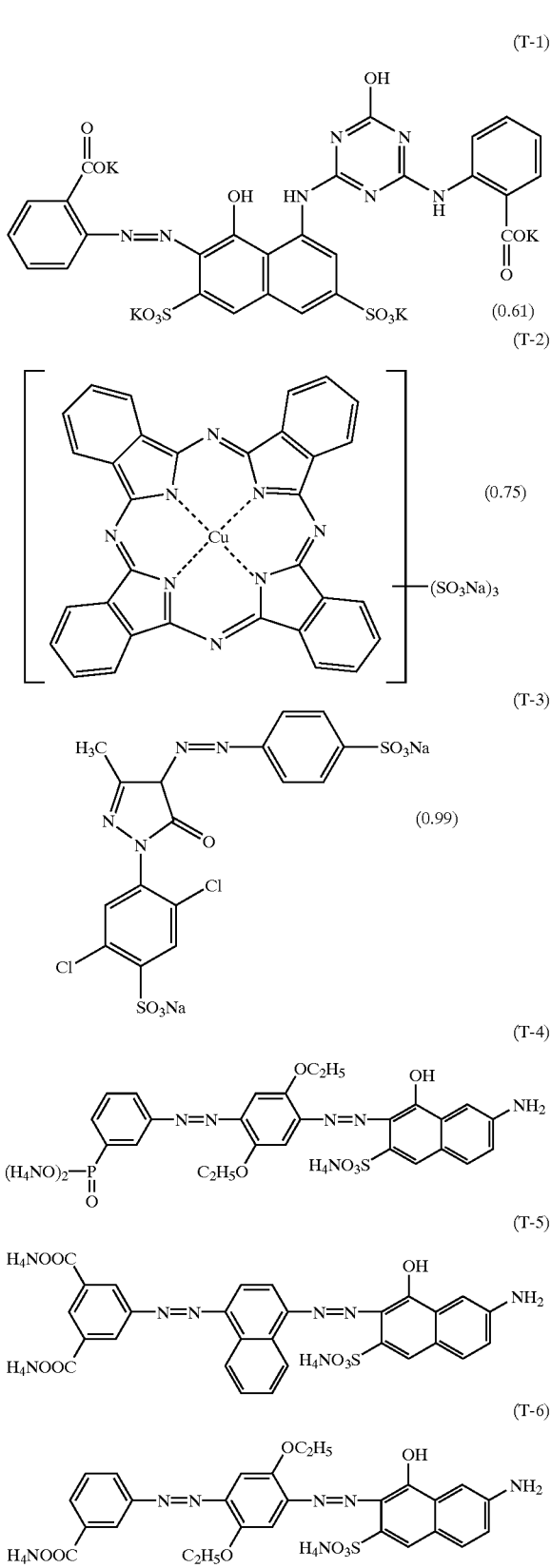

shown in Table 2a respectively. Additionally, it was basic to the dye change that equimolar replacement of dyes was made, and the dye concentrations were adjusted so that the transmission densities of ink solutions became equivalent to those in the ink set 101, respectively. In the case of using two dyes together in one ink solution, they were added in equimolar amounts.

TABLE 2a

| Ink Set | Light Magenta | Magenta | Light Cyan | Cyan | Yellow | note |
|---|---|---|---|---|---|---|
| 101 | T-1 | T-1 | T-2 | T-2 | T-3 | comparison |
| 102 | T-1 | T-1 | C-11 | C-11 | T-3 | comparison |
| 103 | M-10 | M-10 | T-2 | T-2 | T-3 | invention |
| 104 | M-3 | M-3 | C-11 | C-11 | T-3 | invention |
| 105 | M-6 | M-3 | C-12 | C-11 | Y-2 | invention |
| 106 | M-10 | M-10 | C-40 | C-40 | Y-4 | invention |
| 107 | M-15 | M-10 | C-11 | C-11 | Y-4 | invention |
| 108 | M-16 | M-16 | C-41 | C-41 | Y-5 | invention |
| 109 | M-12 | M-10 | C-42 | C-11 | Y-5 | invention |
| 110 | M-17 | M-17 | C-40 | C-11 | Y-10 | invention |
| 111 | M-18 | M-18 | C-42 | C-40 | Y-28 | invention |
| 112 | M-10 | M-10 | C-11 | C-11 | Y-24 Y-25 | invention |

The following Table 2b shows the oxidation potentials of the inks of the present invention, which inks were used in Examples 1–3.

TABLE 2b

| Compound No. | Oxidation Potential (V) | Compound No. | Oxidation Potential (V) | Compound No. | Oxidation Potential (V) |
|---|---|---|---|---|---|
| Y-2 | 1.28 | M-3 | 1.36 | C-11 | 1.15 |
| Y-4 | 1.27 | M-6 | 1.37 | C-12 | 1.15 |
| Y-5 | 1.37 | M-10 | 1.38 | C-22 | 1.18 |
| Y-10 | 1.39 | M-12 | 1.40 | C-24 | 1.17 |
| Y-24 | 1.28 | M-15 | 1.37 | C-31 | 1.20 |
| Y-25 | 1.00 | M-16 | 1.36 | C-35 | 1.13 |
| Y-28 | 1.32 | M-17 | 1.38 | C-36 | 1.13 |
| Y-32 | 1.21 | M-18 | 1.35 | C-40 | 1.15 |
| Y-33 | 1.19 | M-21 | 1.41 | C-41 | 1.15 |
| Y-34 | 1.37 | M-23 | 1.41 | C-42 | 1.15 |
| Y-35 | 1.39 | M-24 | 1.43 | | |
| | | M-25 | 1.35 | | |

Image Recording and Evaluation

Each of the ink sets 101 to 112 were charged into cartridges for an inkjet printer, Model PM-770C (made by Seiko Epson Corporation). By use of this printer, images were printed on inkjet paper, Photographic Paper PM, made by Seiko Epson Corporation, and the following evaluations were made.

<Printing Performance (1)>

The cartridges were set in the printer, and ink of each color was checked on jetting from each nozzle. Thereafter, the printer output was produced on 50 sheets of A4-size inkjet paper, and the printouts were evaluated by checking whether or not disturbances were found therein.

Ink sets 102 to 112 were each prepared in the same manner as the ink set 101, except that the species of the dyes used in the light magenta ink, the magenta ink, the light cyan ink, the cyan ink and the yellow ink were changed to those A: From the start to the stop of the printing, there occurs no printout disturbance.

B: During the printing, disturbances occur in printouts.

C: From the start to the stop of the printing, printouts suffer from disturbances.

<Printing Performance (2)>

After the cartridges were left standing for 10 days at a temperature of $\alpha°$, printout disturbances were evaluated by the same method as adopted in the case of printing performance (1).

<Drying Property>

Ink stains left on printouts by the touch of a finger just after printing were evaluated by visual observations.

<Bleeding of Ink from Fine-Line Printouts>

Fine-line patterns were printed in yellow ink, magenta ink, cyan ink and black ink, respectively. And bleeding evaluation (1) was performed on these fine-line patterns by visual observations. As to the black ink, evaluation (2) of bleeding caused by contact between two colors was also performed by printing a solidly shaded pattern in magenta ink and then printing on this pattern fine lines in black ink.

<Water Resistance>

Images obtained were immersed in deionized water for 5 seconds, and blurs appearing on the images were evaluated by visual observations.

<Image Fastness>

With respect to image fastness, printout samples of gray color were made, and evaluated as follows:

1. Light Fastness (Referred to as "Light Resistance" in the Following Table)

Chromaticity (a*1, b*1) and lightness (L1) of each printout sample were measured with SPM 100-II made by Gretag AG just after printing, and then the sample was irradiated with xenon light (85,000 lux) for 7 days by means of a weather meter made by Atlas. Further, chromaticity (a*2, b*2) and lightness (L2) of the thus exposed sample were measured, and a color difference (ΔE) before and after irradiation was determined by the following equation (I), thereby evaluating light resistance.

$$\Delta E = \{(a*1-a*2)^2 + (b*1-b*2)^2 + (L1-L2)^2\}^{1/2} \quad \text{I}$$

Color differences were evaluated at three points of reflection density, 1.0, 1.3 and 1.6. The case where a color difference was smaller than 5 at every density was rated as A, the case where whether a color difference was smaller than 5 or not smaller than 5 depends on the density value was rated as B, and the case where a color difference was not smaller than 5 at every density was rated as C.

2. Heat Fastness (Referred to as "Heat Resistance" in the Following Table)

A color difference in each sample before and after 6-day storage under a condition of 80° C. was determined by the same method as adopted for the evaluation of light fastness. And dye retention ratios were evaluated at three points of reflection density, 1.0, 1.3 and 1.6, and the case where a color difference was smaller than 3 at every density was rated as A, the case where whether a color difference was smaller than 3 or not smaller than 3 depends on the density value was rated as B, and the case where a color difference was not smaller than 3 at every density was rated as C.

3. Ozone Resistance

A color difference in each sample before and after 7-day storage in a box having an ozone gas concentration set at 0.5 ppm was determined by the same method as adopted for evaluation of light fastness. And dye retention ratios were evaluated at three points of reflection density, 1.0, 1.3 and 1.6, and the case where a color difference was smaller than 10 at every density was rated as A, the case where whether a color difference was smaller than 10 or not smaller than 10 depends on the density value was rated as B, and the case where a color difference was not smaller than 10 at every density was rated as C. Additionally, the ozone gas concentration in the box was set by use of an ozone gas monitor (Model OZG-EM-01, made by APPLICS).

All the evaluation results in Example 1 are shown in Table 3.

TABLE 3

| Ink Set | Printing Performance (1) | Printing Performance (2) | Drying Properties | Fine-line Bleeding (1) | Fine-line Bleeding (2) | Water Resistance | Image Fastness | | |
|---|---|---|---|---|---|---|---|---|---|
| | | | | | | | Light Resistance | Heat Resistance | Ozone Resistance |
| 101 (comparison) | A | A | good | nothing | nothing | high | C | C | C |
| 102 (comparison) | A | A | good | nothing | nothing | high | C | C | C |
| 103 (comparison) | A | A | good | nothing | nothing | high | B | C | C |
| 104 (invention) | A | A | good | nothing | nothing | high | B | A | A |
| 105 (invention) | A | A | good | nothing | nothing | high | A | A | A |
| 106 (invention) | A | A | good | nothing | nothing | high | A | A | A |
| 107 (invention) | A | A | good | nothing | nothing | high | A | A | A |
| 108 (invention) | A | A | good | nothing | nothing | high | A | A | A |
| 109 (invention) | A | A | good | nothing | nothing | high | A | A | A |
| 110 (invention) | A | A | good | nothing | nothing | high | A | A | A |
| 111 (invention) | A | A | good | nothing | nothing | high | A | A | A |
| 112 (invention) | A | A | good | nothing | nothing | high | B | A | A |

It has been shown by the foregoing evaluation tests that the ink compositions relating to the present invention delivered outstanding performances, especially in the image fastness. Further, the ink compositions relating to the present invention caused no clogging in the cartridges, so the jetting thereof was highly consistent. In addition, the present ink compositions delivered excellent performances in fine-line output and the fine lines produced therefrom were free of bleeding and highly resistant to water.

Additionally, similar results and similar effects to the above were also obtained by replacing the image receiving paper used above by Inkjet Paper Gasai, photographic-quality finish, produced by Fuji Photo Film Co., Ltd., or by PR101 produced by Canon Inc.

Example 2

The same ink set samples as prepared in Example 1 were each charged in the cartridges of an inkjet printer, BJ-F850, made by Canon Inc. By use of this printer, images were printed on Inkjet Paper Gasai, photographic-quality finish, produced by Fuji Photo Film Co., Ltd., and performance evaluations thereof were made in the same way as in Example 1. In this example also, satisfactory results similar to those in Example 1 were attained. In addition, similar effects were produced also in the cases of using as image-receiveing paper Photographic Paper PM made by Seiko Epson Corporation and PR101 made by Canon Inc., respectively.

Example 3

An ink set 201 was prepared according to the same method as adopted for preparation of the ink set 101 in Example 1, except that the light magenta, magenta, light cyan, cyan and yellow ink solutions used in the ink set 101 were replaced with oil-soluble dye-containing ink solutions prepared in the following manners, respectively.

Dye (M-24) in an amount of 8 g and a surfactant (EMAL 20C, trade name, a product of Kao Corporation) in an amount of 60 g were dissolved at 70° C. in a mixture containing 6 g of a high-boiling organic solvent (S-1), 10 g of a high-boiling organic solvent (S-2), 1.0 g of an additive (A-1) and 50 mL of ethyl acetate. To the solution prepared, 500 mL of deionized water was added with stirring by means of a magnetic stirrer, thereby preparing an oil-in-water coarse-particle dispersion.

The structural formulae of the high-boiling organic solvents (S-1) and (S-2) and the additive (A-1) are illustrated below.

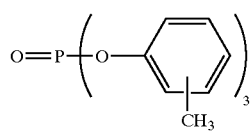
(S-1)

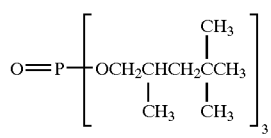
(S-2)

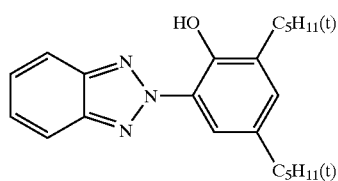
(A-1)

Next, the coarse particles in the dispersion were made into fine particles by 5-time passage through a Microfluidizer (made by MICROFLUIDEX INC.) under a pressure of 60 MPa. Further, the removal of the solvents from the thus finished emulsion was carried out by means of a rotary evaporator till the odor of ethyl acetate had dissipated.

To the fine hydrophobic dye emulsion thus prepared, 40 g of diethylene glycol, 64 g of glycerin and additives including urea were added, and water was further added to make the total volume 1 liter. The resulting emulsion was adjusted to pH 9 by addition of 10 mol/L of KOH. Thus, light magenta ink containing ingredients in concentrations shown in Table 4 was prepared. The volume average size of particles dispersed in the emulsion ink was found to be 40 nm by measurement with Microtrac UPA (made by Nikkiso Co., Ltd.).

Further, magenta ink, light cyan ink, cyan ink and yellow ink for an ink set 201 were prepared in the same manner as the light magenta ink, except that the species and the amount of the dye used, the amounts of the high-boiling organic solvents added, and the species and the amounts of the additives added were changed to those shown in Table 4, respectively. Additionally, the compositions shown in Table 4 are the final compositions obtained after evaporating the solvents.

TABLE 4

| Composition of Ink Set 201 | | | | | |
|---|---|---|---|---|---|
| | Light Magenta | Magenta | Light Cyan | Cyan | Yellow |
| Dye (g/l) | M-24 | M-24 | C-22 | C-22 | Y-30 |
| | (5.00) | (20.0) | (11.2) | (44.6) | (27.2) |
| High-boiling (S-1) | 3.75 | 14.52 | 8.1 | 32.4 | 20.0 |
| organic solvent (S-2) | 6.25 | 25.52 | 14.3 | 57.1 | 34.5 |
| Additive (A-1) (g/l) | 0.625 | 2.5 | 1.2 | 4.8 | 3.2 |
| EMAL20C (g/l) | 38 | 120 | 46.5 | 186 | 150 |
| Diethylene glycol (g/l) | 87.5 | 87.5 | 87.5 | 87.5 | 87.5 |
| Glycerin (g/l) | 40 | 40 | 40 | 40 | 40 |
| Surfynol 465 (g/l) | 10 | 10 | 10 | 10 | 10 |
| Triethanolamine (g/l) | 7.5 | 7.5 | 7.5 | 7.5 | 7.5 |
| Benzotriazole (g/l) | 0.075 | 0.075 | 0.075 | 0.075 | 0.075 |
| Proxel XL2 (g/l) | 2.5 | 2.5 | 2.5 | 2.5 | 2.5 |
| Deionized water added to make the total amount 1 liter | | | | | |
| Volume average particle size | 40 nm | 45 nm | 35 nm | 41 nm | 38 nm |

Ink sets 202 to 209 were each prepared in the same manner as the ink set 201, except that the species of the dye used in each ink was changed as shown in Table 5. Additionally, it was basic to the dye change that equimolar replacement of dyes was made, and the dye concentrations were adjusted so that the transmission densities of ink solutions became equivalent to those in the ink set 201, respectively.

TABLE 5

| Ink Set | Light Magenta | Magenta | Light Cyan | Cyan | Yellow | note |
|---|---|---|---|---|---|---|
| 201 | M-24 | M-24 | C-22 | C-22 | Y-30 | invention |
| 202 | M-21 | M-21 | C-22 | C-22 | Y-30 | invention |
| 203 | M-23 | M-24 | C-22 | C-24 | Y-31 | invention |
| 204 | M-24 | M-24 | C-24 | C-24 | Y-33 | invention |
| 205 | M-24 | M-24 | C-31 | C-31 | Y-34 | invention |
| 206 | M-24 | M-24 | C-37 | C-37 | Y-35 | invention |
| 207 | M-25 | M-24 | C-35 | C-37 | Y-35 | invention |
| 208 | M-25 | M-24 | C-22 | C-22 | Y-35 | invention |
| 209 | M-24 | M-24 | C-22 | C-37 | Y-32 | invention |

Image Recording and Evaluation

Each of the ink sets 201 to 209 were charged into cartridges for an inkjet printer, Model PM-770C (made by Seiko Epson Corporation). By use of this printer, images were printed on Inkjet Paper Gasai, photographic-quality finish, produced by Fuji Photo Film Co., Ltd., and the following evaluations were made.

<Printing Performance (1)>

The cartridges were set in the printer, and ink of each color was checked on jetting from each nozzle. Thereafter, the printer output was produced on 30 sheets of A4-size inkjet paper, and the printouts were evaluated by checking whether or not disturbances were found therein.

A: From the start to the stop of the printing, there occurs no printout disturbance.

B: During the printing, disturbances occur in printouts.

C: From the start to the stop of the printing, printouts suffer from disturbances.

<Printing Performance (2)>

After the cartridges were left standing for 2 days at a temperature of α°, printout disturbances were evaluated by the same method as adopted in the case of printing performance (1).

<Drying Property>

Ink stains left on printouts by the touch of a finger just after printing were evaluated by visual observations.

<Bleeding of Ink from Fine-Line Printouts>

Fine-line patterns were printed in yellow ink, magenta ink, cyan ink and black ink, respectively. And bleeding evaluation (1) was performed on these fine-line patterns by visual observations. As to the black ink, evaluation (2) of bleeding caused by contact between two colors was also performed by printing a solidly shaded pattern in magenta ink and then printing on this pattern fine lines in black ink.

<Water Resistance>

Images obtained were immersed in deionized water for αseconds, and blurs appearing on the images were evaluated by visual observations.

<Image Fastness>

With respect to image fastness, printout samples of gray color were made, and evaluated as follows:

1. Light Fastness (Referred to as "Light Resistance" in the Following Table)

Chromaticity (a*1, b*1) and lightness (L1) of each printout sample were measured with SPM 100-II made by Gretag AG just after printing, and then the sample was irradiated with xenon light (85,000 lux) for 14 days by means of a weather meter made by Atlas. Further, chromaticity (a*2, b*2) and lightness (L2) of the thus exposed sample were measured, and a color difference (ΔE) before and after irradiation was determined by the following equation (I), thereby evaluating light resistance.

$$\Delta E = \{(a*1-a*2)^2 + (b*1-b*2)^2 + (L1-L2)^2\}^{1/2} \qquad (I)$$

Color differences were evaluated at three points of reflection density, 1.0, 1.3 and 1.6. The case where a color difference was smaller than 5 at every density was rated as A, the case where whether a color difference was smaller than 5 or not smaller than 5 depends on the density value was rated as B, and the case where a color difference was not smaller than 5 at every density was rated as C.

2. Heat Fastness (Referred to as "Heat Resistance" in the Following Table)

A color difference in each sample before and after 6-day storage under a condition of 80° C. was determined by the same method as adopted for the evaluation of light fastness. And dye retention ratios were evaluated at three points of reflection density, 1.0, 1.3 and 1.6, and the case where a color difference was smaller than 3 at every density was rated as A, the case where whether a color difference was smaller than 3 or not smaller than 3, depends on the density value was rated as B, and the case where a color difference was not smaller than 3 at every density was rated as C.

3. Ozone Resistance

A color difference in each sample before and after 7-day storage in a box having an ozone gas concentration set at 1.0 ppm was determined by the same method as adopted for evaluation of light fastness. And dye retention ratios were evaluated at three points of reflection density, 1.0, 1.3 and 1.6, and the case where a color difference was smaller than 10 at every density was rated as A, the case where whether a color difference was smaller than 10 or not smaller than 10 depends on the density value was rated as B, and the case where a color difference was not smaller than 10 at every density was rated as C. Additionally, the ozone gas concentration in the box was set by use of an ozone gas monitor (Model OZG-EM-01, made by APPLICS).

All the evaluation results in Example 3 are shown in Table 6.

TABLE 6

| Ink Set | Printing Performance (1) | Printing Performance (2) | Drying Properties | Fine-line Bleeding (1) | Fine-line Bleeding (2) | Water Resistance | Image Fastness | | |
|---|---|---|---|---|---|---|---|---|---|
| | | | | | | | Light Resistance | Heat Resistance | Ozone Resistance |
| 201 (invention) | A | A | good | nothing | nothing | good | A | A | A |
| 202 (invention) | A | A | good | nothing | nothing | good | A | A | A |
| 203 (invention) | A | A | good | nothing | nothing | good | A | A | A |
| 204 (invention) | A | A | good | nothing | nothing | good | A | A | A |
| 205 (invention) | A | A | good | nothing | nothing | good | A | A | A |
| 206 (invention) | A | A | good | nothing | nothing | good | A | A | A |
| 207 (invention) | A | A | good | nothing | nothing | good | A | A | A |
| 208 (invention) | A | A | good | nothing | nothing | good | A | A | A |
| 209 (invention) | A | A | good | nothing | nothing | good | A | A | A |
| 101 (comparison) | A | A | good | nothing | nothing | so-so | C | C | C |
| 102 (comparison) | A | A | good | nothing | nothing | so-so | C | C | C |
| 103 (comparison) | A | A | good | nothing | nothing | so-so | B | C | C |

The above evaluation results show that the present ink compositions as oil-soluble dye dispersions delivered outstanding performances, especially in the image fastness. Further, the ink compositions relating to the present invention caused no clogging in the cartridges, and ensured highly consistent jetting. In addition, the present ink compositions delivered excellent performances in fine-line output and the fine lines produced therefrom were free of bleeding. Moreover, the present ink compositions had a step-up in water resistance.

Additionally, similar results and similar effects to the above were also obtained by replacing the image receiving paper used above by Photographic Paper PM produced by Epson Corporation, or by PR101 produced by Canon Inc.

Example 4

The same ink set samples as prepared in Example 3 were each charged in the cartridges of an inkjet printer, BJ-F850, made by Canon Inc. By use of this printer, images were printed on Inkjet Paper Gasai, photographic-quality finish, produced by Fuji Photo Film Co., Ltd., and performance evaluations thereof were made in the same way as in Example 3. In this example also, satisfactory results similar to those in Example 3 were attained. In addition, similar effects were produced also in the cases of using as image-receiving paper Photographic Paper PM made by Seiko Epson Corporation and PR101 made by Canon Inc., respectively.

As demonstrated in the foregoing Examples, the present inkjet recording solutions are superior in fastness as inkjet recording ink, especially in light resistance and ozone resistance, and can ensure high jetting consistency, high water resistance and bleeding-free image formation.

The present ink sets for inkjet recording can resist fading caused by gases, especially ozone gas, and have excellent light fastness. In accordance with the inkjet recording method using the present ink sets, images having excellent gas resistance and high light fastness can be formed. According to the present inkjet recording method, fading of images can be prevented effectively by the use of present ink sets.

Example 5

A water solution of each dye shown in Table 7 was placed on a silica gel TLC plate (TLC Plate Silica Gel 60F254 made by Merck Ltd.) in an amount of 10 mg on a dye basis by use of a TLC syringe made by Hamilton. Another TLC sample was prepared in the same manner and used for a test of fading caused by ozone.

<Test of Long-Term Forced Fading by Ozone>

While passing dry air through a glass double-pipe of Siemens-type ozonizer, 5 kV alternating voltage was applied thereto. By use of this apparatus, a box set so as to have an ozone gas concentration of 0.5±0.1 ppm at room temperature was arranged in the dark. One plate of each TLC sample was stored in this box for a given length of time, and then the dye was extracted with methanol. From the other plate of each TLC sample, which was not exposed to ozone, the dye was also extracted with methanol. The quantities of dyes extracted were each determined by HPLC, and the dye retention ratio was calculated by making a comparison between them. Additionally, the setting of an ozone gas concentration in the box was performed with an ozone gas monitor made by APPLICS (Model OZG-EM-01).

The retention ratio of C.I. Direct Yellow 86 after a 21-day lapse was 90%, and those of the other dyes were also examined after the same period lapse. When the ratio of the retention ratio of a dye tested to that of C.I. Direct Yellow 86 is not lower than 0.6, the dye tested was rated as A; while, when the ratio is lower than 0.6, the dye tested was rated as B.

TABLE 7

| Dye | Retention Ratio after 21-Day Lapse (X %) | X/90 | Rating |
| --- | --- | --- | --- |
| C.I. Direct Yellow 86 | 90 | 1.0 | — |
| T-2-1 | 17 | 0.19 | B |
| T-2-2 | 15 | 0.17 | B |
| Ma-1 | 86 | 0.96 | A |
| Ma-2 | 88 | 0.98 | A |
| Ma-3 | 86 | 0.96 | A |
| C.I. Direct Blue 87 | 12 | 0.13 | B |
| Cy-1 | 80 | 0.89 | A |
| Cy-2 | 78 | 0.87 | A |
| Cy-3 | 77 | 0.86 | A |
| Cy-4 | 83 | 0.92 | A |
| C.I. Acid Yellow 17 | 25 | 0.28 | B |
| Ye-1 | 92 | 1.02 | A |
| Ye-2 | 85 | 0.94 | A |
| Ye-3 | 80 | 0.89 | A |
| Ye-4 | 75 | 0.83 | A |

Comparative Dyes

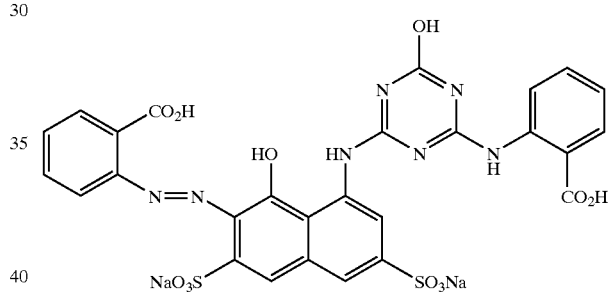

T-2-1

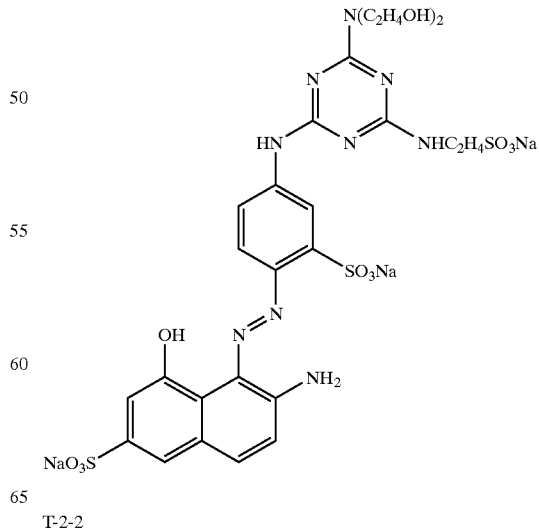

T-2-2

<Test of Short-Term Forced Fading by Ozone>

Each dye was dissolved in pure water in a concentration of 0.1 mole/liter and adjusted to pH 8.0 by addition of a 0.1N water solution of sodium carbonate, thereby preparing a sample solution. Ozone at a flow rate of 1.1±0.1 mmol/min together with 50 ml of air was bubbled through each sample solution at 30° C. by reference to the methods described in Sen-i Gakkaishi, vol. 34, pp. 181–186 (1978), and Journal of the Society of Dyers and Colourists, vol. 101, pp. 334–336.

Small sampling of the solution, into which ozone was being bubbled, was carried out at regular intervals and examined for absorbance. The dye retention ratio was determined from changes in these absorbance values. The retention ratio of each dye specimen to C.I. Direct Yellow 86 was more or less different from the data shown in Table 7, but the rating of each dye was the same.

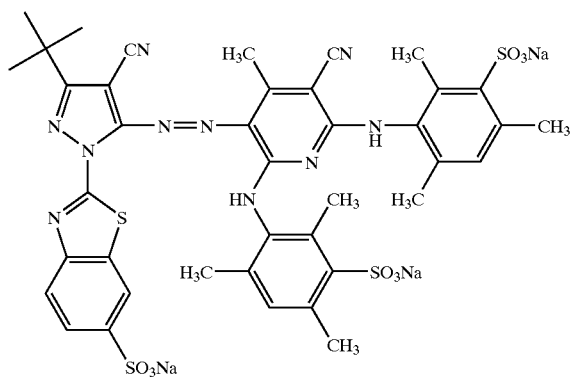
(Ma-1)

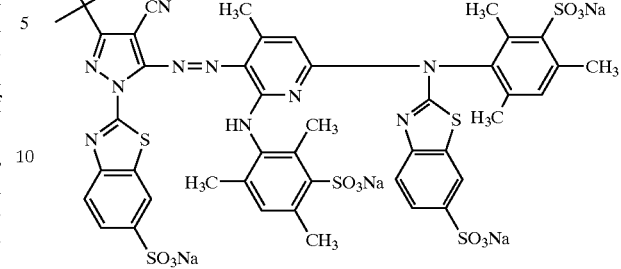
(Ma-2)

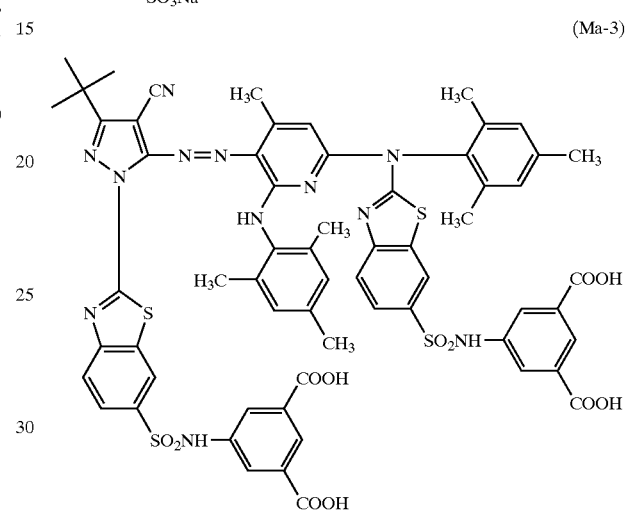
(Ma-3)

| Compound No. | M | $Xp_1$ | m | $Xp_2$ | n |
|---|---|---|---|---|---|
| (Cy-1) | Cu | —$SO_2CH_2CH_2CH_2SO_3Li$ | 2 | —$SO_2CH_2CH_2OCH_2CH_2CH_2OH$ | 2 |
| (Cy-4) | Cu | —$SO_2CH_2CH_2CH_2SO_3Li$ | 3 | —$SO_2$—$CH_2$—$CH_2$—$CH_2$—$SO_2$—$NH$—$CH_2$—$\underset{\underset{OH}{\mid}}{CH}$—$CH_3$ | 1 |

M—Pc($Xp_1$)$_m$($Xp_2$)$_n$
($Xp_1$)s and ($Xp_2$)s shown in the table are each a substituent introduced to one of the β-positions in random order.

(Cy-2)

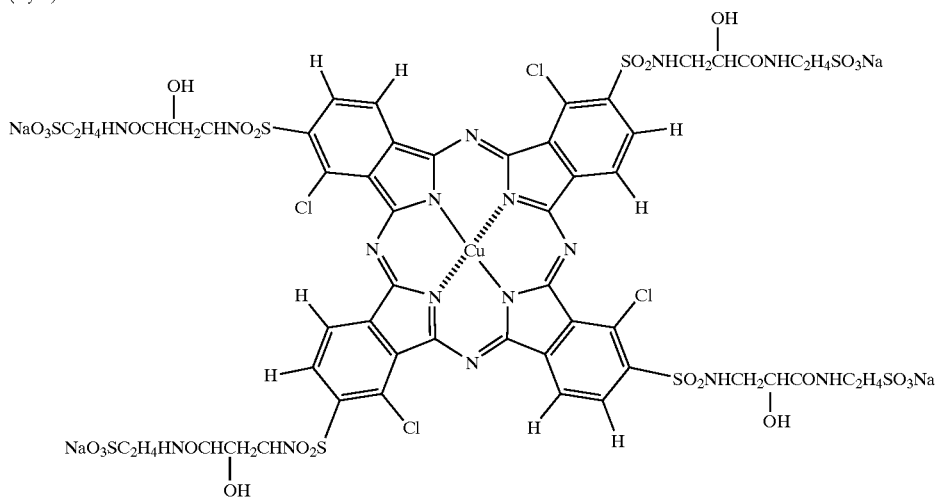

-continued

| Compound No. | M | Xp$_1$ | m | Xp$_2$ | n |
|---|---|---|---|---|---|

(Cy-3)

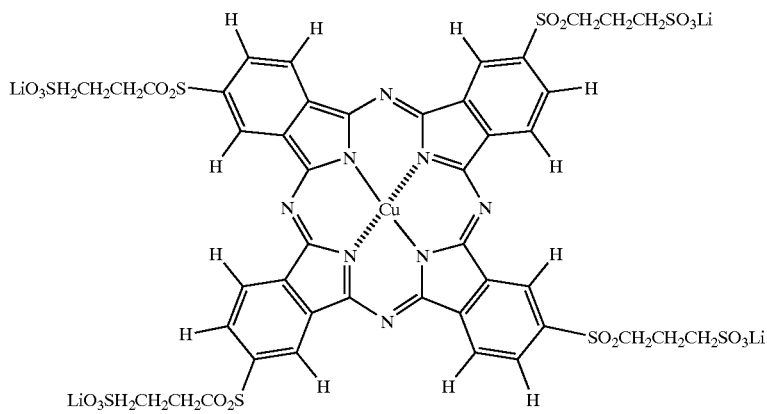

Example 6

An ink set 301 having the composition shown in Table 8 was prepared in the same way as the water-based ink prepared in Example 1. Further, ink sets 302 to 310 were each prepared in the same manner as the ink set 301, except that the dyes set forth in Table 7 were replaced by the dyes shown in Table 8, respectively. Each of the ink sets 301 to 310 were charged into cartridges for an inkjet printer, Model PM-770C (made by Seiko Epson Corporation). By use of this printer, images were printed on each of inkjet papers, Photographic Paper PM made by Seiko Epson Corporation, Inkjet Paper Gasai, photographic-quality finish, produced by Fuji Photo Film Co., Ltd., and PR101 produced by Canon Inc. And the printed images were each evaluated by the following forced tests and long-term tests in natural settings.

TABLE 8

|  | Light Magenta | Magenta | Light Cyan | Cyan | Yellow | Black |
|---|---|---|---|---|---|---|
| Dye (g/l) | T-2-1 (7.5) | T-2-1 (30.0) | Direct Blue 87 (8.75) | Direct Blue 87 (35.0) | Direct Yellow 86 (29.0) | T-2-4 (20.0) T-2-5 (20.0) T-2-6 (20.0) T-2-3 (21.0) |
| Diethylene glycol (g/l) | 150 | 110 | 200 | 130 | 160 | 20 |
| Urea (g/1) | 37 | 46 | — | — | — | — |
| Glycerin (g/l) | 130 | 160 | 150 | 180 | 150 | 120 |
| Triethylene glycol monobutyl ether (g/l | 130 | 140 | 130 | 140 | 130 | — |
| Diethylene glycol monobutyl ether (g/l) | — | — | — | — | — | 230 |
| 2-Pyrrolidone (g/l) | — | — | — | — | — | 81 |
| Surfynol 465 (g/l) | 10.5 | 10.0 | 9.8 | 10.5 | 10.5 | — |
| Surfynol STG (g/l) | — | — | — | — | — | 9.8 |
| Triethanolamine (g/l) | 6.9 | 7.0 | 6.0 | 6.3 | 0.8 | 17.9 |

TABLE 8-continued

|  | Light Magenta | Magenta | Light Cyan | Cyan | Yellow | Black |
|---|---|---|---|---|---|---|
| Benzotriazole (g/l) | 0.08 | 0.07 | 0.08 | 0.08 | 0.08 | 0.06 |
| Proxel XL2 (g/l) | 3.5 | 1.5 | 1.1 | 1.2 | 1.5 | 1.1 |

(T-2-3)

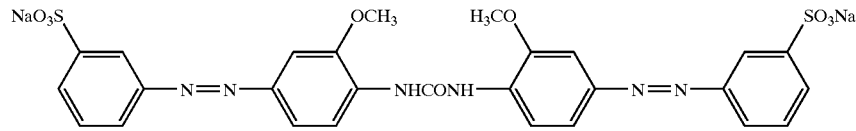

(T-2-4)

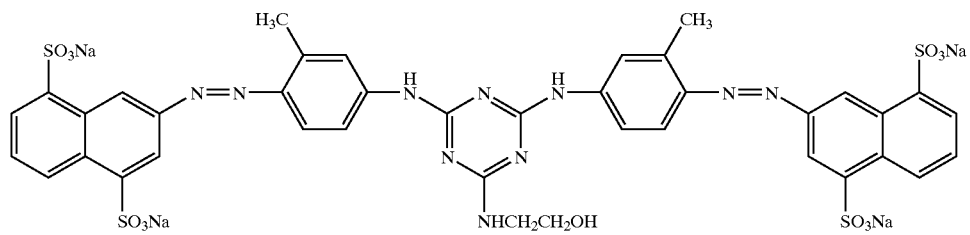

(T-2-5)

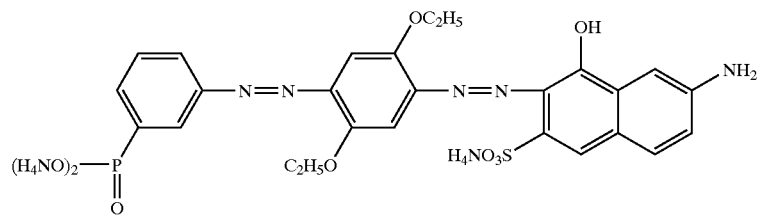

(T-2-6)

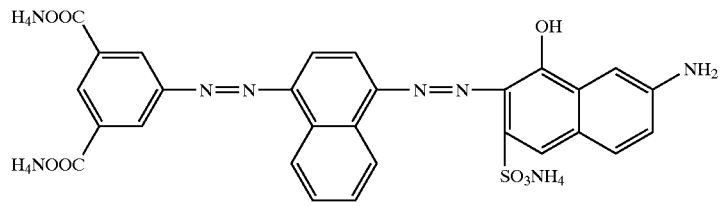

TABLE 9

| Ink Set | Light Magenta | Magenta | Light Cyan | Cyan | Yellow | note |
|---|---|---|---|---|---|---|
| 301 | T-2-1 | T-2-1 | Direct Blue 87 | Direct Blue 87 | Direct Yellow 86 | comparison |
| 302 | T-2-2 | T-2-2 | Cy-4 | Cy-4 | Direct Yellow 86 | comparison |
| 303 | Ma-2 | Ma-2 | Direct Blue 87 | Direct Blue 87 | Direct Yellow 86 | comparison |
| 304 | Ma-2 | Ma-2 | Cy-4 | Cy-4 | Ye-1 | invention |
| 305 | Ma-1 | Ma-2 | Cy-3 | Cy-3 | Ye-1 | invention |
| 306 | Ma-2 | Ma-1 | Cy-4 | Cy-3 | Ye-1 | invention |
| 307 | Ma-2 | Ma-2 | Cy-4 | Cy-4 | Direct Yellow 86 | invention |
| 308 | Ma-3 | Ma-3 | Cy-1 | Cy-1 | Ye-2 | invention |
| 309 | Ma-2 | Ma-1 | Cy-4 | Cy-3 | Ye-3 | invention |
| 310 | Ma-2 | Ma-2 | Cy-4 | Cy-4 | Ye-2 | invention |

<Light Fastness>

Chromaticity (a*1, b*1) and lightness (L1) of each print-out sample were measured with SPM 100-II made by Gretag AG just after printing, and then the sample was irradiated with xenon light (85,000 lux) for 7 days by means of a weather meter made by Atlas. Further, chromaticity (a*2, b*2) and lightness (L2) of the thus exposed sample were measured, and a color difference (ΔE) before and after irradiation was determined by the following equation, thereby making evaluations.

$$\Delta E = \{(a*1-a*2)^2 + (b*1-b*2)^2 + (L1-L2)^2\}^{1/2}$$

Color differences were evaluated at three points of reflection density, 1.0, 1.3 and 1.6. The case where a color difference was smaller than 5 at every density was rated as A, the case where whether a color difference was smaller than 5 or not smaller than 5 depends on the density value was rated as B, and the case where a color difference was not smaller than 5 at every density was rated as C.

<Heat Fastness>

A color difference in each sample before and after 6-day storage under a condition of 80° C. was determined by the same method as adopted for the evaluation of light fastness. And dye retention ratios were evaluated at three points of reflection density, 1.0, 1.3 and 1.6, and the case where a color difference was smaller than 3 at every density was rated as A, the case where whether a color difference was smaller than 3 or not smaller than 3 depends on the density value was rated as B, and the case where a color difference was not smaller than 3 at every density was rated as C.

<Forced Fading Test by Ozone>

A color difference in each sample before and after 7-day storage in a box having an ozone gas concentration set at 0.5 ppm was determined by the same method as adopted for evaluation of light fastness. And dye retention ratios were evaluated at three points of reflection density, 1.0, 1.3 and 1.6, and the case where a color difference was smaller than 10 at every density was rated as A, the case where whether a color difference was smaller than 10 or not smaller than 10 depends on the density value was rated as B, and the case where a color difference was not smaller than 10 at every density was rated as C. Additionally, the ozone gas concentration in the box was set by use of an ozone gas monitor (Model OZG-EM-01, made by APPLICS).

<Gas Resistance in Natural Settings>

The printed image samples were each pasted up on inside walls of an office that got no sun, and allowed to stand for 6 months while keeping the surface of each sample in good air circulation. A color difference in each sample before and after such an aging in natural settings was determined by the same method as adopted for the light fastness evaluations. And dye retention ratios were evaluated at three points of reflection density, 1.0, 1.3 and 1.6, and the case where a color difference was smaller than 10 at every density was rated as A, the case where whether a color difference was smaller than 10 or not smaller than 10 depends on the density value was rated as B, and the case where a color difference was not smaller than 10 at every density was rated as C.

Evaluation results in the case of printing images on Photographic Paper PM, inkjet paper made by Seiko Epson Corporation, are shown in Table 10.

TABLE 10

| Ink Set | Light Fastness | Heat Fastness | Forced Fading Test by Ozone | Gas Resistance in Natural Settings |
|---|---|---|---|---|
| 301 | C | C | C | C |
| 302 | B | C | C | C |
| 303 | B | B | C | C |
| 304 | A | A | A | A |
| 305 | A | A | A | A |
| 306 | A | A | A | A |
| 307 | B | A | A | A |
| 308 | A | A | A | A |
| 309 | A | A | A | A |
| 310 | A | A | A | A |

As can be seen from the results shown in Table 10, the gas resistance in natural settings correlated well with the test results of forced fading by ozone, and the dyes selected in accordance with the present method showed well-balanced gas resistance in natural settings. The dyes represented by the present structural formulae showed excellent fastness to heat and light in addition to gas resistance. These results demonstrate that the present dyes have totally balanced fastness. Additionally, the same results as mentioned above were also obtained in the cases of producing printouts on Inkjet Paper Gasai, photographic-quality finish, produced by Fuji Photo Film Co., Ltd., and on PR101 produced by Canon Inc.

In accordance with the present invention, it is possible to create ink sets having well-balanced gas resistance in natural settings by selecting combinations of yellow, magenta and cyan dyes whose retention ratios after the fading by ozone are each at least 0.8 times as high as the retention ratio of C.I. Direct Yellow 86 after the fading by ozone, and ink design can be prepared with efficiency. The ink sets thus prepared can provide images having well-balanced fastness.

By selecting specific dyes and combining them in preparing an ink set, the present invention can further provide a method of recording color images having excellent fastness and a method of preventing color images from fading.

Example 7

Preparation of Autodispersive Pigment

A pigment dispersion A containing autodispersive carbon black in a dispersed state was prepared in accordance with Example of JP-A No.2001-89688. Further, a pigment dispersion B containing autodispersive carbon black in a dispersed state was also prepared in accordance with Example of JP-A No.2001-72904.

Preparation of Black Ink

Bonjet Black CW-1 (made by Orient Kagaku) was diluted with water so as to reach a pigment concentration of 10 weight %, and then centrifuged (7,000 r.p.m., 30 minutes) to prepare a pigment dispersion (pigment concentration: 8.3 weight %).

| | |
|---|---|
| Pigment dispersion described above | 50 weight % |
| Diethylene glycol | 15 weight % |
| Urea | 5 weight % |
| $C_4H_9(CH_2CH_2O)_2H$ | 2 weight % |
| Surfactant (Olfin E1010, made by Nissin Chemical Industry Co., Ltd.) | 1 weight % |
| Pure water | 27 weight % |

While fully mixing the above ingredients, a 1N water solution of sodium hydroxide was added dropwise to the mixture till the pH reached to 7.5. Then, the mixture was filtered through a 1-$\mu$m filter under a pressurized condition to prepare Black Ink C. Black Ink A and Black Ink B were prepared in the same manner as mentioned above, except that the pigment dispersions A and B were used respectively in place of the dispersion of Bonjet Black CW-1 (made by Orient Kagaku) and the amount of pure water added was adjusted so that each ink provided the same optical density.

As black ink for comparison, on the other hand, Black Ink D was prepared in the same manner as the ink solution in Example 1.

Preparation of Water-Based Color Ink

Light magenta ink, magenta ink, light cyan ink, cyan ink and yellow ink were prepared in the same manner as those in the ink set 101 of Example 1, and made into an ink set 401.

Ink sets 402 to 413 were each prepared in the same manner as the ink set 401, except that the species of the dyes used in the light magenta ink, the magenta ink, the light cyan ink, the cyan ink and the yellow ink were changed to those shown in Table 11 respectively. Additionally, it was basic to the dye change that equimolar replacement of dyes was made, and the dye concentrations were adjusted so that the transmission densities of ink solutions became equivalent to those in the ink set 401, respectively. In the case of using two dyes together in one ink solution, they were added in equimolar amounts.

TABLE 11

| Ink Set | | | | | | |
|---|---|---|---|---|---|---|
| Color Ink | Black Ink | Light Magenta | Magenta | Light Cyan | Cyan | Yellow |
| 401 | D | T-1 | T-1 | T-2 | T-2 | T-3 |
| 402 | D | T-1 | T-1 | C-11 | C-11 | T-3 |
| 403 | D | M-10 | M-10 | T-2 | T-2 | T-3 |
| 404 | D | M-3 | M-3 | C-11 | C-11 | T-3 |
| 405 | D | M-6 | M-3 | C-12 | C-11 | Y-2 |
| 406 | A | M-6 | M-3 | C-12 | C-11 | Y-2 |
| 407 | A | M-10 | M-10 | C-40 | C-40 | Y-4 |
| 408 | B | M-15 | M-10 | C-11 | C-11 | Y-4 |
| 409 | B | M-16 | M-16 | C-41 | C-41 | Y-5 |
| 410 | C | M-12 | M-10 | C-42 | C-11 | Y-5 |
| 411 | C | M-17 | M-17 | C-40 | C-11 | Y-10 |
| 412 | C | M-18 | M-18 | C-42 | C-40 | Y-28 |
| 413 | C | M-10 | M-10 | C-11 | C-11 | Y-24 |
|  |  |  |  |  |  | Y-25 |

Image Recording and Evaluations

Each of the color ink sets 401 to 413 and Black Ink A, B, C or D were charged into cartridges for an inkjet printer, Model PM-770C (made by Seiko Epson Corporation). By use of this printer, images were printed on inkjet paper, Photographic Paper PM, made by Seiko Epson Corporation, and the following evaluations were made. The results obtained are shown in Table 12.

<Fine-Line Bleeding>

Fine-line patterns were printed in yellow ink, magenta ink, cyan ink and black ink, respectively, and allowed to stand for 1 day under a condition of 40° C.-80% RH. Then, bleeding evaluation (1) was performed on these fine-line patterns by visual observations. As to the black ink, evaluation (2) of bleeding caused by contact between two colors was also performed by printing a solidly shaded pattern in magenta ink and then printing on this pattern fine lines in black ink.

<Water Resistance>

Images obtained were immersed in deionized water for 30 seconds, and blurs appearing on the images were evaluated by visual observations.

<Light Fastness>

With respect to image fastness, printout samples of gray color were made, and evaluated as follows:

Chromaticity (a*1, b*1) and lightness (L1) of each printout sample were measured with SPM 100-II made by Gretag AG just after printing, and then the sample was irradiated with xenon light (85,000 lux) for 14 days by means of a weather meter made by Atlas. Further, chromaticity (a*2, b*2) and lightness (L2) of the thus exposed sample were measured, and a color difference (ΔE) before and after irradiation was determined by the following equation, thereby making evaluations.

$$\Delta E = \{(a*1-a*2)^2 + (b*1-b*2)^2 + (L1-L2)^2\}^{1/2}$$

Color differences were evaluated at three points of reflection density, 1.0, 1.3 and 1.6. The case where a color difference was smaller than 5 at every density was rated as A, the case where whether a color difference was smaller than 5 or not smaller than 5 depends on the density value was rated as B, and the case where a color difference was not smaller than 5 at every density was rated as C.

<Heat Fastness>

A color difference in each sample before and after 14-day storage under a condition of 80° C. was determined by the same method as adopted for the evaluation of light fastness. And dye retention ratios were evaluated at three points of reflection density, 1.0, 1.3 and 1.6, and the case where a color difference was smaller than 3 at every density was rated as A, the case where whether a color difference was smaller than 3 or not smaller than 3 depends on the density value was rated as B, and the case where a color difference was not smaller than 3 at every density was rated as C.

<Ozone Resistance>

A color difference in each sample before and after 14-day storage in a box having an ozone gas concentration set at 0.5 ppm was determined by the same method as adopted for evaluation of light fastness. And dye retention ratios were evaluated at three points of reflection density, 1.0, 1.3 and 1.6, and the case where a color difference was smaller than 10 at every density was rated as A, the case where whether a color difference was smaller than 10 or not smaller than 10 depends on the density value was rated as B, and the case where a color difference was not smaller than 10 at every density was rated as C. Additionally, the ozone gas concentration in the box was set by use of an ozone gas monitor (Model OZG-EM-01, made by APPLICS).

TABLE 12

| Ink Set | | Fine-Line Bleeding (1) | Fine-Line Bleeding (2) | Water Resistance | Light Fastness | Heat Fastness | Ozone Resistance |
|---|---|---|---|---|---|---|---|
| Color Ink | Black Ink | | | | | | |
| 401 | D | nothing | slight | so-so | C | C | C |
| 402 | D | nothing | slight | so-so | C | C | C |
| 403 | D | nothing | slight | so-so | B | C | C |
| 404 | D | nothing | slight | so-so | B | B | B |
| 405 | D | nothing | slight | so-so | B | B | B |
| 406 | A | nothing | nothing | good | A | A | A |
| 407 | A | nothing | nothing | good | A | A | A |
| 408 | B | nothing | nothing | good | A | A | A |
| 409 | B | nothing | nothing | good | A | A | A |
| 410 | C | nothing | nothing | good | A | A | A |
| 411 | C | nothing | nothing | good | A | A | A |
| 412 | C | nothing | nothing | good | A | A | A |
| 413 | C | nothing | nothing | good | B | A | A |

As can be seen from the results shown above, the ink compositions relating to the present invention delivered outstanding performances, especially in fastness. In addition, the present ink compositions delivered excellent performances in fine-line output and the fine lines produced therefrom were free of bleeding and highly resistant to water.

Additionally, similar effects to the above were also obtained by replacing the image receiving paper used above by Inkjet Paper Gasai, photographic-quality finish, produced by Fuji Photo Film Co., Ltd., or by PR101 produced by Canon Inc.

Example 8

The same ink set samples as prepared in Example 7 were each charged in the cartridges of an inkjet printer, BJ-F850, made by Canon Inc. By use of this printer, images were printed on Inkjet Paper Gasai, photographic-quality finish, produced by Fuji Photo Film Co., Ltd., and performance evaluations thereof were made in the same way as in Example 7. In this example also, results similar to those in Example 7 were attained. The same effects as the above case were produced also in the cases of using as image-receiving paper Photographic Paper PM made by Seiko Epson Corporation and PR101 made by Canon Inc., respectively.

What is claimed is:

1. An ink set comprising a yellow ink containing at least one yellow dye, a magenta ink containing at least one magenta dye, and a cyan ink containing at least one water-soluble cyan dye, wherein an oxidation potential of the magenta dye and an oxidation potential of the cyan dye are each higher than 0.8 V (vs SCE), wherein the cyan dye is represented by the following general formula (C-I), and the magenta dye and the yellow dye are represented by the following general formula (MY):

General Formula (C-I)

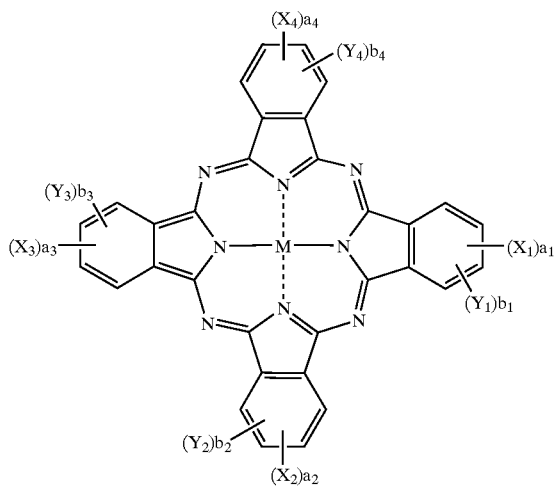

wherein in General Formula (C-I), $X_1$, $X_2$, $X_3$ and $X_4$ each independently represents an electron-withdrawing group having a σp value of no less than 0.40; $Y_1$, $Y_2$, $Y_3$ and $Y_4$ each independently represents a monovalent substituent; M represents a hydrogen atom, a metal element or an oxide, hydroxide or halide thereof; $a_1$ to $a_4$ and $b_1$ to $b_4$, respectively represent a number of substituents of $X_1$ to $X_4$ and $Y_1$ to $Y_4$; $a_1$ to $a_4$ and $b_1$ to $b_4$ each independently represents an integer from 0 to 4; a sum of $a_1$ to $a_4$ is no less than 2; and an ionic hydrophilic group is disposed as a substituent at any position on $X_1$, $X_2$, $X_3$, $X_4$, $Y_1$, $Y_2$, $Y_3$ and $Y_4$;

General Formula (MY)

A—N=N—B wherein in General Formula (MY), A and B each independently represents a substituted aryl group or a substituted or non-substituted 5-membered or 6-membered unsaturated heterocyclic group, at least one of A and B represents a heterocyclic group having a substituent including an electron withdrawing group or represents an aryl group having an —NH—R group at a para-position, and R represents a substituent.

2. The ink set according to claim 1, wherein an ozone fading retention ratio of the magenta dye and the cyan dye are each no less than 0.6 times an ozone fading retention ratio of C.I. Direct Yellow 86.

3. The ink set according to claim 1, wherein the magenta dye is represented by the following general formula (M-1):

General Formula (M-1)

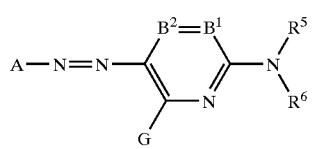

wherein A represents a residue of 5-membered heterocyclic diazo component A—$NH_2$; $B^1$ and $B^2$ respectively represent —$CR^1$= and —$CR^2$=, or one of $B^1$ and $B^2$ represents a nitrogen atom and the other represents —$CR^1$= or —$CR^2$=; $R^5$ and $R^6$ each independently represents a hydrogen atom or a substituted or unsubstituted aliphatic, aromatic, heterocyclic, acyl, alkoxycarbonyl, aryloxycarbonyl, carbamoyl, alkylsulfonyl, arylsulfonyl or sulfamoyl group; G, $R_1$ and $R^2$ each independently represents a hydrogen atom, a halogen atom, a substituted or unsubstituted aliphatic, aromatic, heterocyclic, cyano, carboxyl, carbamoyl, alkoxycarbonyl, aryloxycarbonyl, heterocyclic oxycarbonyl, acyl, hydroxyl, alkoxy, aryloxy, heterocyclic oxy, silyloxy, acyloxy, carbainoyloxy, alkoxycarbonyloxy, aryloxycarbonyloxy, amino, acylamino, ureide, sulfamoylamino, alkoxycarbonylamino, aryloxycarbonylamino, alkylsulfonylamino, arylsulfonylamino, heterocyclic sulfonylamino, nitro, alkylthio, arylthio, alkylsulfonyl, arylsulfonyl, heterocyclic sulfonyl, alkylsulfinyl, arylsulfinyl, heterocyclic sulfinyl, sulfamoyl, sulfo or heterocyclic thio group.

4. The ink set according to claim 1, wherein the cyan dye is represented by the following general formula (C-II):

General Formula (C-II)

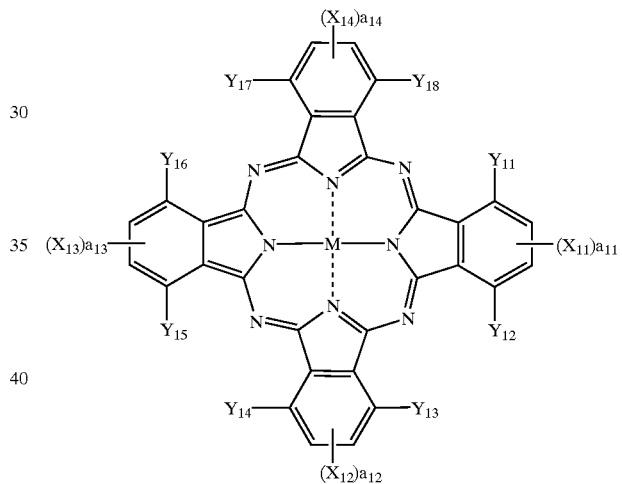

wherein $X_{11}$, $X_{12}$, $X_{13}$ and $X_{14}$ each independently represents an electron-withdrawing group having a σp value of no less than 0.40; $Y_{11}$ to $Y_{18}$ each independently represents a monovalent substituent; M represents a hydrogen atom, a metal element or an oxide, hydroxide or halide thereof; $a_{11}$ to $a_{14}$ represent a number of substituents of $X_{11}$ to $X14$; $a_{11}$ to $a_{14}$ each independently represents an integer from 0 to 4; a sum of $a_{11}$ to $a_{14}$ is no less than 2; and when the dye is a water-soluble dye, an ionic hydrophilic group is disposed as a substituent at any position on $X_{11}$, $X_{12}$, $X_{13}$, $X_{14}$, $Y_{11}$, $Y_{12}$, $Y_{13}$ and Y14.

5. The ink set according to claim 1, wherein the oxidation potential of the magenta dye is higher than the oxidation potential of the cyan dye.

6. The ink set according to claim 1, wherein an oxidation potential of the yellow dye is higher than 0.8 V (vs SCE).

7. The ink set according to claim 1, wherein an ozone fading retention ratio of the yellow dye is no less than 0.6 times an ozone fading retention ratio of C.I. Direct Yellow 86.

8. The ink set according to claim 1, wherein the yellow dye is represented by the following general formula (Y-I):

General Formula (Y-I)

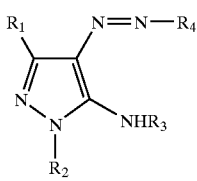

wherein $R_1$ and $R_3$ each independently represents a hydrogen atom, a cyano group, an alkyl group, a cycloalkyl group, an aralkyl group, an alkoxy group, an alkylthio group, an arylthio group, an aryl group or an ionic hydrophilic group; $R_2$ represents a hydrogen atom, an alkyl group, a cycloalkyl group, an aralkyl group, a carbamoyl group, an acyl group, an aryl group or a heterocyclic group; and $R_4$ represents a heterocyclic group.

9. The ink set according to claim 1, wherein the ink set comprises two or more magenta inks having different concentrations and/or two or more cyan inks having different concentrations.

10. The ink set according to claim 1, further comprising a black ink containing at least one self-dispersible pigment.

11. A container comprising an ink set comprising a yellow ink containing at least one yellow dye, a magenta ink containing at least one magenta dye, and a cyan ink containing at least one water-soluble cyan dye, wherein an oxidation potential of the magenta dye and an oxidation potential of the cyan dye are each higher than 0.8 V (vs SCE), wherein the cyan dye is represented by the following general formula (C-I), and the magenta dye and the yellow dye are represented by the following general formula (MY):

General Formula (C-I)

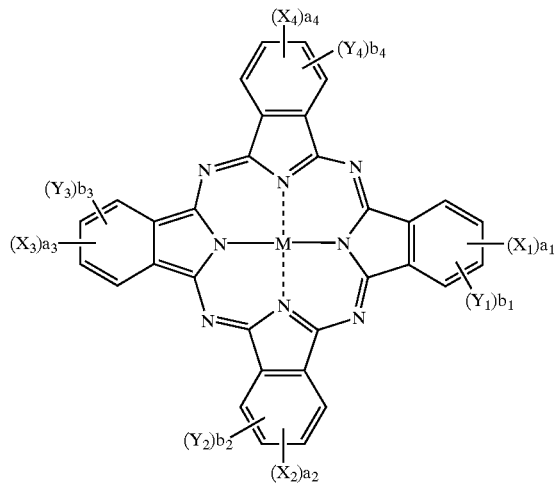

wherein in General Formula (C-I), $X_1$, $X_2$, $X_3$ and $X_4$ each independently represents an electron-withdrawing group having a σp value of no less than 0.40; $Y_1$, $Y_2$, $Y_3$ and $Y_4$ each independently represents a monovalent substituent; M represents a hydrogen atom, a metal element or an oxide, hydroxide or halide thereof; $a_1$ to $a_4$ and $b_1$ to $b_4$, respectively represent a number of substituents of $X_1$ to $X_4$ and $Y_1$ to $Y_4$; $a_1$ to $a_4$ and $b_1$ to $b_4$ each independently represents an integer from 0 to 4; a sum of $a_1$ to $a_4$ is no less than 2; and an ionic hydrophilic group is disposed as a substituent at any position on $X_1$, $X_2$, $X_3$, $X_4$, $Y_1$, $Y_2$, $Y_3$ and $Y_4$;

General Formula (MY)

wherein in General Formula (MY), A and B each independently represents a substituted aryl group or a substituted or non-substituted 5-membered or 6-membered unsaturated heterocyclic group, at least one of A and B represents a heterocyclic group having a substituent including an electron withdrawing group or represents an aryl group having an —NH—R group at a para-position, and R represents a substituent.

12. An inkjet recording method which comprises forming an image on an image-receiving material having an ink-receiving layer containing a particulate white inorganic pigment provided on a support, using an ink set comprising a yellow ink containing at least one yellow dye, a magenta ink containing at least one magenta dye, and a cyan ink containing at least one water-soluble cyan dye, wherein an oxidation potential of the magenta dye and an oxidation potential of the cyan dye are each higher than 0.8 V (vs SCE), wherein the cyan dye is represented by the following general formula (C-I), and the magenta dye and the yellow dye are represented by the following general formula (MY):

General Formula (C-I)

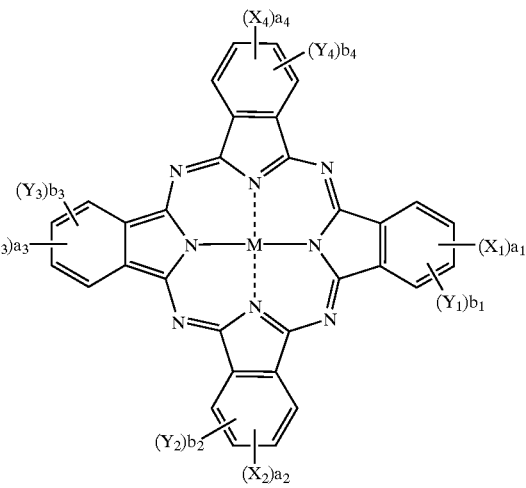

wherein in General Formula (C-I), $X_1$, $X_2$, $X_3$ and $X_4$ each independently represents an electron-withdrawing group having a σp value of no less than 0.40; $Y_1$, $Y_2$, $Y_3$ and $Y_4$ each independently represents a monovalent substituent; M represents a hydrogen atom, a metal element or an oxide, hydroxide or halide thereof; $a_1$ to $a_4$ and $b_1$ to $b_4$, respectively represent a number of substituents of $X_1$ to $X_4$ and $Y_1$ to $Y_4$; $a_1$ to $a_4$ and $b_1$ to $b_4$ each independently represents an integer from 0 to 4; a sum of $a_1$ to $a_4$ is no less than 2; and an ionic hydrophilic group is disposed as a substituent at any position on $X_1$, $X_2$, $X_3$, $X_4$, $Y_1$, $Y_2$, $Y_3$ and $Y_4$;

General Formula (MY)

wherein in General Formula (MY), A and B each independently represents a substituted aryl group or a substituted or non-substituted 5-membered or 6-membered unsaturated heterocyclic group, at least one of A and B represents a heterocyclic group having a substituent including an electron withdrawing group or represents an aryl group having an —NH—R group at a para-position, and R represents a substituent.

13. A method for preventing discoloration of an inkjet-recorded image, wherein inkjet recording is carried out using an ink set comprising a yellow ink containing at least one yellow dye, a magenta ink containing at least one magenta dye, and a cyan ink containing at least one water-soluble cyan dye, wherein an oxidation potential of the magenta dye and an oxidation potential of the cyan dye are each higher than 0.8 V (vs SCE), wherein the cyan dye is represented by the following general formula (C-I), and the magenta dye and the yellow dye are represented by the following general formula (MY):

General Formula (C-I)

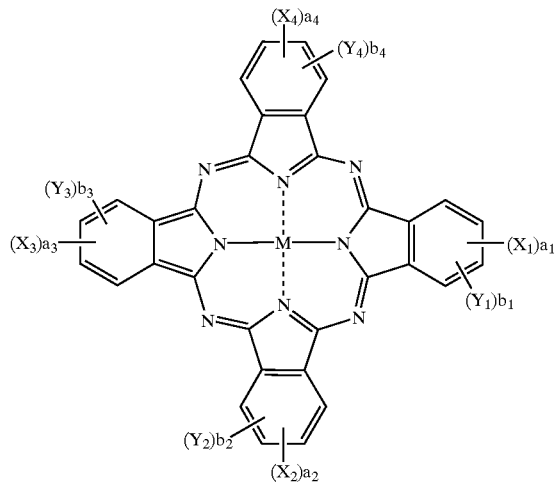

wherein in General Formula (C-I), $X_1$, $X_2$, $X_3$ and $X_4$ each independently represents an electron-withdrawing group having a σp value of no less than 0.40; $Y_1$, $Y_2$, $Y_3$ and $Y_4$ each independently represents a monovalent substituent; M represents a hydrogen atom, a metal element or an oxide, hydroxide or halide thereof; $a_1$ to $a_4$ and $b_1$ to $b_4$, respectively represent a number of substituents of $X_1$ to $X_4$ and $Y_1$ to $Y_4$; $a_1$ to $a_4$ and $b_1$ to $b_4$ each independently represents an integer from 0 to 4; a sum of $a_1$ to $a_4$ is no less than 2; and an ionic hydrophilic group is disposed as a substituent at any position on $X_1$, $X_2$, $X_3$, $X_4$, $Y_1$, $Y_2$, $Y_3$ and $Y_4$;

General Formula (MY)

A—N=N—B wherein in General Formula (MY), A and B each independently represents a substituted aryl group or a substituted or non-substituted 5-membered or 6-membered unsaturated heterocyclic group, at least one of A and B represents a heterocyclic group having a substituent including an electron withdrawing group or represents an aryl group having an —NH—R group at a para-position, and R represents a substituent.

14. The inkset according to claim 3, wherein the amino group comprises a heterocyclic amino or anilino group.

* * * * *